(12) United States Patent
Whitmire et al.

(10) Patent No.: US 11,506,888 B2
(45) Date of Patent: *Nov. 22, 2022

(54) DRIVER GAZE TRACKING SYSTEM FOR USE IN VEHICLES

(71) Applicant: NVIDIA Corp., Santa Clara, CA (US)

(72) Inventors: Eric Whitmire, Seattle, WA (US);
Kaan Aksit, San Jose, CA (US);
Michael Stengel, Cupertino, CA (US);
Jan Kautz, Lexington, MA (US);
David Luebke, Charlottesville, VA (US); Ben Boudaoud, Efland, NC (US)

(73) Assignee: NVIDIA CORP., Santa Clara, CA (US)

( * ) Notice: Subject to any disclaimer, the term of this patent is extended or adjusted under 35 U.S.C. 154(b) by 545 days.

This patent is subject to a terminal disclaimer.

(21) Appl. No.: 16/578,077

(22) Filed: Sep. 20, 2019

(65) Prior Publication Data

US 2021/0088784 A1 Mar. 25, 2021

(51) Int. Cl.
*G02B 27/14* (2006.01)
*G02B 27/01* (2006.01)
*G09F 9/33* (2006.01)
*G06F 3/01* (2006.01)
*F21V 8/00* (2006.01)
*G06V 20/59* (2022.01)

(52) U.S. Cl.
CPC ....... *G02B 27/0101* (2013.01); *G02B 6/0073* (2013.01); *G02B 27/017* (2013.01); *G06F 3/013* (2013.01); *G06V 20/597* (2022.01); *G09F 9/33* (2013.01)

(58) Field of Classification Search
CPC .......... G02B 27/0101; G02B 6/0073; G02B 27/017; G06V 20/597; G06F 3/013; G09F 9/33
USPC ...................................................... 359/630
See application file for complete search history.

(56) References Cited

U.S. PATENT DOCUMENTS

| 4,829,321 | A | 5/1989 | Iizuka et al. |
| 4,904,862 | A | 2/1990 | Bertagne |
| 6,265,984 | B1 | 7/2001 | Molinaroli |
| 10,838,492 | B1* | 11/2020 | Whitmire ........... G02B 27/0093 |
| 2003/0122749 | A1 | 7/2003 | Booth, Jr. et al. |
| 2006/0039143 | A1 | 2/2006 | Katoh et al. |
| 2009/0213585 | A1 | 8/2009 | Chern et al. |
| 2009/0295683 | A1 | 12/2009 | Pugh et al. |
| 2011/0075418 | A1 | 3/2011 | Mallory et al. |
| 2011/0305014 | A1 | 12/2011 | Peck |

(Continued)

OTHER PUBLICATIONS

Dmytro Katrychuk et al., Power-Efficient and Shift-Robust Eye-Tracking Sensor for Portable VR Headsets, ETRA ' 19, Jun. 25-28, 2019, Denver, CO, USA.

(Continued)

*Primary Examiner* — William Choi
(74) *Attorney, Agent, or Firm* — Rowan TELS LLC

(57) ABSTRACT

A gaze tracking system for use by the driver of a vehicle includes an opaque frame circumferentially enclosing a transparent field of view of the driver, light emitting diodes coupled to the opaque frame for emitting infrared light onto various regions of the driver's eye gazing through the transparent field of view, and diodes for sensing intensity of infrared light reflected off of various regions of the driver's eye.

23 Claims, 27 Drawing Sheets

(56) References Cited

U.S. PATENT DOCUMENTS

2016/0003442 A1 1/2016 Kim et al.
2019/0250707 A1* 8/2019 Kondo ............... G02B 27/0179

OTHER PUBLICATIONS

Tianxing Li et al., Battery-Free Eye Tracker on Glasses, Mobicom' 18, Oct. 29-Nov. 2, 2018, New Delhi, India.
Tianxing Li et al., Ultra-Low Power Gaze Tracking for Virtual Reality, Sensys' 17 Nov. 6-8, 2017, Delft, Netherlands.
Ioannis Rigas et al., Hybrid PS-V Technique: a Novel Sensor Fusion Approach for Fast Mobile Eye-Tracking With Sensor-Shift Aware Correction, IEEE Sensors Joural, vol. 17, No. 24, Dec. 15, 2017.
Ioannis Rigas et al., Photosensor Oculography: Survey and Parametric Analysis of Designs Using Model-Based Simulation.
Raimondas Zemblys et al., Making Stand-Alone PS-OG Technology Tolerant to the Equipment Shifts, Petmet' 18 Jun. 14-17, 18, 2018, Warsaw, Poland.
Raimondas Zemblys et al., Developing Photo-Sensor Oculography (PS-OG) System for Virtual Reality Headsets, ETRA' 18, Jun. 14-17, 2018, Warsaw, Poland.

* cited by examiner

DRIVER GAZE TRACKING SYSTEM FOR USE IN VEHICLES

BACKGROUND

Head mounted displays (HMDs) use a variety of sensors to provide immersive interaction with engaging virtual reality experiences. Emerging consumer head mounted displays for virtual reality use a variety of different sensing components—embedded in the headset or grouped into an external unit—including but not limited to gyroscopes, accelerometers, and various optical sensors such as cameras, photodiodes, and/or light emitting diodes (LED). These sensors can detect when the device is being worn by a user and track head orientation, user motions, gaze direction and duration, and other factors used to provide visual-based user controls and enhance the user's experience in a virtual world. In particular, the use of gaze as an input modality can substantially enhance the user experience in an HMD system. Indeed, whereas decoupled non-mouse input modalities utilized as pointing mechanisms for large displays has proven awkward, gaze-supported target acquisition has been found by users to be fast and natural. Hence the virtual reality (VR) and augmented reality (AR) industries have been moving toward the use of gaze tracking as a key component of future HMD systems.

Although current prototype solutions are presently bulky and expensive, the growing interest toward low-cost gaze trackers is encouraging development that has already yielded some promising results. Nevertheless, major challenges remain for improving conventional gaze tracking hardware and software. For example, typical conventional gaze trackers rely on camera-based imaging techniques which have relatively high-power demands and, as such, may not be truly suitable for low-power mobile solutions. Imaging equipment also requires substantially complex image processing software, effectively adding a costly image processing block to the pipeline. Because conventional gaze trackers work with high-dimensional inputs (that is, high-resolution images), these inputs result in unwanted latency in the capture hardware, communication protocols, and image processing-based gaze estimation pipeline.

BRIEF SUMMARY

Various implementations disclosed herein are directed to gaze tracking systems for use in head mounted displays. More specifically, various implementations disclosed herein are directed to a head mounted display comprising a lens, a display positioned in front of the lens in an optical path, and one or more photosensor elements positioned behind the lens in the optical path. "Photosensor" refers to any device capable of detecting photons. Examples of photosensors include light emitting diodes operating in sensing mode, photodiodes, photoresistors, and other apparatus for detecting photon known in the art.

Various implementations may further comprise one or more light emitting diodes (optionally adaptively configured in illumination or sensing mode, positioned behind the lens in the optical path adjacent to the photosensor elements.

Various implementations disclosed herein are also directed to a system for gaze tracking generally comprising an eyepiece comprising an opaque frame, circumferentially enclosing a transparent field of view, a plurality of light emitting diodes coupled to the opaque frame for emitting infrared light onto an eye gazing through the transparent field of view, and a plurality of photosensor elements coupled to the opaque frame, each sensor element from among the plurality of photosensors operationally coupled to one or more light emitting diode from among the plurality of light emitting diodes, for sensing intensity of infrared light reflected off of the eye.

Also disclosed are various implementations directed to a method for gaze tracking an eye using a gaze tracking device, the method generally comprising (1) determining with calibration logic a set of calibration data corresponding to a first measure of intensities of infrared light reflected by the eye while the eye is gazing at a plurality of calibration points during a first time period, the calibration points corresponding to a plurality of known gaze directions; and (2) comparing, using a gaze tracking logic, an instant gaze direction for the eye during a second time period based on a second measure of intensities of infrared light reflected by the eye to the set of calibration data.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
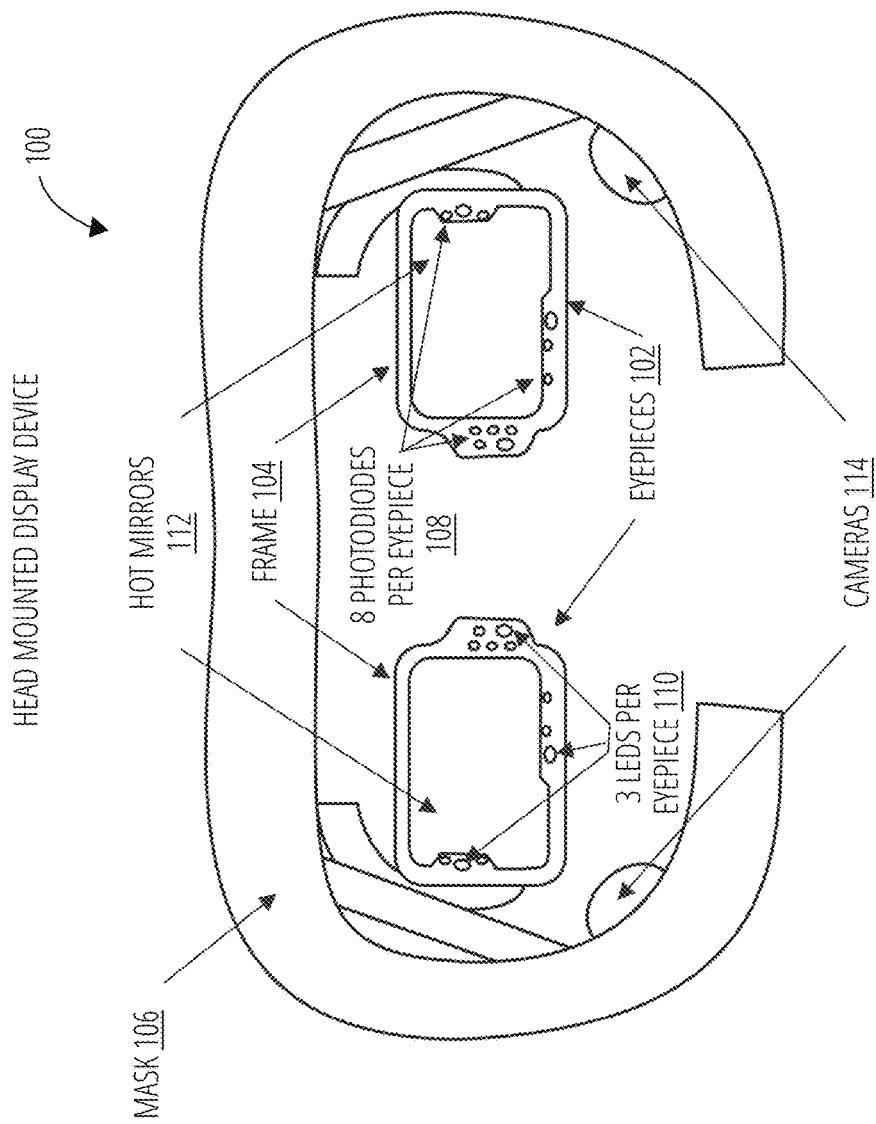
FIG. 1 illustrates an exemplary head mounted display device 100 representative of various implementations disclosed herein.

Today's head mounted display (HMD) manufacturers are competing to create less bulky head mounted displays. This goal may be achieved by reducing the bulk caused by each component of the system. A light emitting diode (LED) may be used as an illuminator or, like a photodiode, as a photosensor for integrating light intensity over a certain field of view and exposure interval. In this manner, LEDs may be used in a gaze tracker both for capture and illumination. Alternatively, purpose-built, single output photosensor elements, such as photodiodes and photoresistors, can be used to sense light over more precisely controlled conditions.

Off-the-shelf photosensor elements are lighter and smaller than off-the-shelf cameras. Various implementations disclosed herein may provide a simple electronics design for an ultralow-cost gaze tracker with accuracy and sampling rates that match existing gaze tracking devices, taking up less volume, consuming less power, and having lower mass than an alternative using single or multiple cameras. Several such implementations are related to a head mounted display that takes advantage of an LED's bidirectional characteristics to allow both light capture and illumination, while other implementations are related to use of LEDs in conjunction with photodiodes for the same purpose.

Photosensor elements also offer an advantage in power consumption over camera-based solutions. The resulting heat dissipation issues caused by cameras may also be avoided with use of a low-power photosensor system. Additionally, a gaze estimation pipeline may be designed that is computationally light-weight and effective for use in battery operated applications. Because only a small number of photosensor elements—LEDs or photodiodes, for example—may be utilized in lieu of a camera (having millions of sensing pixels), latency within the hardware and software may also be reduced and results achieved at substantially higher sensing rates. The higher sensing rates may be leveraged for greater accuracy using existing/comparable computational resources. For certain implementations disclosed herein, mean angular error may be as low as 1.1° with a median angular error of 0.7°.

In the context of an HMD system, an array of LEDs may be positioned in front of a subject's eyes for the task of gaze estimation. The LEDs may be used to illuminate the eye and capture light. Light emitting diodes with infrared light emission may be used advantageously in HMD gaze tracker hardware because humans are insensitive to infrared illumination (and thus will be unaware of the gaze tracking when it is taking place) and a human eye's cornea has similar absorption and reflection characteristics in the near infrared as compared to visible light. Additionally, infrared light emitting diodes have a narrow bandwidth (typically about 50 nm) and thus are able to largely avoid cross-talk with other wavelengths.

In operation, as a human subject observes a scene projected at a fixed virtual plane, the subject's eye(s) may be illuminated with infrared light from different perspectives in a time multiplexed fashion. While the intensity of the emitted infrared light may be constant, the intensities of infrared light reflecting off the eye from different perspectives will differ and may be captured and digitized at a high refresh rate. Furthermore, supervised adaptive pattern recognition implementation as part of a calibration process may be used to accurately estimate the subsequent gaze locations of the human subject at the virtual image plane.

Figure 6:
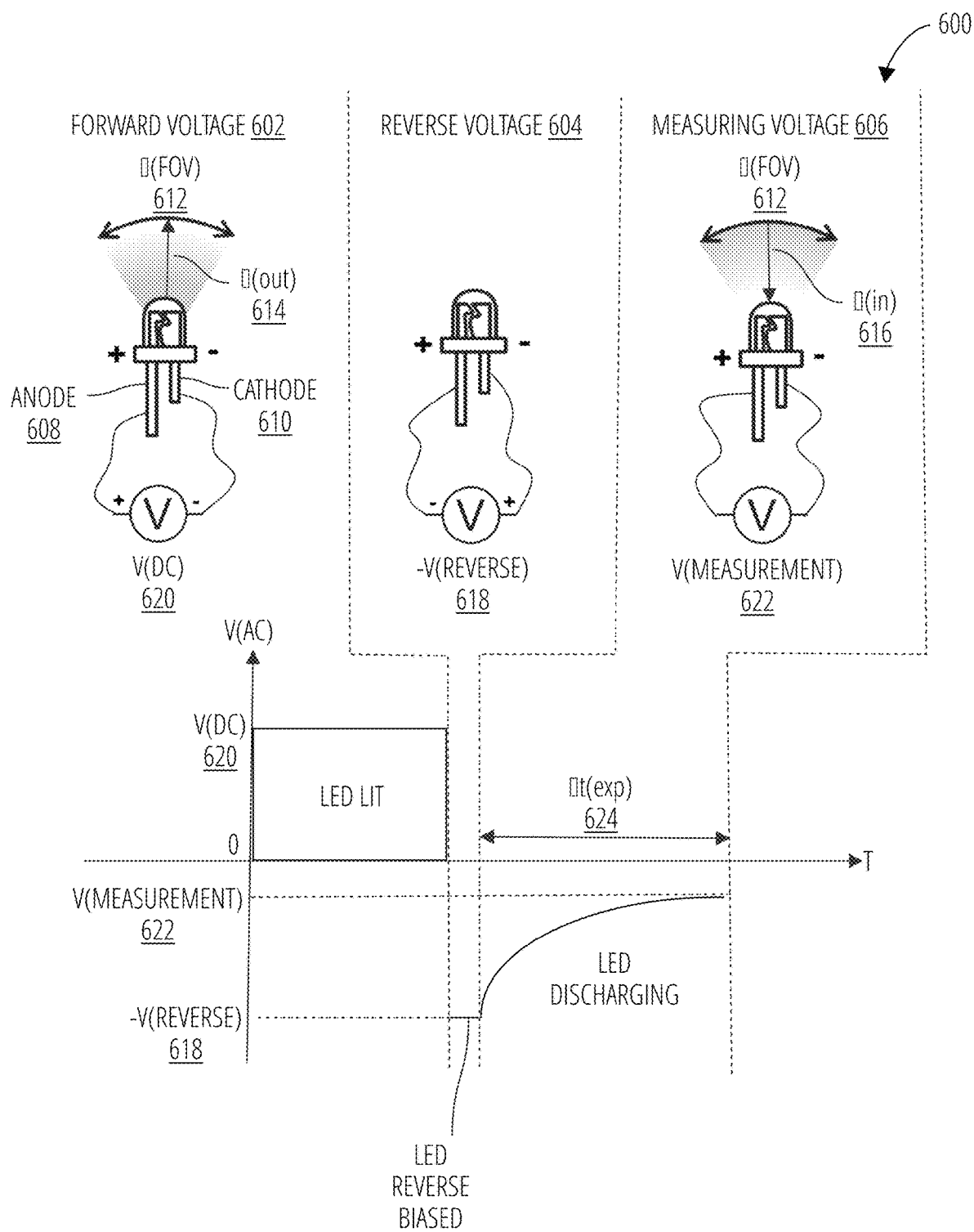
FIG. 6 illustrates an exemplary light emitting diode operational modes 600 representative of various implementations disclosed herein.

Not only can LEDs provide illumination when a forward voltage is applied to their two electrical terminals, but they may also act as photodetectors (akin to a photodiode) by way of a three-step process: (1) apply a reverse voltage pulse for a short time duration; (2) wait while the LED's capacitance is discharged; and (3) measure the voltage across the two terminals of the light emitting diode to determine how much light is detected (e.g., how much infrared light is reflected off of an eye). FIG. 6 illustrates each of the steps and is discussed in more detail later herein. These steps may be implemented by wiring the LED to a microcontroller for full control over charge, discharge, wait, and measure. The microcontroller may be controlled by and relay measurements to a host logic.

Typically LEDs are most sensitive to wavelengths $\lambda(in)$ that are shorter than their emission spectrum, i.e., $\lambda(in)<\lambda(out)$ and, as such, larger exposure times (compared to photodiodes) may be needed if LEDs with the same emission spectrum are used. Minimizing exposure time is important for eye safety, however, and the exposure interval $\Delta t(exp)$ and maximum irradiance of a light emitting diode may be considered in accordance with safety regulations for infrared light sources. Accordingly, to achieve lower latency within a given configuration, LEDs or photodiodes with intersecting emission and sensitivity spectra in the infrared range may be used to minimize exposure times.

Figure 8:
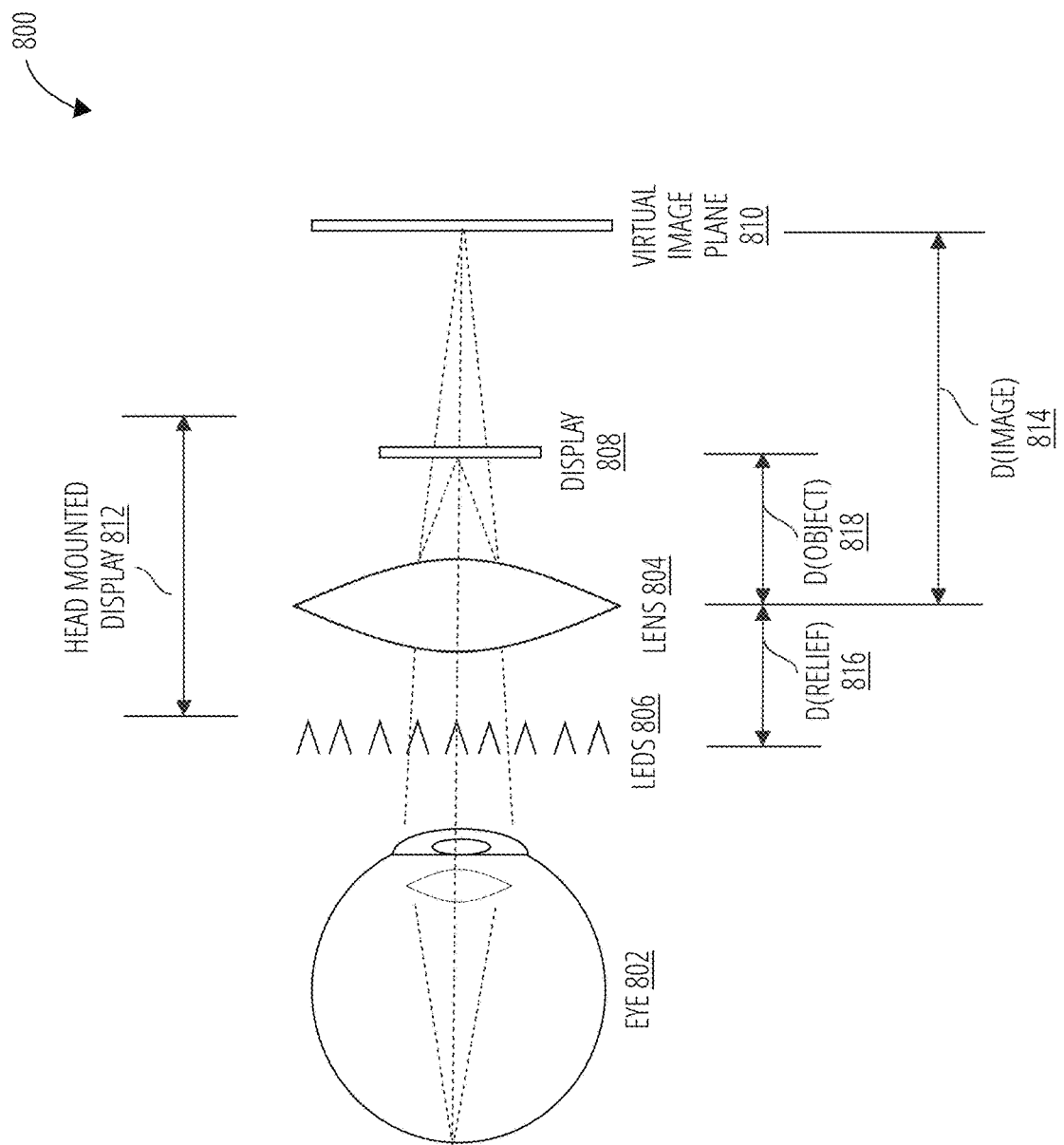
FIG. 8 illustrates an exemplary optical path configuration 800 representative of various implementations disclosed herein.

For both capture and illumination, LEDs and/or photodiodes may be placed at specific locations in front of an eye (or the optical path may be relayed for the same effect). One configuration for an HMD, as shown in FIG. 8, may use a pair of magnifier lenses placed in front of a display to create a virtual image perceived by the user to be at some distance in front of a user. Such a head mounted display setting may include an eye relief distance d(relief) from the eye of 25-30 mm, and an additional spacing d(object) of 35-50 mm between the magnifier lens and display, as determined by the focal length of the magnifier lens.

In various implementations, LEDs may be placed between the lens and the eye or between the magnifier lens and the display. For certain implementations, the LEDs may be placed directly in front of the user's eyes to minimize light loss due to scattering off the other optical elements of the head mounted display. However, LEDs positioned on-axis in front of an eye may occlude parts of the image, whereas placing LEDs in an off-axis arrangement may avoid such occlusions.

A maximal amount of corneal and pupil reflection may be achieved when the photosensor elements (LEDs, photodiodes, or photoresistors) are positioned in proximity to the illuminating LEDs. For some implementations, LEDs may be placed side-by-side in a ring around the magnifier lens. For other implementations, such as the one illustrated in FIG. 9, the LEDs may be arranged in groups comprising two photosensors with one illuminating LED.

A supervised adaptive pattern recognition algorithm (or "calibration") may be used with the sensor technology. This method may have low computational demands and may run sufficiently fast on a conventional mobile platform. Equivalent or better accuracy may be achieved with a much simpler hardware, compared to the most common methods from the literature. Gaze tracking devices for head mounted displays may estimate where a user is gazing relative to a virtual image plane as seen through the head mounted display's lenses. The task of gaze estimation is a layered problem that may require the integration of sensors, optical design, image/signal processing, and electronics design.

Figure 10:
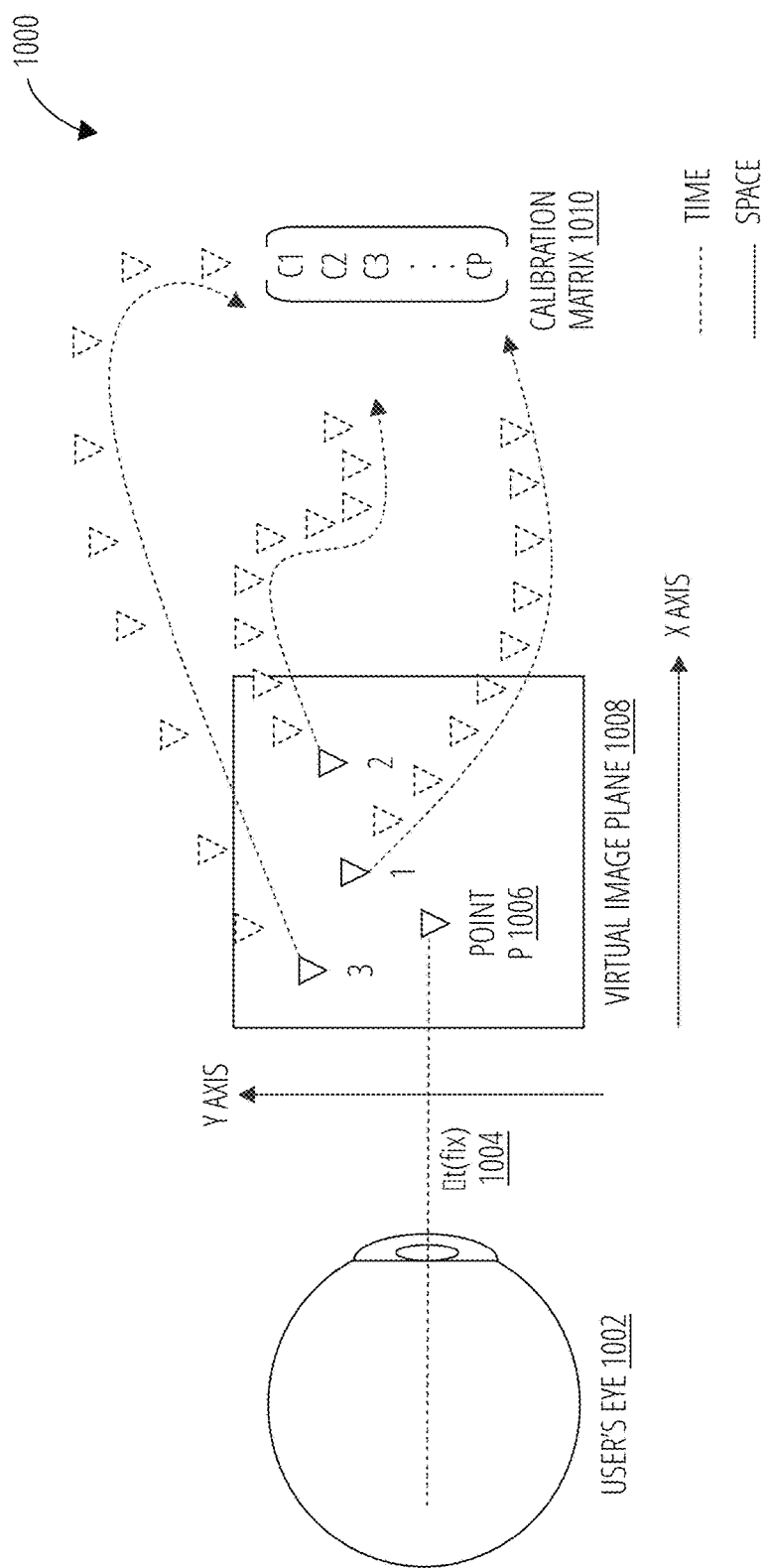
FIG. 10 illustrates a calibration matrix construction process 1000 representative of various implementations disclosed herein.

Capture hardware may host a fixed number M of photosensors. The capture hardware may transmit a data capture vector to the host (PC, smartphones, etc.). This vector may contain measured data as:

$$s(t) = [s_0(t), s_1(t), \ldots, s_M(t)] \quad \text{Equation 1}$$

where each $s_m(t)$ represents the output of the m-th photosensor connected to the capture hardware. A calibration matrix may be constructed that represents the relation between a captured vector and the gaze locations as follows. First, pre-defined locations may be highlighted on the virtual image plane in random order, and users may be asked to dwell on each of the highlighted locations for a certain duration $\Delta t(fix)$. During this time, s may be sampled multiple times at fixed intervals $\Delta t(v)$, and the mean of the measurements may be stored as $c_p = \Sigma_t\, s(t)$ for each pre-defined location p. To ensure a meaningful calibration, the variance of all the measurements for a location p may be confirmed as being below a certain threshold. Otherwise measurements for that location may be discarded. FIG. 10 summarizes the procedure for creation of a calibration matrix.

The pre-defined calibration points may be at any location. For one embodiment, a grid of 2×2 to 5×5 evenly spaced locations may be used. Starting from this small number of calibration points, the gaze location may need to be derived given a set of new measurements s(t). At a later stage, calibration data may be enlarged online through a gaming application, in which a user's task is to gaze and destroy opponents. Using collected data, two different regression methods may be evaluated: Support Vector regression and Gaussian Process regression.

Support Vector regression has a generalized form as:

$$\begin{bmatrix} e_x \\ e_y \end{bmatrix} = k^T \begin{bmatrix} u_x \\ u_y \end{bmatrix}^T \quad \text{Equation 2}$$

where $e_x$ and $e_y$ represent estimated gaze position along x and y, $k^T$ represents a vector that contains the similarity measures between the captured s(t), and the calibration vectors $c_p$. Finally, $u_x$ and $u_y$ represent vectors that correspond to the x and y position of each $c_p$. A regression technique may depend on a distance measure that indicates how similar the captured data is to the stored calibration data. Such a comparison using any method may provide a similarity vector as in:

$$k = \begin{bmatrix} \kappa(s(t), c_1) \\ \vdots \\ \kappa(s(t), c_P) \end{bmatrix} \quad \text{Equation 3}$$

where $\kappa(a,b)$ donates the used distance function to determine similarity in between vector a and b, k represents the distance vector. Distance measure for Support Vector regression calculations may be the radial basis function.

Gaussian Process regression may be used in one embodiment as a robust and accurate regression method. Gaussian Process regression may take the following general form:

$$\begin{bmatrix} e_x \\ e_y \end{bmatrix} = k^T C^{-1} \begin{bmatrix} u_x \\ u_y \end{bmatrix}^T \quad \text{Equation 4}$$

with variables as described above. The covariance matrix C may be calculated as:

$$k = \begin{bmatrix} \kappa(c_0, c_0) & \ldots & \kappa(c_0, c_p) \\ \vdots & & \\ \kappa(c_p, c_0) & \ldots & \kappa(c_p, c_p) \end{bmatrix} \quad \text{Equation 5}$$

Comparing a vector with another vector may be accomplished in multiple ways. Minkowski distance measure may be used effectively with the Gaussian Process regression algorithm:

$$\kappa(a,b) = (\Sigma_{i=1}^n w_i |a_i - b_i|^m)^{1/m} \quad \text{Equation 6}$$

where a and b are two vectors to be compared, $w_i$ is the weighting factor for a certain channel in the captured data, m is the degree of the norm, and i is the index of the element. Good results may be achieved using m=2 and setting $w_i$=1.

For the Support Vector regression algorithm, a radial basis function kernel may be employed:

$$\kappa(a, b) = e^{-\frac{\|a-b\|}{2\sigma^2}} \quad \text{Equation 7}$$

in which $\sigma$ represents a free parameter. A grid-search may be used to find the optimal $\sigma$.

Some embodiments may utilize an artificial neural network for calibration. The neural network inputs sensor value(s) and outputs a predicted gaze direction (in two dimensions, for example). A neural network for calibration may utilize anywhere from 2-6 layers, for example. As an alternative to Gaussian Process regression, Support Vector regression, or an artificial neural network, a random forest regression algorithm may be utilized in some embodiments.

Off-the-shelf head mounted displays may be transformed into gaze sensing head mounted displays. One embodiment may consist of three light emitting and six photosensor elements per eye, a smartphone, a microcontroller (optionally per eye), a controller, and a virtual reality head mounted display as a housing. The gaze tracking algorithm may run on a smartphone in synchronism with the microcontroller(s), or on the microcontroller(s) themselves, driving the light emitting diodes and sampling the photosensors. A second embodiment may consist of one or more light emitting diodes per eye functioning as both light sensors and light sources, one microcontroller per eye, an HDMI display, a controller, and a virtual reality head mounted display as housing. The gaze tracking algorithm may in some embodiments run on a desktop computer, laptop computer, or tablet device.

An embodiment may use a pair of magnifier lenses in front of a display, as shown in FIG. 8. Considering the magnification of the lens, and the distances between LCD, lenses, and eyes, and the display's pixel density, each pixel may correspond to a visual angle of 0.12°. LEDs may be hooked to the microcontroller(s) and interfaced accordingly. Illuminator LEDs may be attached to digital input/output pins, while sensing LEDs' anodes may be attached to digital IOs, with their cathodes attached to analog-to-digital converter (ADC) pins of the microcontroller. Each time a light emitting diode is requested to sense, it may follow the process illustrated in FIG. 6. Alternatively, purpose-built amplification circuits could buffer/filter other photo sensor inputs before providing them as ADC inputs.

Light emitting diodes may have a soft-coded mechanism that adjusts Δt(exp) on a per light emitting diode basis, so that saturation caused by varying light conditions may be avoided for each light emitting diode. Two identical light emitting diodes may have a limited overlap in their emission-sensing spectra. This may lead to low resolution capture with less sampling frequency when identical light emitting diodes are used. Two light emitting diodes with different optical properties may be dedicated to specific tasks (e.g., light emission vs. sensing) to maintain good resolution, or a configuration may use identical light emitting diodes for illumination and sensing. An illuminator light emitting diode may be turned on shortly before taking a measurement from its pair of neighboring sensing light emitting diodes. All remaining light emitting diodes may be illuminating the scene at the time of a capture from a light emitting diode.

The microcontroller in use may utilize a time multiplexed capture routine, with one capture from a single light emitting diode or other photosensor at a time. However, simultaneous capture from different light emitting diodes may be possible using different microcontrollers each using a discrete analog-to-digital converter for each analog pin or sufficient sample-and-hold circuitry. Thus, the effective sampling rate may increase significantly, and latency may be further reduced. In one embodiment, the microcontroller may work synergistically with the user-interface application using a Universal Serial Bus (USB) connection to handle a number of predefined tasks, such as collecting measurements from each photosensor element, updating the user interface, producing a gaze estimation, and keeping logs related to captured data (e.g., event time stamps).

Kalman filtering may be used to enhance accuracy (but may add latency); visual anchors may also be used. Expanding the subject pool may help in clustering subjects for estimating good initial calibration data for each person. Techniques previously discussed herein may be used in conjunction with backlights of spatial light modulators. This may provide an all-in-one solution for sensing and illumination, similar to bi-directional displays.

Virtual reality users may benefit from wearable facial recognition techniques using photo-reflective sensors or from vital sign monitoring, such as heart-rate and blood oxygenation, which may be estimated remotely using photodiodes. A similar methodology using light emitting diodes or other photosensors may be implemented through simple changes to the apparatus described herein. Methodologies described herein may improve in accuracy by considering effects of facial changes due to mood, respiration or heart-rate. Saccadic reaction times are well explored by the medical community as a basis for health condition prediction techniques. An embodiment of the apparatus disclosed herein may be trained to detect saccadic reaction times. While providing sufficient accuracy for a variety of virtual reality applications, due to their poor sensing characteristics compared to photodiodes, light emitting diodes may not be a suitable choice for applications requiring very high accuracy (error<0.5°), such as in psychological, neurological, and reading research.

Blinks and head movements captured using infrared, accelerometer, and gyroscope sensors in a head mounted display may be used for the task of user identification. Such sensors may be incorporated into an embodiment to incorporate user identification into the disclosed apparatus.

The system of this disclosure may require a larger amount of calibration data than conventional imaging-based gaze tracking systems. Thus, the initial phase of calibration may be comparably longer. Conventional head mounted displays may shift slightly on a subject's face, commonly due to fast head movements. In turn, this may cause the sensing hardware to shift relative to the subject's eyes. Using the original calibration data may make gaze estimates less reliable. This problem is common with other gaze trackers. Recalibration in such cases, though burdensome to users, may be used to overcome this issue.

Various implementations disclosed herein are also directed to a system for gaze tracking generally comprising an eyepiece comprising an opaque frame circumferentially enclosing a transparent field of view, a plurality of light emitting diodes (LEDs) coupled to the opaque frame for emitting infrared light onto an eye gazing through the transparent field of view, and a plurality of photodiodes coupled to the opaque frame, each photodiode from among the plurality of photodiodes operationally coupled to a single LED from among the plurality of LEDs for sensing intensity of infrared light reflected off of the eye. Several such implementations may further comprise logic capable of causing the plurality of LEDs to periodically emit infrared light and the plurality of photodiodes to periodically sense infrared light and/or logic for determining a gaze direction of the eye based on the sensed intensity of infrared light reflected by the eye from the plurality of LEDs. Several such implementations may also comprise logic for calibrating the device by determining a gaze direction of the eye to a successive plurality of known points in the field of view based on the sensed intensity of infrared light reflected off of the eye from the plurality of LEDs, and then subsequently determining a gaze direction of the eye based on the sensed intensity of infrared light reflected by the eye from the plurality of LEDs based on the calibration. Certain implementations may also comprise logic for determining that the calibration has become invalid and recalibrating the device by determining a gaze direction of the eye to a successive plurality of known points in the field of view based on the sensed intensity of infrared light reflected off of the eye by the plurality of LEDs. Select implementations may also comprise a camera for periodically sensing infrared light reflected off of the eye along with corresponding logic capable of evaluating the sensing by the plurality of LEDs/photodiodes compared to the sensing by the camera.

Embodiments of the invention have numerous applications including but not limited to use in remote or autonomous control of cars, buses, boats, robots, and other conveyances including aircraft. Embodiments of the invention will also find utility in gaming applications. For example co-pending application Ser. No. 16/366,506, "Remote Operation of Vehicles Using Immersive virtual reality Environments" by Jen-Hsun Huang, Prajakta Gudadhe, Justin Ebert, Dane Johnston filed 27 Mar. 2019, discloses an autonomous/remote control application that may benefit by utilizing the invention.

FIG. 1 illustrates an exemplary head mounted display device 100 (HMD) representative of various implementations disclosed herein. Two eyepieces 102 are fixedly coupled to a mask 106 for engaging the face of a user. Each of the eyepieces 102 comprises a frame 104 circumferentially defining the boundary of a field of view (FOV) for each eye of the user. Each eyepiece further comprises a plurality of photodiodes 108, specifically eight per eyepiece as shown, as well as a plurality of light emitting diodes 110 (LEDs), specifically three per eyepiece as shown. For certain implementations, the frame 104 may further comprise a pair of cameras 114 that may be oriented to view reflections of the user's eyes via the use of hot mirrors 112 incorporated in the FOV of the frame 104 for each of the eyepieces 102.

Figure 2:
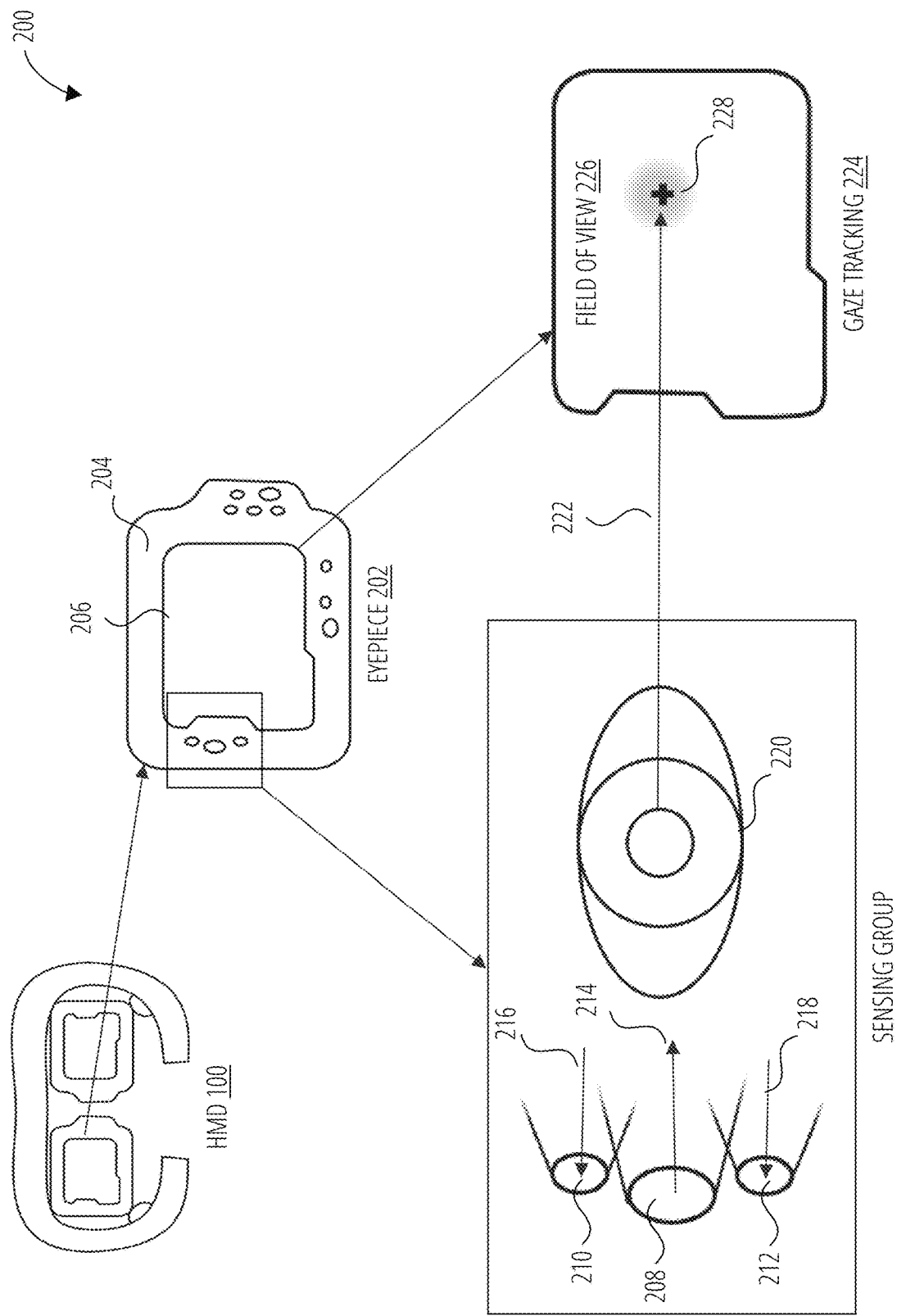
FIG. 2 illustrates an exemplary gaze tracking system 200 representative of various implementations disclosed herein.

FIG. 2 illustrates an exemplary gaze tracking system 200 representative of various implementations disclosed herein. Gaze tracking may be implemented in a head mounted display device 100 by exploiting the capabilities of a sensing group comprising photodiode 212 and photodiode 210 in conjunction with an emitting LED 208, proximal to a magnifier lens 206 of the eyepiece 202 having a defined field of view 226. The LED 208 may direct emitted IR light 214 at the user's eye 220 which is directed along a gaze direction 222 at a gaze target 228 in the field of view 226. The photodiode 210 and photodiode 212 may sense reflected IR light 216 and reflected IR light 218, the intensity of which may be used to perform gaze tracking device 224 calculations.

Other LED and photodiode groupings may also be integrated into the frame to provide different sensing perspectives of different regions of a user's eyes.

For certain implementations, the gaze tracking system 200 may comprise a smartphone, microcontrollers, and a supervised adaptive pattern recognition algorithm to estimate the gaze direction 222 of a user (human subject) in real-time over a smartphone screen viewed through the frame 204.

Figure 3:
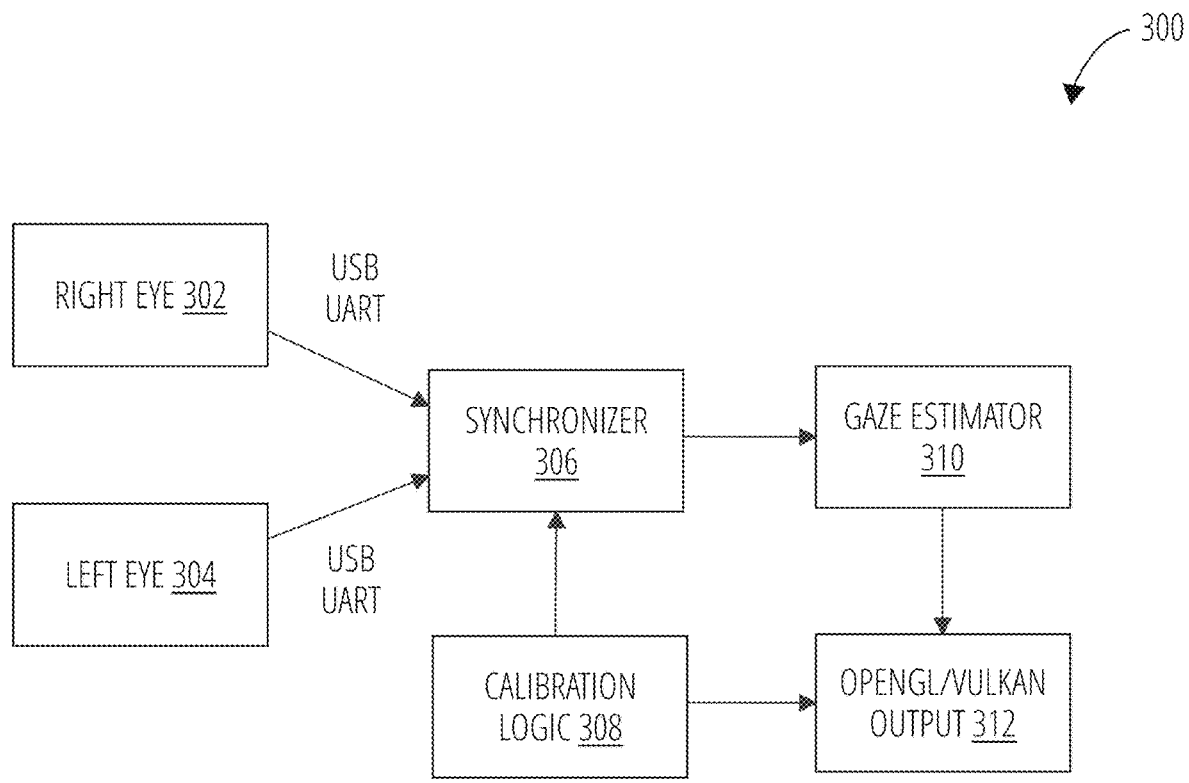
FIG. 3 illustrates an exemplary head mounted display logic 300 representative of various implementations disclosed herein.

FIG. 3 illustrates an exemplary head mounted display logic 300 representative of various implementations disclosed herein. As shown in FIG. 3, gaze data corresponding to the right eye 302 and left eye 304 is received—e.g., via USB UARTs—and applied to a synchronizer 306 using corresponding data provided by calibration logic 308. A gaze estimator 310 operates on the gaze data to produce an output such as OpenGL/Vulkan output 312 as further influenced by the calibration logic 308. The synchronizer 306 may be implemented using known components and techniques that will not be elaborated here.

Figure 4:
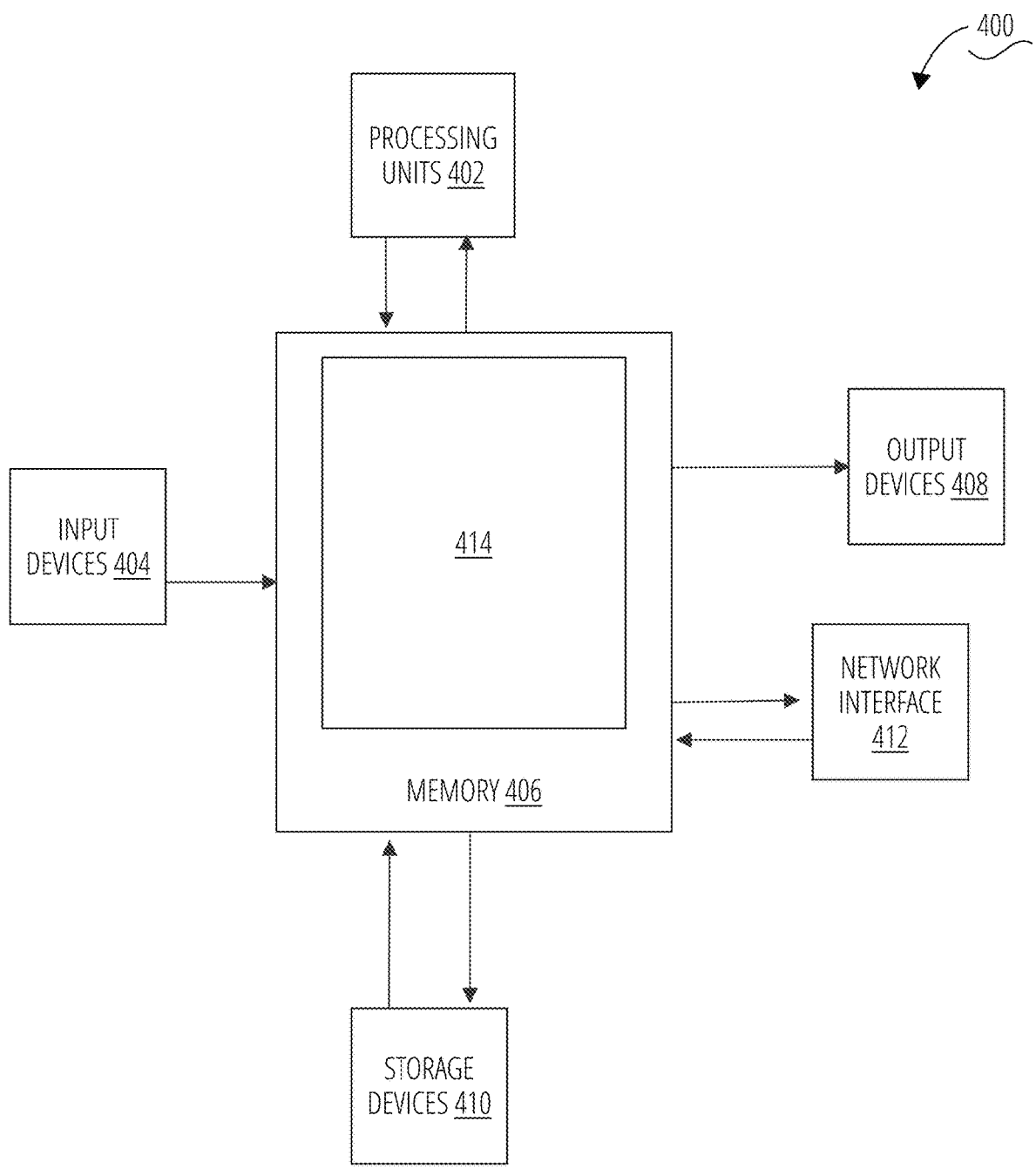
FIG. 4 illustrates an exemplary augmented reality device system logic 400 that may implement aspects of the machine processes representative of various implementations disclosed herein.

FIG. 4 illustrates exemplary augmented reality device system logic 400 that may implement aspects of the machine processes representative of various implementations disclosed herein. The augmented reality device system logic 400 comprises, inter-alia, processing units 402, input devices 404, memory 406, output devices 408, storage devices 410, and a network interface 412. Specifically, the input devices 404 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 404 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 404 are provided via various machine signal conductors (e.g., busses or network interfaces) and circuits to memory 406.

The memory 406 provides for storage (via configuration of matter or states of matter) of signals received from the input devices 404, instructions and information for controlling operation of the processing units 402, and signals from storage devices 410. The memory 406 may in fact comprise multiple memory devices of different types, for example random access memory devices and non-volatile (e.g., FLASH memory) devices. Information stored in the memory 406 is typically directly accessible to the processing units 402 of the device. Signals input to the augmented reality device system logic 400 cause the reconfiguration of the internal material/energy state of the memory 406, creating logic that in essence forms a new machine configuration, influencing the behavior of the augmented reality device system logic 400 by affecting the behavior of the processing units 402 with control signals (instructions) and data provided in conjunction with the control signals. The storage devices 410 may provide a slower but higher capacity machine memory capability. Examples of storage devices 410 are hard disks, optical disks, large capacity flash memories or other non-volatile memory technologies, and magnetic memories.

The processing units 402 may cause the configuration of the memory 406 to be altered by signals in the storage devices 410. In other words, the processing units 402 may cause data and instructions to be read from storage devices 410 in the memory 406 from which may then influence the operations of processing units 402 as instructions and data signals, and from which it may also be provided to the output devices 408. The processing units 402 may alter the content of the memory 406 by signaling to a machine interface of memory 406 to alter the internal configuration, and then converted signals to the storage devices 410 to alter its material internal configuration. In other words, data and instructions may be backed up from memory 406, which is often volatile, to storage devices 410, which are often non-volatile.

The memory 406 and/or storage devices 410 may comprise logic 414 to implement aspects of the machine processes disclosed herein.

Output devices 408 may be transducers which convert signals received from the memory 406 into physical phenomenon such as vibrations in the air, or patterns of light on a machine display, or vibrations (i.e., haptic devices) or patterns of ink or other materials (i.e., printers and 3-D printers). The network interface 412 receives signals from the memory 406 or processing units 402 and converts them into electrical, optical, or wireless signals to other machines, typically via a machine network. The network interface 412 also receives signals from the machine network and converts them into electrical, optical, or wireless signals to the memory 406 or processing units 402.

Figure 5:
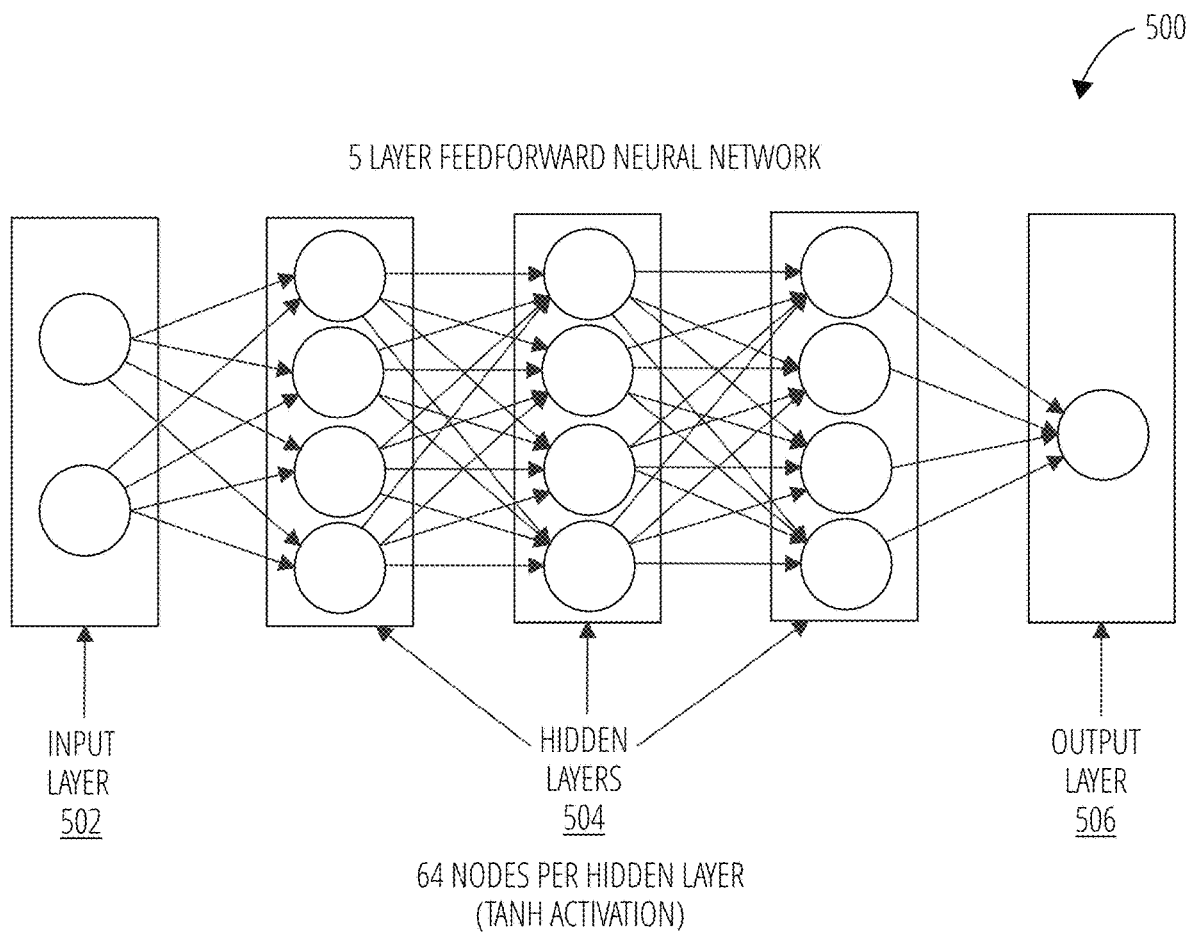
FIG. 5 illustrates an exemplary artificial neural network to implement a gaze estimation algorithm 500 representative of various implementations disclosed herein.

FIG. 5 illustrates an exemplary artificial neural network to implement a gaze estimation algorithm 500 representative of various implementations disclosed herein. An artificial neural network to implement a gaze estimation algorithm 500 is based on a collection of connected units or nodes called artificial neurons which loosely model the neurons in a biological brain. Each connection, like the synapses in a biological brain, can transmit a signal from one artificial neuron to another. An artificial neuron that receives a signal can process it and then signal additional artificial neurons connected to it. In common implementations, the signal at a connection between artificial neurons is a real number, and the output of each artificial neuron is computed by some non-linear function (the activation function) of the sum of its inputs. The connections between artificial neurons are called 'edges' or axons. Artificial neurons and edges typically have a weight that adjusts as learning proceeds. The weight increases or decreases the strength of the signal at a connection. Artificial neurons may have a threshold (trigger threshold) such that the signal is only sent if the aggregate signal crosses that threshold. Typically, artificial neurons are aggregated into layers. Different layers may perform different kinds of transformations on their inputs. Signals travel from the first layer (the input layer 502), to the last layer (the output layer 506), possibly after traversing one or more intermediate layers, called hidden layers 504.

FIG. 6 illustrates an exemplary light emitting diode operational modes 600 representative of various implementations disclosed herein. Applying a forward voltage 602 of V(DC) 620 between the anode 608 and cathode 610 of the LED causes the LED to emit light with a wavelength of λ(out) 614 across an emission cone angle of Θ(FOV) 612. Applying a reverse voltage 604 pulse, −V(reverse) 618, for a short time duration reverse biases the LED, which will then discharge over a time Δt(exp) 624. Voltage measuring 606 across the LED is carried out as the LED is discharged with incoming light that has a wavelength of λ(in) 616, across a reception cone of angle Θ(FOV) 612, as the V(measurement) 622 voltage can be observed across the LED.

Figure 7:
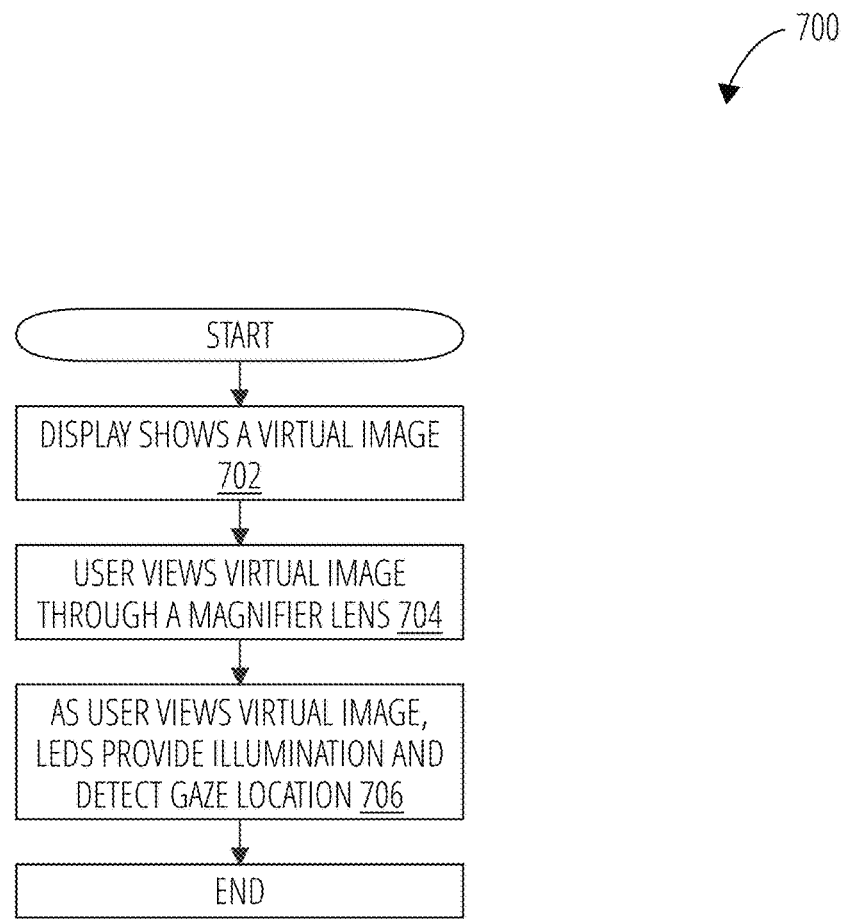
FIG. 7 illustrates an exemplary light emitting diode control process 700 representative of various implementations disclosed herein.

FIG. 7 illustrates an exemplary light emitting diode control process 700 representative of various implementations disclosed herein. The process starts with a display that shows a virtual image (block 702). At block 704 a user views the virtual image through a magnifier lens. As the views the virtual image, at block 706 the LEDs provide illumination and detect (sense) the gaze location (or direction) and continues to do so until the gaze detection ends.

FIG. 8 illustrates an exemplary optical path configuration 800 representative of various implementations disclosed herein. While an eye 802 of a user wearing a head mounted display 812 gazes upon a virtual image plane 810 generated by a display 808 viewed through a lens 804, a plurality of LEDs 806 can be used to estimate the gaze direction of the eye 802 by emitting infrared light onto the eye 802 and then sensing the intensity of the infrared light that is reflected back from the eye 802 to the LEDs 806. The relief distance d(relief) 816 between the LEDs 806 and the lens 804, the object distance d(object) 818 between the lens 804 and the display 808, and the image distance d(image) 814 of the virtual image plane 810 beyond the lens 804 can be varied based on different applications, viewing contexts, and sensing precision.

Various implementations disclosed herein are thus directed to a head mounted display comprising a lens, a display positioned in front of the lens in an optical path, and one or more first light emitting diodes positioned behind the lens in the optical path and adaptively configured in a sensing mode. Several such implementations may further comprise one or more second light emitting diodes positioned behind the lens in the optical path adjacent to the first light emitting diodes and non-adaptively configured in an illumination mode. For some such implementations, each light emitting diode of the first light emitting diodes may be directed to a conic target region different from at least one other conic target region of at least one other light emitting diode from among the first light emitting diodes. For certain implementations, the head mounted display may further comprising logic to, for each light emitting diode of the first light emitting diodes, apply a forward voltage to the light emitting diode for a first duration, apply a reverse voltage pulse to the light emitting diode for a second duration, and measure a voltage between a cathode and an anode of the light emitting diode for a third duration. For select implementations, the light emitting diodes may emit modulated light (e.g., at 24 MHz) and/or emit light having a wavelength between 920 nm and 960 nm (such as, e.g., 940 nm).

Figure 9:
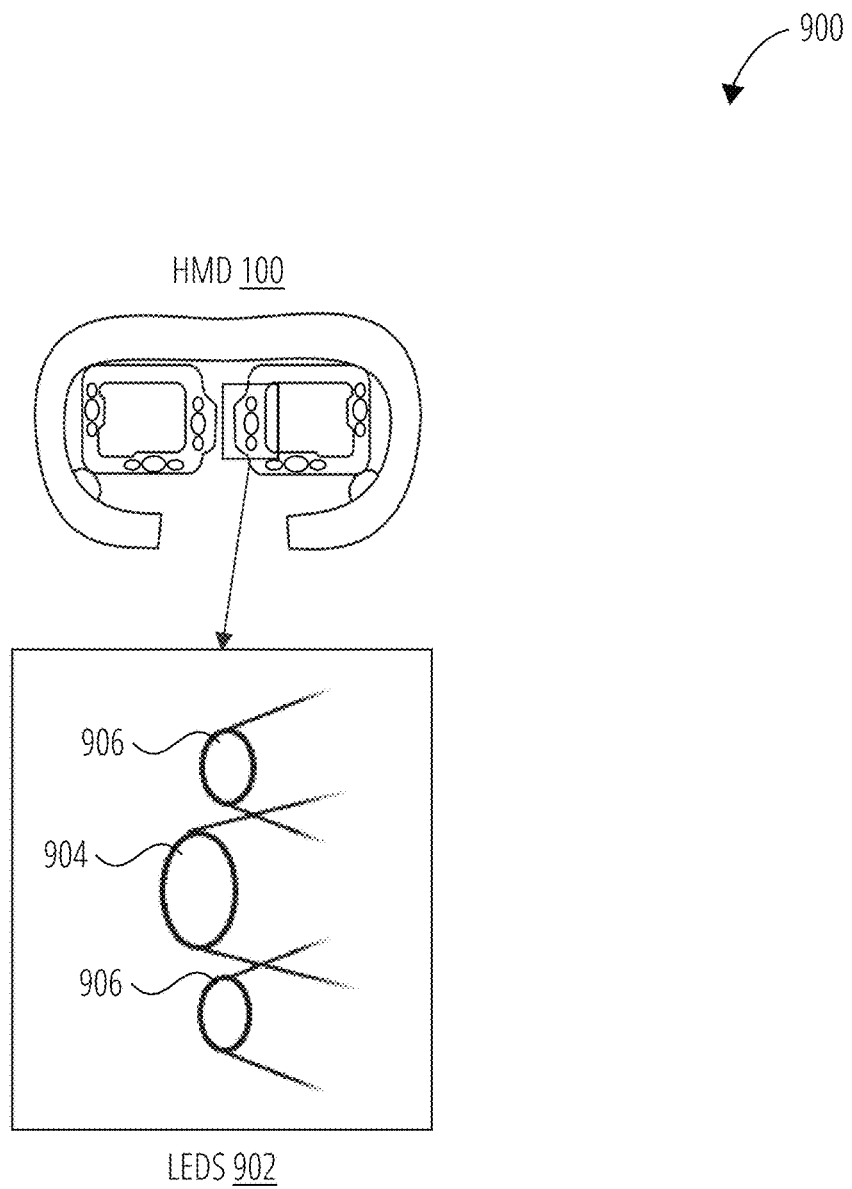
FIG. 9 illustrates an exemplary light emitting diode configuration 900 representative of various implementations disclosed herein.

FIG. 9 illustrates an exemplary light emitting diode configuration 900 representative of various implementations disclosed herein. A head mounted display device 100 utilizes a plurality of LED groups each comprising three LEDs 902. For each LED group, the center LED 904 may be used in illumination source mode and the two outside LEDs 906 may be used in receiver mode to perform gaze detection during both calibration and subsequent operation. For certain implementations, any or all of LEDs 902 may be switched to either mode (as needed or as directed) using the switching techniques described herein.

In view of the foregoing, various implementations disclosed here are also directed to a method for gaze tracking an eye using a gaze tracking device, the method generally comprising (1) determining, using a calibration logic, a set of calibration data corresponding to a first measure of intensities of infrared light reflected by the eye while the eye is gazing at a plurality of calibration points during a first time period, the calibration points corresponding to a plurality of known gaze directions; and (2) comparing, using a gaze tracking logic, an instant gaze direction for the eye during a second time period based on a second measure of intensities of infrared light reflected by the eye to the set of calibration data. For several such implementations, the first measure of intensities of infrared light may further comprise: for each calibration point from among the plurality of calibration points, emitting by a plurality of light emitting diodes a plurality of infrared light cones directed to a plurality of regions of the eye, and sensing by the plurality of light emitting diodes or a plurality of photodiodes a plurality of reflected light for each region from among the plurality of regions of the eye; and/or the second measure of intensities of infrared light further comprises emitting by a plurality of light emitting diodes a plurality of infrared light cones directed to a plurality of regions of the eye, and sensing by the plurality of light emitting diodes or a plurality of photodiodes a plurality of reflected light for each region from among the plurality of regions of the eye. For certain implementations, the calibration points may correspond to a row-and-column arrangement over a field of view wherein the calibration data is arranged as a matrix corresponding to the row-and-column arrangement; the regression analysis may be performed on the calibration data for comparing the instant gaze direction for the eye during a second time period to the set of calibration data; and/or the regression analysis may comprise a Gaussian Process regression.

FIG. 10 illustrates an exemplary calibration matrix construction process 1000 representative of various implementations disclosed herein. A simplified illustration of the calibration matrix construction is shown in which the user's eye 1002 gazes at a certain Point P 1006 on a virtual image plane 1008 for a time period of Δt(fix) 1004. During that time, data is captured and the arithmetic mean value of the capture (CP) is stored at a corresponding row of the calibration matrix 1010.

Figure 11:
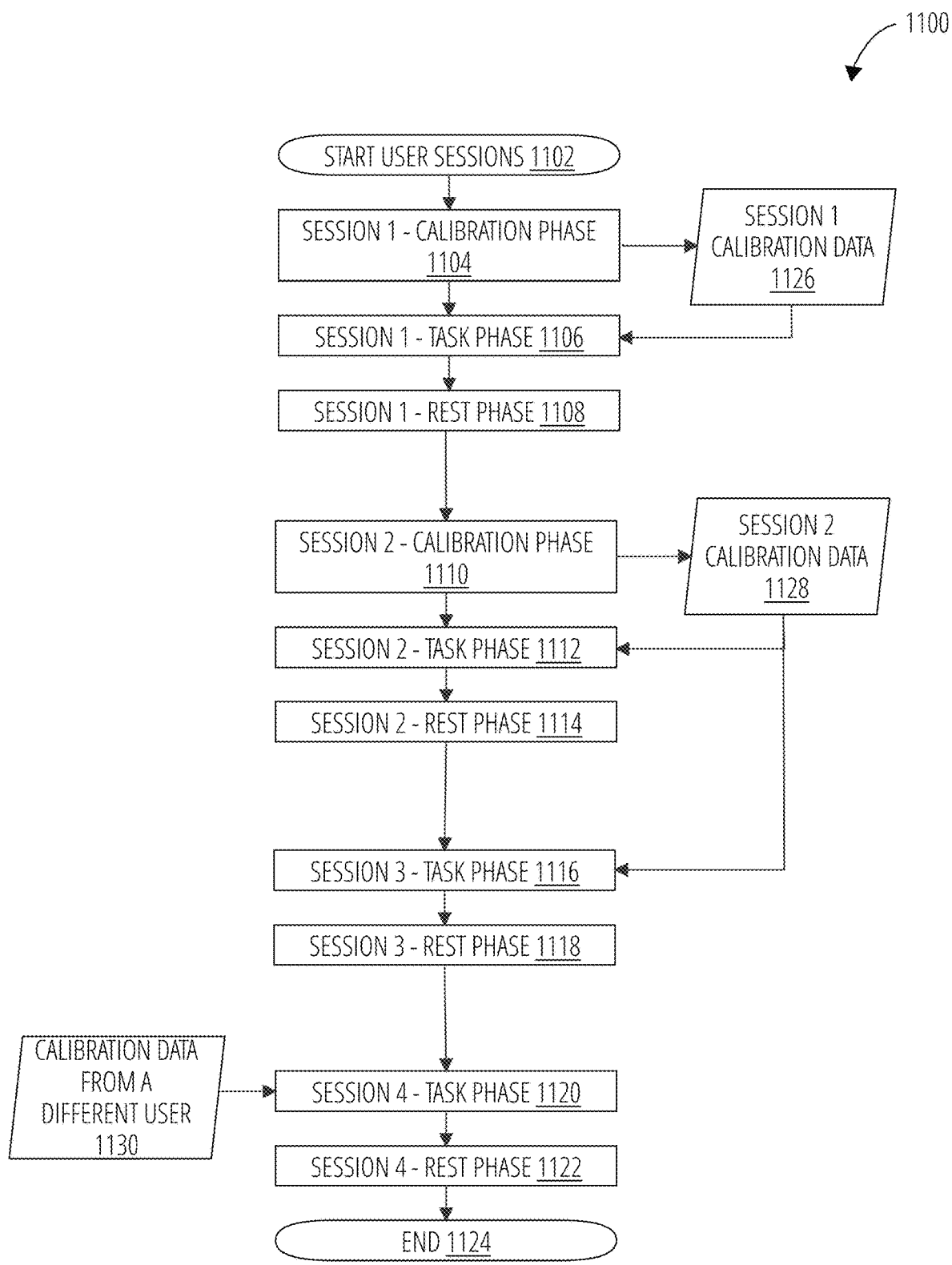
FIG. 11 illustrates an exemplary calibration process 1100 representative of various implementations disclosed herein.

FIG. 11 illustrates an exemplary calibration process 1100 representative of various implementations disclosed herein. The user sessions starts (block 1102) with a session one calibration phase at block 1104 to generate Session 1 calibration data 1126 that is then used during the subsequent first session task phase at block 1106, until progressing to the Session 1 rest phase at block 1108.

The user might temporarily remove the HMD and thereby potentially render the Session 1 calibration data 1126 invalid. With the user again wearing the HMD, a second session calibration phase at block 1110 then commences to generate Session 2 calibration data 1128 that is then used during the subsequent second session task phase at block 1112 until progressing to the session two rest phase at block 1114. If the user does not remove the HMD during this session two rest phase at block 1114—and the session two calibration data is still valid—a third session task phase at block 1116 may then be commenced skipping re-calibration and instead using the Session 2 calibration data 1128 until the session three rest phase at block 1118. During the session three rest phase at block 1118, a new different user may don the HMD, which might otherwise require new re-calibration data. However, if there already exists calibration data from a different user 1130, a fourth session task phase at block 1120 and corresponding rest phase at block 1122 may be commenced using the calibration data from a different user 1130 (in lieu of recalibrating) until the user sessions ends at done block 1124.

The calibration data may be processed for example using the Support Vector regression and/or Gaussian Process regression techniques described previously.

Figure 12:
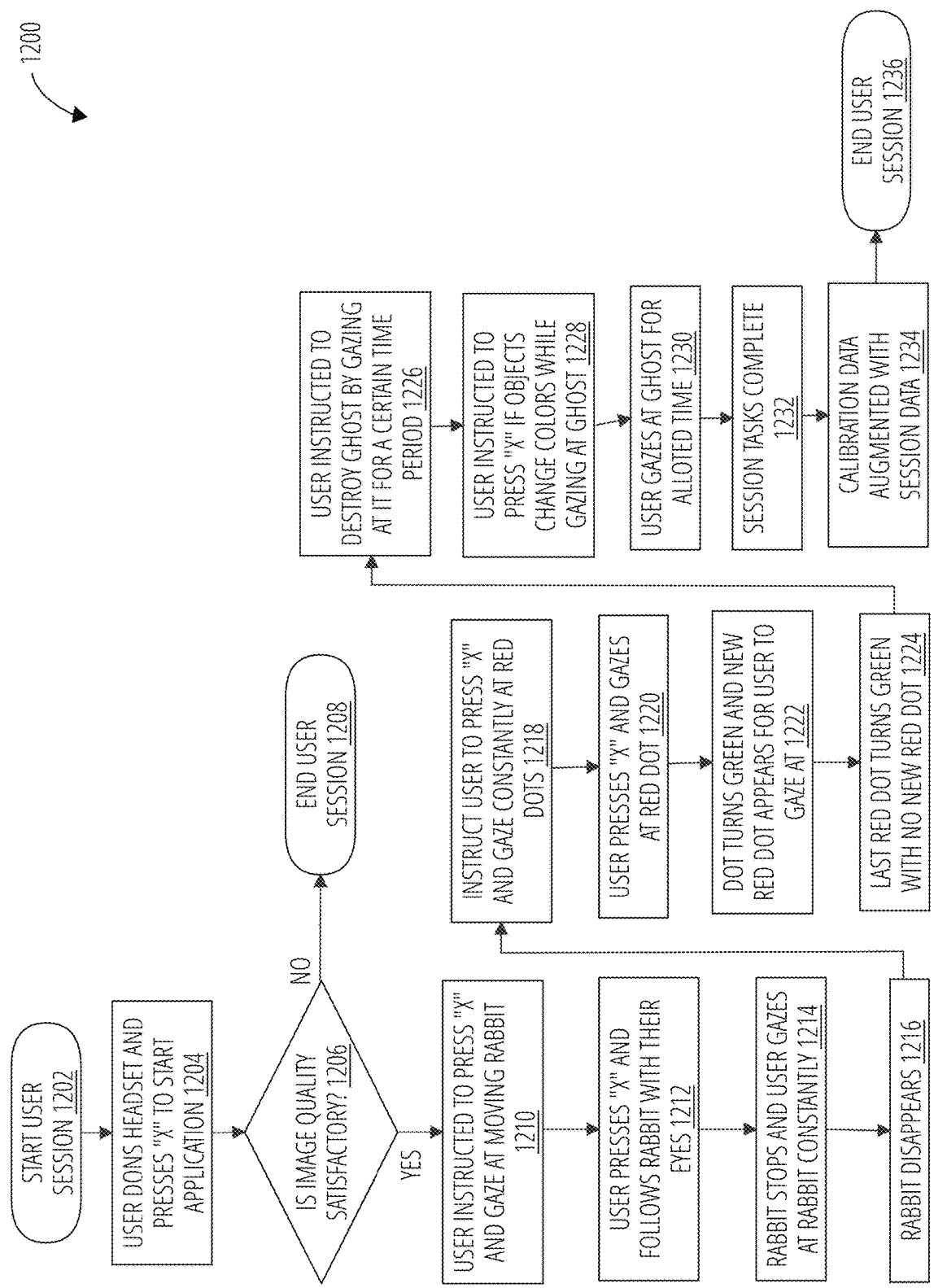
FIG. 12 illustrates an exemplary experimental procedure 1200 representative of various implementations disclosed herein.

FIG. 12 illustrates an exemplary experimental procedure 1200 (or calibration) representative of various implementations disclosed herein. A user session starts at block 1202 with a user donning a headset (block 1204) and pressing "X" (or some other activation control) to start an application operating in conjunction with the headset. At decision block 1206 a determination is then made as to whether the image quality is satisfactory and, if not, the user session ends at done block 1208. Otherwise, at block 1210 the user is instructed to press "X" (or another activation) and gaze at a moving object (e.g., a rabbit) or other target gaze point of known location(s). At block 1212 the user presses "X" (or other activation) and follows the rabbit (or other object) with their eyes. At block 1214, the object stops and the user gazes at the object constantly (that is, continuously) and then, at block 1216, the object disappears. At block 1218 the user is then instructed to press "X" (or another activation) and gaze constantly at a red (or other first color) dot (or other marker), which the user does at block 1220. At block 1222, the marker then turns green (or another color different than the first color) and new red (first color) dot or other marker appears for the user to gaze at. At block 1224 the last red dot (or other marker of the first color) turns green (or other second color) with no new red dot (or other first color marker) displayed and, at block 1226, the user is instructed to destroy an object (e.g., a ghost) by gazing at it for a certain time period. At block 1228, the user is then instructed to press "X" or other activation if the object changes colors while gazing at it. At block 1230, the user gazes at the ghost or other object for an allotted time until, at block 1232, the session tasks are complete and, at block 1234, calibration data is augmented with session data and the session ends at done block 1236.

Figure 13:
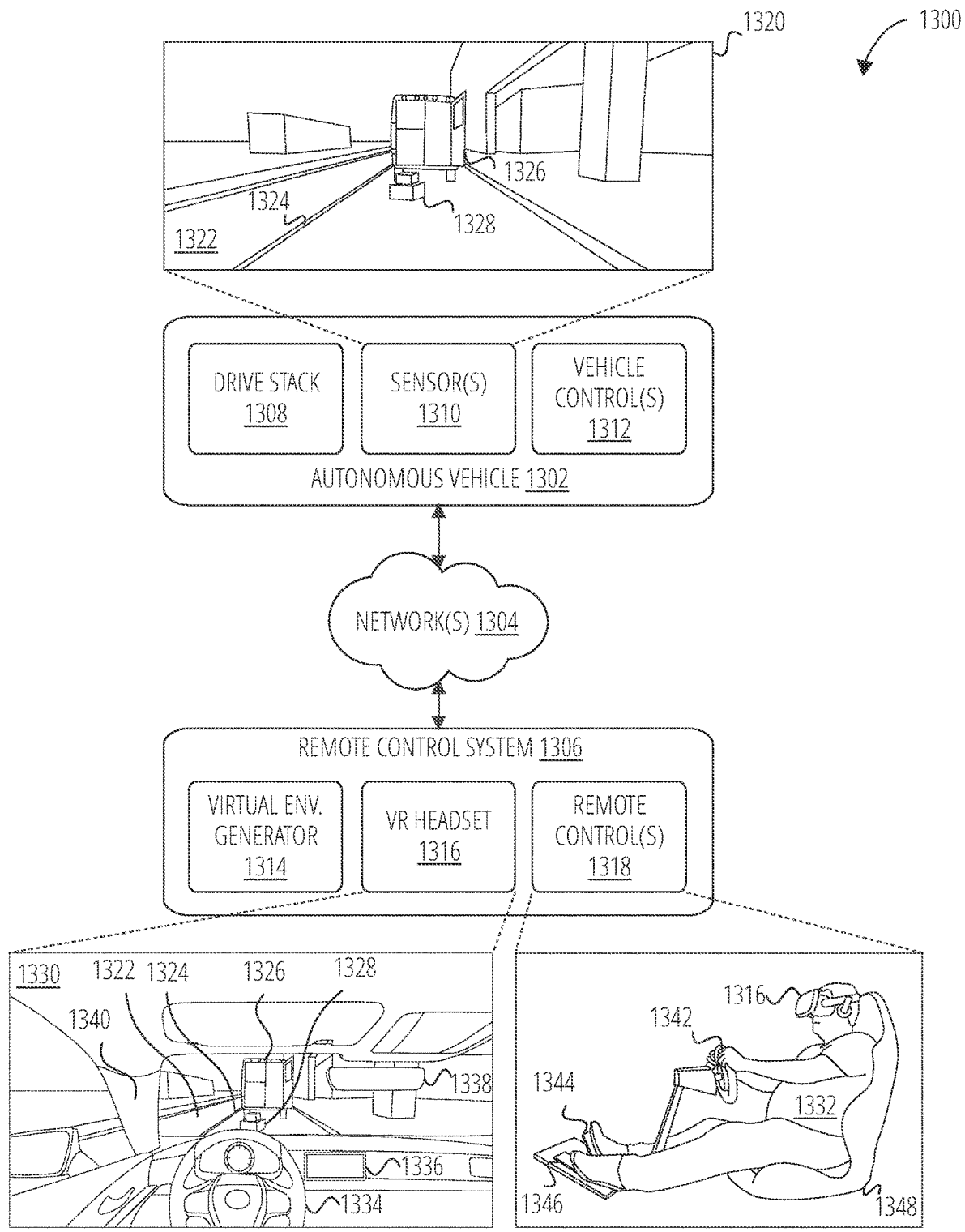
FIG. 13 illustrates an autonomous vehicle control system 1300 in accordance with one embodiment.
Figure 14:
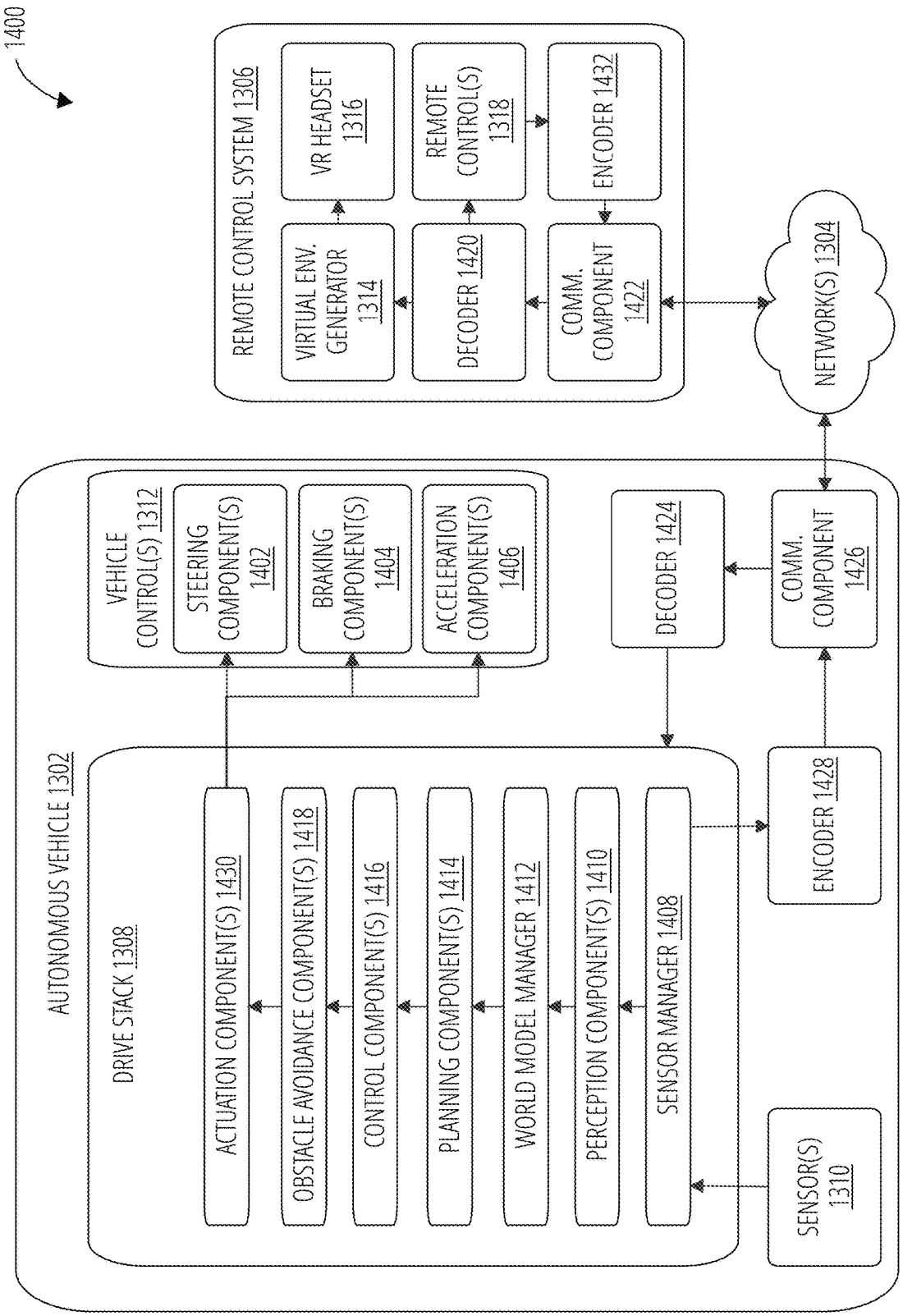
FIG. 14 illustrates an autonomous vehicle control system 1400 in accordance with one embodiment.

FIG. 13 and FIG. 14 are block diagrams of an example autonomous vehicle control system 1300, in accordance with some embodiments of the present disclosure. For example, the VR headset 1316 component may implement aspects of the disclosed embodiments of a head mounted display. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The illustration of FIG. 13 may represent a more generalized illustration of the autonomous vehicle control system 1300 as compared to the illustration of FIG. 14. The components, features, and/or functionality of the autonomous vehicle 1302 described with respect to FIG. 13 and FIG. 14 may be implemented using the features, components, and/or functionality described in more detail herein with respect to FIG. 23-FIG. 26.

The autonomous vehicle control system 1300 may include an autonomous vehicle 1302, one or more network(s) 1304, and a remote control system 1306. The autonomous vehicle 1302 may include a drive stack 1308, sensor(s) 1310, and/or vehicle control(s) 1312. The drive stack 1308 may represent an autonomous driving software stack, as described in more detail herein with respect to FIG. 14. The sensor(s) 1310 may include any number of sensors of the autonomous vehicle 1302, including, with reference to FIGs. FIG. 23-FIG. 26, global navigation satellite system sensor(s) (GNSS sensor(s) 2328), RADAR sensor(s) 2330, ultrasonic sensor(s) 2332, LIDAR sensor(s) 2334, inertial measurement unit sensor(s) (IMU sensor(s) 2336), microphone(s) 2346, stereo camera(s) 2338, wide-view camera(s) 2340, infrared camera(s) 2342, surround camera(s) 2344, long range long-range and/or mid-range camera(s) 2402, and/or other sensor types. The sensor(s) 1310 may generate sensor data (e.g., image data) representing a field(s) of view of the sensor(s) 1310.

For example, the sensor data may represent a field of view of each of a number of cameras of the autonomous vehicle 1302. In some examples, the sensor data may be generated from any number of cameras that may provide a representation of substantially 360 degrees around the autonomous vehicle 1302 (e.g., fields of view that extend substantially parallel to a ground plane). In such an example, the fields of view may include a left side of the autonomous vehicle 1302, a rear of the autonomous vehicle 1302, a front of the autonomous vehicle 1302, and/or a side of the autonomous vehicle 1302. The sensor data may further be generated to include fields of view above and/or below the autonomous vehicle 1302 (e.g., of the ground or driving surface around the autonomous vehicle 1302 and/or of the space above the autonomous vehicle 1302). In some examples, the sensor data may be generated to include blind spots of the autonomous vehicle 1302 (e.g., using wing-mirror mounted camera(s)). As another example, the sensor data may be generated from some or all of the camera(s) illustrated in FIG. 24. As such, the sensor data generated by the autonomous vehicle 1302 may include sensor data from any number of sensors without departing from the scope of the present disclosure.

With reference to FIG. 13, an image 1320 may include a representation of sensor data (e.g., image data) generated from a front-facing camera of the autonomous vehicle 1302. The image 1320 may include a two-way, solid line 1324 divided street 1322, such that the autonomous vehicle 1302, when following the rules of the road, may not be allowed to cross the solid line 1324 to pass a vehicle or object in the lane of the autonomous vehicle 1302. In the image 1320, a van 1326 may be stopped in the lane of the autonomous vehicle 1302 to unload boxes, so the autonomous vehicle 1302 may have come to a stop a safe distance behind the van 1326. By following the constraints of the autonomous vehicle 1302 (e.g., due to the rules of the road), the autonomous vehicle 1302 may, without the features and functionality of the present disclosure, remain stopped behind the van 1326 until the van 1326 moves (or may pass control to a human operator, depending on the embodiment). However, in the current autonomous vehicle control system 1300, the autonomous vehicle 1302 may determine, in response to encountering the situation represented in the image 1320, to transfer at least partial control to the remote control system 1306. In other examples, the determination to transfer the control of the autonomous vehicle 1302 (e.g., to initiate a remote control session) may be made by the remote operator (or otherwise may be made at the remote control system 1306); by a passenger of the autonomous vehicle 1302 (e.g., using a command or signal, such as a voice command, an input to a user interface element, a selection of a physical button, etc.); and/or by another actor. For example, sensor data may be analyzed at the remote control system 1306 (and/or by another system remote from the autonomous vehicle 1302) and may be used to determine whether a remote control session should be initiated.

Although the situation represented in FIG. 13 includes a van 1326 blocking the lane of the autonomous vehicle 1302, this is not intended to be limiting. For example, any number of situations, scenarios, and/or environments, including but not limited to those described herein, may lead to a determination by the autonomous vehicle 1302 to transfer at least partial control to the remote control system 1306 without departing from the scope of the present disclosure. In other examples, the determination may be made by the remote control system 1306 to take over control of the autonomous vehicle 1302. In any examples, proper consent may be obtained from the owner and/or operator of the autonomous vehicle 1302 in order to enable takeover by the remote operator of the remote control system 1306.

In addition to the image 1320, the autonomous vehicle 1302 may also capture additional sensor data from additional sensor(s) 1310 of the autonomous vehicle 1302, such as from a side-view camera(s), a rear-view camera(s), a surround camera(s), a wing-mirror mounted camera(s), a roof-mounted camera(s), parking camera(s) (e.g., with a field(s) of view of the ground surface around the autonomous vehicle 1302), LIDAR sensor(s), RADAR sensor(s), microphone(s), etc. The sensor data generated by the sensor(s) 1310 may be transmitted over the network(s) 1304 to the remote control system 1306. In some examples, the sensor(s) 1310 may generate the sensor data in a first format (e.g., a raw format) that may be of a first data size. In order to minimize bandwidth requirements, the sensor data may be encoded in a second format that may be of a second data size less than the first data size (e.g., to decrease the amount of data being sent over the network(s) 1304).

In addition to the sensor data that may be used to generate a representation of the environment of the autonomous vehicle 1302, vehicle state data (e.g., representative of the state of the autonomous vehicle 1302) and/or calibration data (e.g., for calibrating the remote control(s) 1318 according to the vehicle control(s) 1312) may also be transmitted over the network(s) 1304 to the remote control system 1306. For example, the vehicle state data and/or the calibration data may be determined using one or more sensor(s) 1310 of the autonomous vehicle 1302, such as the steering sensor(s) 740, speed sensor(s) 2314, brake sensor(s), IMU sensor(s) 2336, GNSS sensor(s) 2328, and/or other sensor(s) 1310. The vehicle state data may include wheel angles, steering wheel angle, location, gear (e.g., Park, Reverse, Neutral, Drive (PRND)), tire pressure, speed, velocity, orientation, etc. The calibration data may include steering sensitivity, braking sensitivity, acceleration sensitivity, etc. In some examples, the calibration data may be determined based on a make, model, or type of the autonomous vehicle 1302. This information may be encoded in the calibration data by the autonomous vehicle 1302 and/or may be determined by the remote control system 1306, such as by accessing one or more data stores (e.g., after determining identification information for the autonomous vehicle 1302).

The sensor data, the vehicle state data, and/or the calibration data may be received by the remote control system 1306 over the network(s) 1304. The network(s) 1304 may include one or more network types, such as cellular networks (e.g., 5G, 4G, LTE, etc.), Wi-Fi networks (e.g., where accessible), low power wide-area networks (LPWANs) (e.g., LoRaWAN, SigFox, etc.), and/or other network types. In some examples, the autonomous vehicle 1302 may include one or more modems and/or one or more antennas for redundancy and/or for communicating over different network types depending on network availability.

The remote control system 1306 may include a virtual environment generator 1314, a VR headset 1316, and a remote control(s) 1318. The virtual environment generator 1314 may use the sensor data, the vehicle state data, and/or the calibration data to generate a virtual environment that may represent the environment (e.g., the real-world or physical environment, such as the ground surface, the vehicles, the people or animals, the buildings, the objects, etc.) in the field(s) of view of the sensor(s) 1310 of the autonomous vehicle 1302 (e.g., the camera(s), the LIDAR sensor(s), the RADAR sensor(s), etc.), as well as represent at least a portion of the autonomous vehicle 1302 (e.g., an interior, an exterior, components, features, displays, instrument panels, etc.) and/or controls of the autonomous vehicle 1302 (e.g., a virtual steering wheel, a virtual brake pedal, a virtual gas pedal, a virtual blinker, a virtual HMI display, etc.). In some examples, the virtual environment may include virtual representations of portions of the autonomous vehicle 1302 that may not be visible to a driver or passenger of the autonomous vehicle 1302 in the real-world environment, such as the wheels at an angle (e.g., corresponding to the angle of the wheels of the autonomous vehicle 1302 in the real-world environment as determined by the vehicle state data and/or the calibration data), which may be viewable from within a virtual cockpit of the virtual vehicle by making one or more other components of the virtual vehicle fully transparent, semi-transparent (e.g., translucent), or removed from the rendering altogether.

Figure 15:
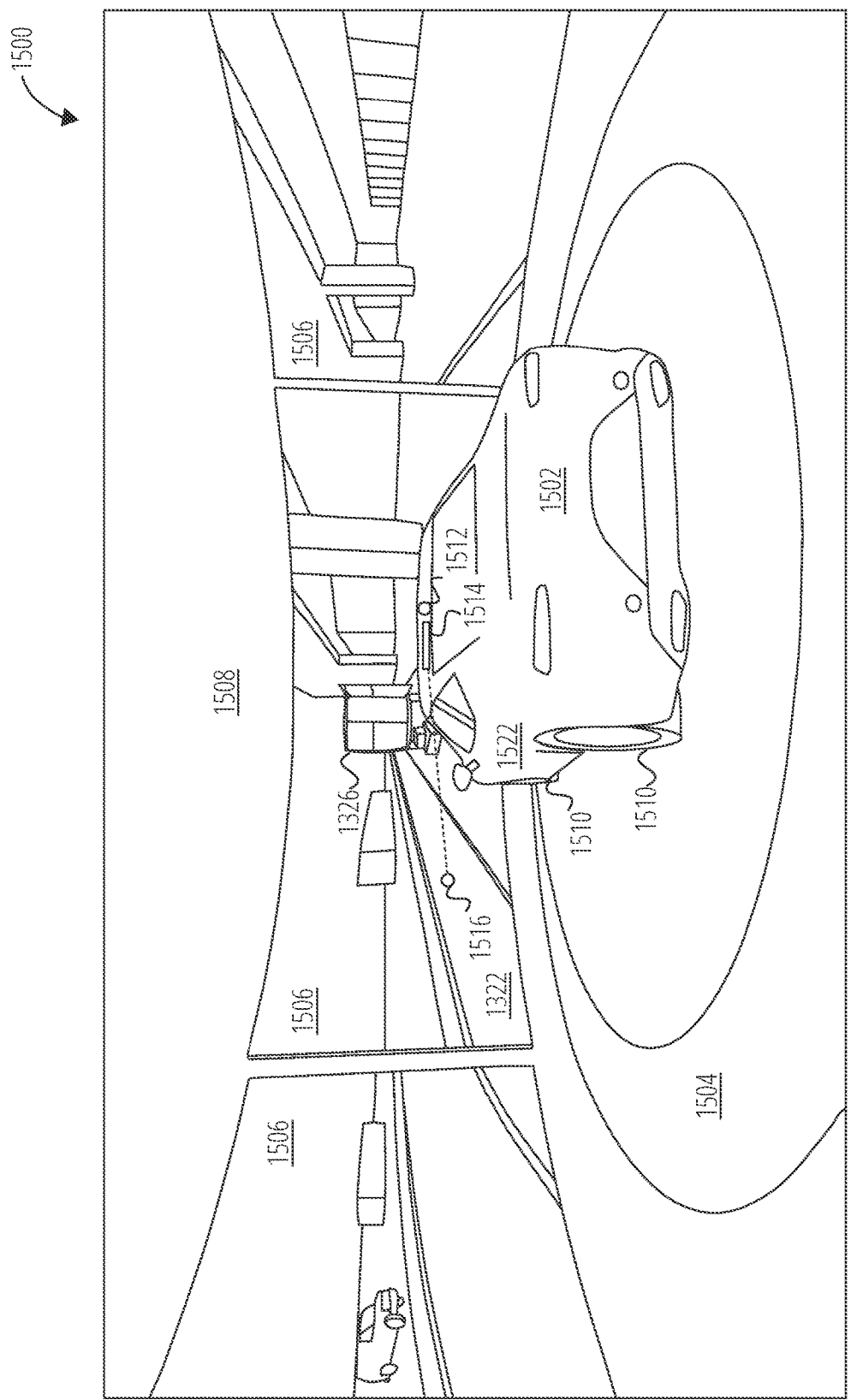
FIG. 15 illustrates a virtual environment 1500 in accordance with one embodiment.
Figure 16:
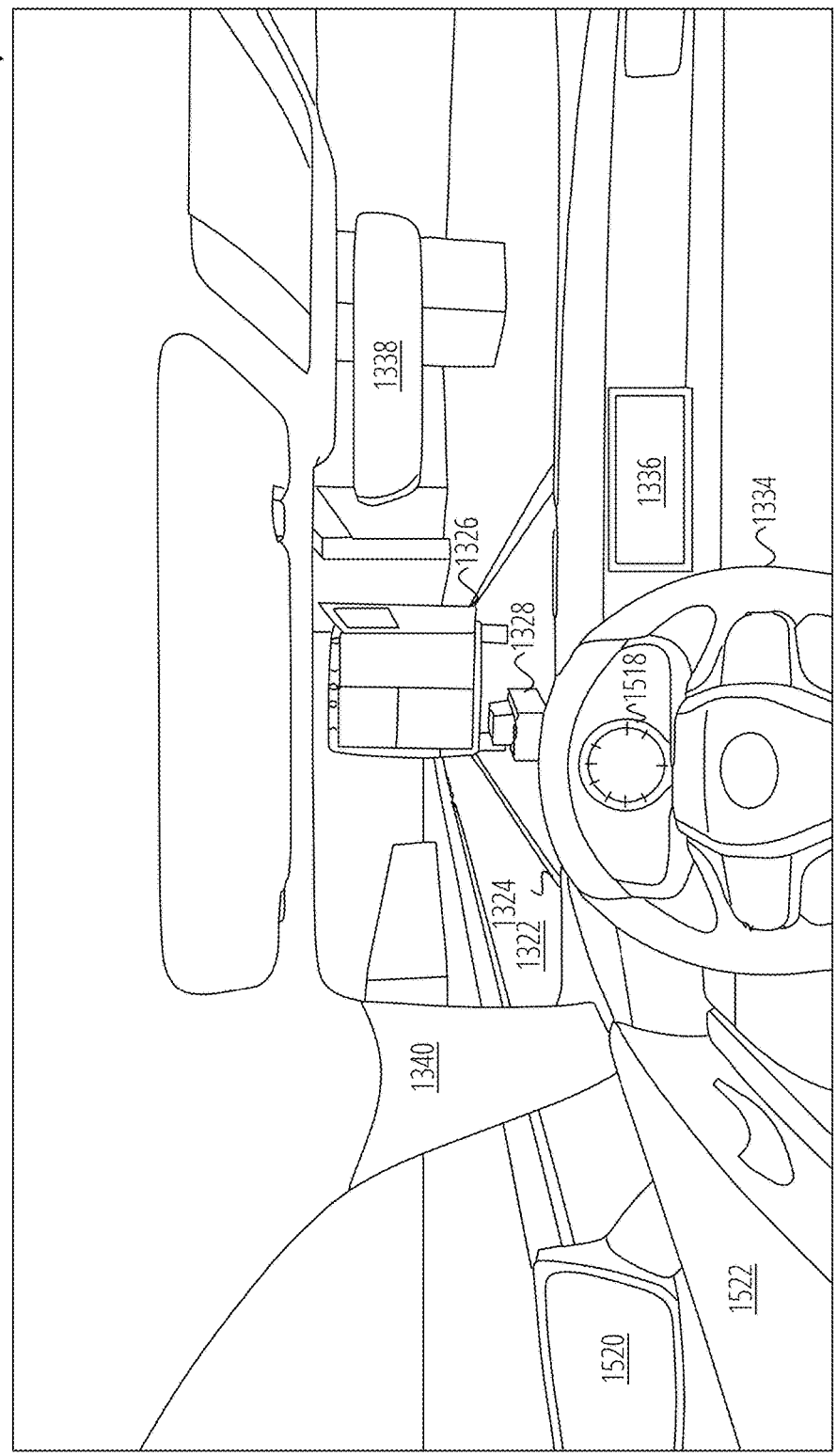
FIG. 16 illustrates a virtual environment 1600 in accordance with one embodiment.

The virtual environment may be generated from any number of vantage points of a remote operator. As non-limiting examples, the virtual environment may be generated from a vantage point within a driver's seat of the virtual vehicle (e.g., as illustrated in FIG. 16); from within another location within the virtual vehicle; and from a position outside of the virtual vehicle (e.g., as illustrated in FIG. 15), such as on top of the virtual vehicle, to the side of the virtual vehicle, behind the virtual vehicle, above the virtual vehicle, etc. In some examples, the remote operator may be able to select from any number of different vantage points and/or may be able to transition between different vantage points, even in the same remote control session. For example, the remote operator may start a remote control session from a first vantage point inside the cockpit of the virtual vehicle (e.g., in the driver's seat), and then, when navigating through a tight space or around an obstacle, may transition to a second vantage point outside of the virtual vehicle where the relationship between the tight space or the obstacle and the virtual vehicle may be more clearly visualized. In any example, the desired vantage point of the remote operator may be selectable within the remote control system. The remote operator may be able to set defaults or preferences with respect to vantage points.

The remote operator may be able to set defaults and/or preferences with respect to other information in the virtual environment, such as the representations of information that the remote operator would like to have available within the virtual environment, or more specifically with respect to the virtual vehicle in the virtual environment (e.g., the remote operator may select which features of the instrument panel should be populated, what should be displayed on a virtual HMI display, which portions of the vehicle should be transparent and/or removed, what color the virtual vehicle should be, what color the interior should be, etc.). As such, the remote operator may be able to generate a custom version of the virtual vehicle within the virtual environment. In any example, even where the virtual vehicle is not the same year, make, model, and/or type as the autonomous vehicle 1302 in the real-world environment, the virtual vehicle may be scaled to occupy a substantially similar amount of space in the virtual environment as the autonomous vehicle 1302 in the real-world environment. As such, even when the virtual vehicle is of a different size or shape as the vehicle 102, the representation of the virtual vehicle may provide a more direct visualization to the remote operator of the amount of space the autonomous vehicle 1302 occupies in the real-world environment.

In other examples, the virtual vehicle may be generated according to the year, make, model, type, and/or other information of the autonomous vehicle 1302 in the real-world environment (e.g., if the autonomous vehicle 1302 is a Year N (e.g. 2019), Make X, and Model Y, the virtual vehicle may represent a vehicle with the dimensions, and steering/driving profiles consistent with a Year N, Make X, Model Y vehicle). In such examples, the remote operator may still be able to customize the virtual vehicle, such as by removing or making transparent certain features, changing a color, changing an interior design, etc., but, in some examples, may not be able to customize the general shape or size of the vehicle.

The virtual environment (e.g., virtual environment 1330) may be rendered and displayed on a display of the VR headset 1316 of the remote operator (e.g., remote operator 1332). The virtual environment 1330 may represent a virtual vehicle—that may correspond to the autonomous vehicle 1302—from a vantage point of the driver's seat. The virtual environment 1330 may include a representation of what a passenger of the autonomous vehicle 1302 may see when sitting in the driver's seat. The camera(s) or other sensor(s) 1310 may not capture the sensor data from the same perspective of a passenger or driver of the vehicle. As a result, in order to generate the virtual environment 1330 (or other virtual environments where the vantage point does not directly correspond to a field(s) of view of the sensor(s)), the sensor data may be manipulated. For example, the sensor data may be distorted or warped, prior to displaying the rendering on the display of the VR headset 1316. In some examples, distorting or warping the sensor data may include performing a fisheye reduction technique on one more of the sensor data feeds (e.g., video feeds from one or more camera(s)). In other examples, distorting or warping the sensor data may include executing a positional warp technique to adjust a vantage point of a sensor data feed to a desired vantage point. In such an example, such as where a camera(s) is roof-mounted on the autonomous vehicle 1302, a positional warp technique may be used to adjust, or bring down, the image data feed from roof-level of the camera(s) to eye-level of a virtual driver of the virtual vehicle (e.g., the remote operator).

In examples, the sensor data may be manipulated in order to blend or stitch sensor data corresponding to different fields of view of different sensors. For example, two or more sensors may be used to generate the representation of the environment (e.g., a first camera with a first field of view to the front of the autonomous vehicle 1302, a second camera with a second field of view to a left side of the autonomous vehicle 1302, and so on). In such examples, image or video stitching techniques may be used to stitch together or combine sensor data, such as images or video, to generate a field of view (e.g., 360 degrees) for the remote operator with virtually seamless transitions between fields of view represented by the different sensor data from different sensor(s) 1310. In one or more example embodiments, the sensor data may be manipulated and presented to the remote operator in a 3D visualization (e.g., stereoscopically). For example, one or more stereo camera(s) 2338 of the autonomous vehicle 1302 may generate images, and the images may be used (e.g., using one or more neural networks, using photometric consistency, etc.) to determine depth (e.g., along a Z-axis) for portions of the real-world environment that correspond to the images. As such, the 3D visualization may be generated using the stereoscopic depth information from the stereo camera(s) 2338. In other examples, the depth information may be generated using LIDAR sensors, RADAR sensors, and/or other sensors of the autonomous vehicle 1302. In any example, the depth information may be leveraged to generate the 3D visualization for display or presentation to the remote operator within the virtual environment. In such examples, some or all of rendering or display of the virtual environment to the remote operator may include a 3D visualization.

In some examples, because the autonomous vehicle 1302 may be an autonomous vehicle capable of operating at autonomous driving level 5 (e.g., fully autonomous driving), the autonomous vehicle 1302 may not include a steering wheel. However, even in such examples, the virtual vehicle may include the steering wheel 1334 (e.g., in a position relative to a driver's seat, if the autonomous vehicle 1302 had a driver's seat) in order to provide the remote operator 1332 a natural point of reference for controlling the virtual vehicle. In addition to the steering wheel 1334, the interior of the virtual vehicle may include a rear-view mirror 1338 (which may be rendered to display image data representative of a field(s) of view of a rear-facing camera(s)), wing mirrors (which may be rendered to display image data representative of field(s) of view of side-view camera(s), wing-mounted camera(s), etc.), a virtual HMI display 1336, door handles, doors, a roof, a sunroof, seats, consoles, and/or other portions of the virtual vehicle (e.g., based on default settings, based on preferences of the remote operator, and/or preferences of another user(s) of the remote control system 1306, etc.).

As described herein, at least some of the portions of the virtual vehicle may be made at least partially transparent and/or be removed from the virtual environment. An example is support column 1340 of the vehicle chassis being at least partially transparent and/or removed from the virtual vehicle, such that objects and the surface in the virtual environment are not occluded or at least less occluded by the support column 1340. Examples of the virtual environment 1330 are described in more detail herein with respect to FIG. 16.

The instance of the virtual environment 1330 in FIG. 13 (and correspondingly, FIG. 16) may represent a time that the image 1320 was captured by the autonomous vehicle 1302, and thus may include, as viewed through a windshield of the virtual vehicle, virtual representations of the van 1326, the unloaded boxes 1328, the divided street 1322, and the solid line 1324. In some examples, such as in the virtual environment 1330, each of the virtual objects in the virtual environment may be rendered relative to the virtual vehicle to correspond to the relative location of the objects in the real-world environment with respect to the autonomous vehicle 1302 (e.g., using depth information from the sensor data). The virtual representations of the image data may include the images or video from the image data, rendered within the virtual environment. As described herein, the virtual environment may be rendered from any of a number of different vantage points (including those illustrated in FIG. 15-FIG. 16), and the virtual environment 1330 is only one, non-limiting example of a virtual environment.

The remote operator 1332 may use the remote control(s) 1318 to control the virtual vehicle in the virtual environment. The remote control(s) 1318 may include a steering wheel 1342 (or other control(s) for providing steering inputs, such as keyboards, joysticks, handheld controllers, etc.), an acceleration component 1344 (which may be a physical pedal as illustrated in FIG. 13, or may be a keyboard, a joystick, a handheld controller, a button, etc.), a braking component 1346 (which may be a physical pedal as illustrated in FIG. 13, or may be a keyboard, a joystick, a handheld controller, a button, etc.), and/or other control components, such as blinker actuators (which may be physical levers, or may be controlled using a keyboard, a joystick, a handheld controller, voice, etc.), a horn, light actuators (such as a button, lever, or knob for turning on and off lights, including driving lights, fog lights, high-beams, etc.), etc.

In some examples, the remote control(s) may include pointers (e.g., controllers or other objects) that may be used to indicate or identify a location in the environment that the virtual vehicle should navigate to. In such examples, the remote control(s) 1318 may be used to provide input to the autonomous vehicle 1302 as to where in the real-world environment the autonomous vehicle 1302 should navigate, and the autonomous vehicle 1302 may use this information to generate controls for navigating to the location. For example, with respect to the image 1320, the remote operator 1332 may point to a location in the lane to the left of the autonomous vehicle 1302 and the van 1326, such that the autonomous vehicle 1302 is able to use the information to override the rules of the road that have stopped the vehicle from passing the van 1326, and to proceed to the adjacent lane in order to pass the van 1326 and the unloaded boxes 1328. More detail is provided herein for control input types with respect to FIG. 14.

In any example, the remote operator 1332 may control the virtual vehicle through the virtual environment 1330, and the control inputs to the remote control(s) 1318 may be captured. Control data representative of each of the control inputs (e.g., as they are received by the remote control system 1306) may be transmitted to the autonomous vehicle 1302 over the network(s) 1304. In some examples, as described in more detail herein, the control data may be encoded by the remote control system 1306 prior to transmission and/or may be encoded upon receipt by the autonomous vehicle 1302. The encoding may be to convert the control data from the remote control system 1306 to vehicle control data suitable for use by the autonomous vehicle 1302. The control data may be scaled, undergo a format change, and/or other encoding may be executed to convert the control data to vehicle control data that the autonomous vehicle 1302 understands and can execute. As a result, as the remote operator 1332 controls the virtual vehicle through the virtual environment, the autonomous vehicle 1302 may be controlled through the real-world environment accordingly. With respect to the image 1320 and the virtual environment 1330, the remote operator 1332 may control the virtual vehicle to navigate around the virtual representation of the van 1326 by entering the adjacent lane of the divided street 1322 to the left of the van 1326, passing the van 1326, and then reentering the original lane. Responsive to the input controls from the remote operator 1332, the autonomous vehicle 1302 may, at substantially the same time, navigate around the van 1326 by entering the adjacent lane of the divided street 1322 in the real-world environment, proceeding past the van 1326, and then reentering the original lane of the divided street 1322.

In some examples, such as depending on the preferences of the owner and/or operator of the autonomous vehicle 1302, a remote control session may be substantially seamless to any passengers of the vehicle 102, such that the passengers may not be made aware or notice the transfer of control to the remote control system 1306 and then back to the autonomous vehicle 1302. In other examples, further depending on the preferences of the owner and/or operator, the passengers of the vehicle may be informed prior to and/or during the time when the control is passed to the remote control system 1306. For example, the remote control system 1306 may include a microphone(s) and/or a speaker(s) (e.g., headphones, standalone speakers, etc.), and the autonomous vehicle 1302 may include a microphone(s) and/or a speaker(s), such that one-way or two-way communication may take place between the passengers and the remote operator 1332. In such examples, once control is passed back to the autonomous vehicle 1302, the passengers may again be made aware of the transition.

Now referring to FIG. 14, FIG. 14 may include a more detailed illustration of the autonomous vehicle control system 1300 of FIG. 13. The autonomous vehicle 1302 may include the drive stack 1308, which may include a sensor manager 1408, perception component(s) 1410 (e.g., corresponding to a perception layer of the drive stack 1308), a world model manager 1412, planning component(s) 1414 (e.g., corresponding to a planning layer of the drive stack 1308), control component(s) 1416 (e.g., corresponding to a control layer of the drive stack 1308), obstacle avoidance component(s) (e.g., corresponding to an obstacle or collision avoidance layer of the drive stack 1308), actuation component(s) 1430 (e.g., corresponding to an actuation layer of the drive stack 1308), and/or other components corresponding to additional and/or alternative layers of the drive stack 1308.

The sensor manager 1408 may manage and/or abstract sensor data from sensor(s) 1310 of the autonomous vehicle 1302. For example, and with reference to FIG. 25, the sensor data may be generated (e.g., perpetually, at intervals, based on certain conditions) by GNSS sensor(s) 2328, RADAR sensor(s) 2330, ultrasonic sensor(s) 2332, LIDAR sensor(s) 2334, IMU sensor(s) 2336, microphone(s) 2346, stereo camera(s) 2338, wide-view camera(s) 2340, infrared camera(s) 2342, surround camera(s) 2344, long range long-range and/or mid-range camera(s) 2402, and/or other sensor types.

The sensor manager 1408 may receive the sensor data from the sensors in different formats (e.g., sensors of the same type, such as LIDAR sensors, may output sensor data in different formats), and may be configured to convert the different formats to a uniform format (e.g., for each sensor of the same type). As a result, other components, features, and/or functionality of the autonomous vehicle 1302 may use the uniform format, thereby simplifying processing of the sensor data. In some examples, the sensor manager 1408 may use a uniform format to apply control back to the sensors of the autonomous vehicle 1302, such as to set frame rates or to perform video gain control. The sensor manager 1408 may also update sensor packets or communications corresponding to the sensor data with timestamps to help inform processing of the sensor data by various components, features, and functionality of the autonomous vehicle control system 1300.

A world model manager 1412 may be used to generate, update, and/or define a world model. The world model manager 1412 may use information generated by and received from the perception component(s) 1410 of the drive stack 1308. The perception component(s) 1410 may include an obstacle perceiver, a path perceiver, a wait perceiver, a map perceiver, and/or other perception component(s) 1410. For example, the world model may be defined, at least in part, based on affordances for obstacles, paths, and wait conditions that can be perceived in real-time or near real-time by the obstacle perceiver, the path perceiver, the wait perceiver, and/or the map perceiver. The world model manager 1412 may continually update the world model based on newly generated and/or received inputs (e.g., data) from the obstacle perceiver, the path perceiver, the wait perceiver, the map perceiver, and/or other components of the autonomous vehicle control system 1300.

The world model may be used to help inform planning component(s) 1414, control component(s) 1416, obstacle avoidance component(s) 1418, and/or actuation component(s) 1430 of the drive stack 1308. The obstacle perceiver may perform obstacle perception that may be based on where the autonomous vehicle 1302 is allowed to drive or is capable of driving, and how fast the autonomous vehicle 1302 can drive without colliding with an obstacle (e.g., an object, such as a structure, entity, vehicle, etc.) that is sensed by the sensor(s) 1310 of the autonomous vehicle 1302.

The path perceiver may perform path perception, such as by perceiving nominal paths that are available in a particular situation. In some examples, the path perceiver may further take into account lane changes for path perception. A lane graph may represent the path or paths available to the autonomous vehicle 1302, and may be as simple as a single path on a highway on-ramp. In some examples, the lane graph may include paths to a desired lane and/or may indicate available changes down the highway (or other road type), or may include nearby lanes, lane changes, forks, turns, cloverleaf interchanges, merges, and/or other information.

The wait perceiver may be responsible to determining constraints on the autonomous vehicle 1302 as a result of rules, conventions, and/or practical considerations. For example, the rules, conventions, and/or practical considerations may be in relation to traffic lights, multi-way stops, yields, merges, toll booths, gates, police or other emergency personnel, road workers, stopped busses or other vehicles, one-way bridge arbitrations, ferry entrances, etc. In some examples, the wait perceiver may be responsible for determining longitudinal constraints on the autonomous vehicle 1302 that require the vehicle to wait or slow down until some condition is true. In some examples, wait conditions arise from potential obstacles, such as crossing traffic in an intersection, that may not be perceivable by direct sensing by the obstacle perceiver, for example (e.g., by using sensor data from the sensor(s) 1310, because the obstacles may be occluded from field of views of the sensor(s) 1310). As a result, the wait perceiver may provide situational awareness by resolving the danger of obstacles that are not always immediately perceivable through rules and conventions that can be perceived and/or learned. Thus, the wait perceiver may be leveraged to identify potential obstacles and implement one or more controls (e.g., slowing down, coming to a stop, etc.) that may not have been possible relying solely on the obstacle perceiver.

The map perceiver may include a mechanism by which behaviors are discerned, and in some examples, to determine specific examples of what conventions are applied at a particular locale. For example, the map perceiver may determine, from data representing prior drives or trips, that at a certain intersection there are no U-turns between certain hours, that an electronic sign showing directionality of lanes changes depending on the time of day, that two traffic lights in close proximity (e.g., barely offset from one another) are associated with different roads, that in Rhode Island, the first car waiting to make a left turn at traffic light breaks the law by turning before oncoming traffic when the light turns green, and/or other information. The map perceiver may inform the autonomous vehicle 1302 of static or stationary infrastructure objects and obstacles. The map perceiver may also generate information for the wait perceiver and/or the path perceiver, for example, such as to determine which light at an intersection has to be green for the autonomous vehicle 1302 to take a particular path.

Figure 26:
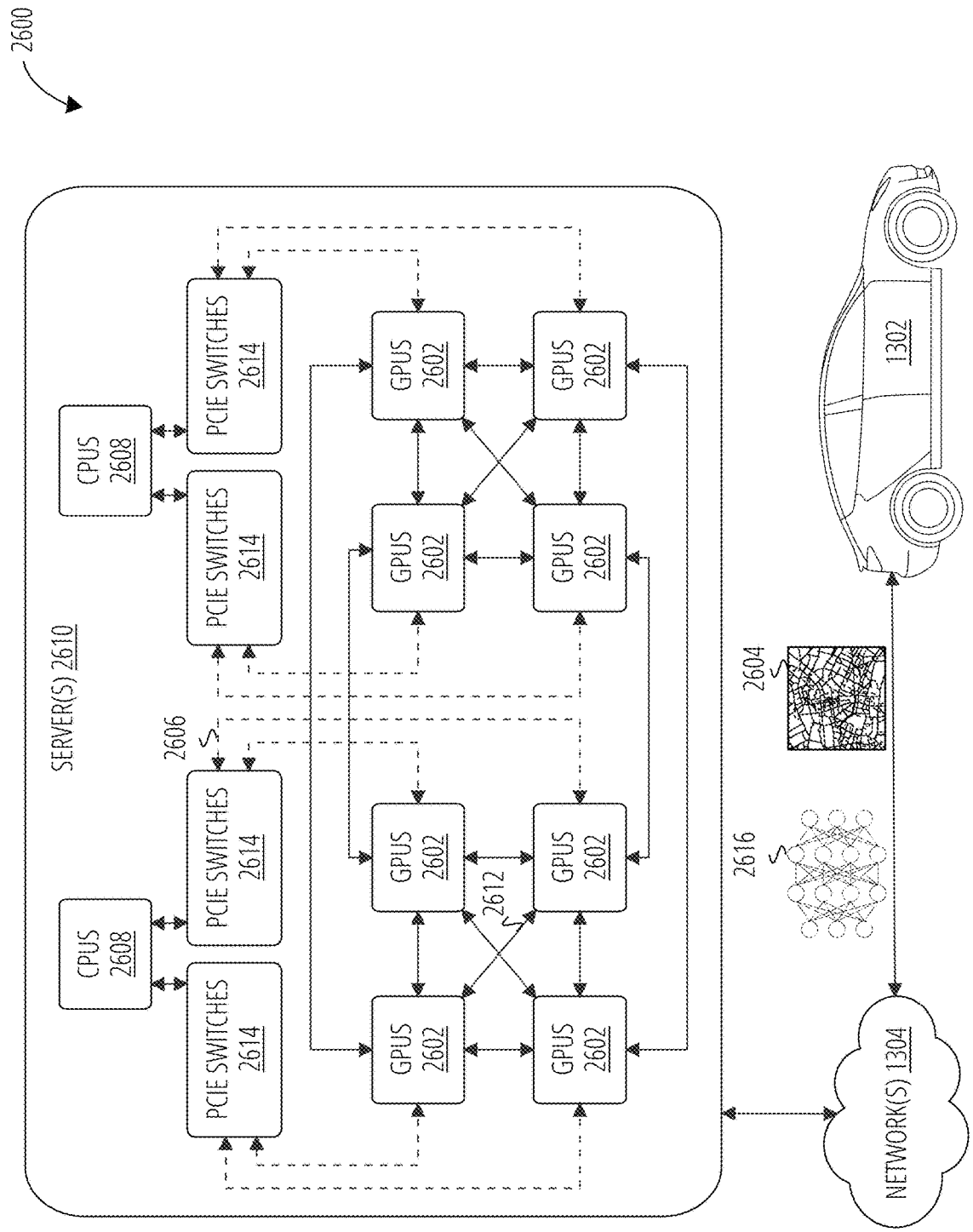
FIG. 26 illustrates a system 2600 in accordance with one embodiment.

In some examples, information from the map perceiver may be sent, transmitted, and/or provided to server(s) (e.g., to a map manager of server(s) 2610 of FIG. 26), and information from the server(s) may be sent, transmitted, and/or provided to the map perceiver and/or a localization manager of the autonomous vehicle 1302. The map manager may include a cloud mapping application that is remotely located from the autonomous vehicle 1302 and accessible by the autonomous vehicle 1302 over the network(s) 1304. For example, the map perceiver and/or the localization manager of the autonomous vehicle 1302 may communicate with the map manager and/or one or more other components or features of the server(s) to inform the map perceiver and/or the localization manager of past and present drives or trips of the autonomous vehicle 1302, as well as past and present drives or trips of other vehicles. The map manager may provide mapping outputs (e.g., map data) that may be localized by the localization manager based on a particular location of the autonomous vehicle 1302, and the localized mapping outputs may be used by the world model manager 1412 to generate and/or update the world model.

In any example, when a determination is made, based on information from the path perceiver, the wait perceiver, the map perceiver, the obstacle perceiver, and/or another component of the perception component(s) 1410, that prevents the autonomous vehicle 1302 from proceeding through a certain situation, scenario, and/or environment, at least partial control may be transferred to the remote control system 1306. In some examples, the passengers of the autonomous vehicle 1302 may be given an option to wait until the autonomous vehicle 1302 is able to proceed based on internal rules, conventions, standards, constraints, etc., or to transfer the control to the remote control system 1306 to enable the remote operator to navigate the autonomous vehicle 1302 through the situation, scenario, and/or environment. The remote operator 1332, once given control, may provide control inputs to the remote control(s) 1318, and the autonomous vehicle 1302 may execute vehicle controls corresponding to the control inputs that are understandable to the autonomous vehicle 1302.

The planning component(s) 1414 may include a route planner, a lane planner, a behavior planner, and a behavior selector, among other components, features, and/or functionality. The route planner may use the information from the map perceiver, the map manager, and/or the localization manger, among other information, to generate a planned path that may consist of GNSS waypoints (e.g., GPS waypoints). The waypoints may be representative of a specific distance into the future for the autonomous vehicle 1302, such as a number of city blocks, a number of kilometers/miles, a number of meters/feet, etc., that may be used as a target for the lane planner.

The lane planner may use the lane graph (e.g., the lane graph from the path perceiver), object poses within the lane graph (e.g., according to the localization manager), and/or a target point and direction at the distance into the future from the route planner as inputs. The target point and direction may be mapped to the best matching drivable point and direction in the lane graph (e.g., based on GNSS and/or compass direction). A graph search algorithm may then be executed on the lane graph from a current edge in the lane graph to find the shortest path to the target point.

The behavior planner may determine the feasibility of basic behaviors of the autonomous vehicle 1302, such as staying in the lane or changing lanes left or right, so that the feasible behaviors may be matched up with the most desired behaviors output from the lane planner. For example, if the desired behavior is determined to not be safe and/or available, a default behavior may be selected instead (e.g., default behavior may be to stay in lane when desired behavior or changing lanes is not safe).

The control component(s) 1416 may follow a trajectory or path (lateral and longitudinal) that has been received from the behavior selector of the planning component(s) 1414 as closely as possible and within the capabilities of the autonomous vehicle 1302. In some examples, the remote operator may determine the trajectory or path, and may thus take the place of or augment the behavior selector. In such examples, the remote operator may provide controls that may be received by the control component(s) 1416, and the control component(s) may follow the controls directly, may follow the controls as closely as possible within the capabilities of the vehicle, or may take the controls as a suggestion and determine, using one or more layers of the drive stack 1308, whether the controls should be executed or whether other controls should be executed.

The control component(s) 1416 may use tight feedback to handle unplanned events or behaviors that are not modeled and/or anything that causes discrepancies from the ideal (e.g., unexpected delay). In some examples, the control component(s) 1416 may use a forward prediction model that takes control as an input variable, and produces predictions that may be compared with the desired state (e.g., compared with the desired lateral and longitudinal path requested by the planning component(s) 1414). The control(s) that minimize discrepancy may be determined.

Although the planning component(s) 1414 and the control component(s) 1416 are illustrated separately, this is not intended to be limiting. For example, in some embodiments, the delineation between the planning component(s) 1414 and the control component(s) 1416 may not be precisely defined. As such, at least some of the components, features, and/or functionality attributed to the planning component(s) 1414 may be associated with the control component(s) 1416, and vice versa.

The obstacle avoidance component(s) 1418 may aid the autonomous vehicle 1302 in avoiding collisions with objects (e.g., moving and stationary objects). The obstacle avoidance component(s) 1418 may include a computational mechanism at a "primal level" of obstacle avoidance that may act as a "survival brain" or "reptile brain" for the autonomous vehicle 1302. In some examples, the obstacle avoidance component(s) 1418 may be used independently of components, features, and/or functionality of the autonomous vehicle 1302 that is required to obey traffic rules and drive courteously. In such examples, the obstacle avoidance component(s) may ignore traffic laws, rules of the road, and courteous driving norms in order to ensure that collisions do not occur between the autonomous vehicle 1302 and any objects. As such, the obstacle avoidance layer may be a separate layer from the rules of the road layer, and the obstacle avoidance layer may ensure that the autonomous vehicle 1302 is only performing safe actions from an obstacle avoidance standpoint. The rules of the road layer, on the other hand, may ensure that vehicle obeys traffic laws and conventions, and observes lawful and conventional right of way (as described herein).

In some examples, when controls are received from the remote control system 1306, the obstacle avoidance component(s) 1418 may analyze the controls to determine whether implementing the controls would cause a collision or otherwise not result in a safe or permitted outcome. In such an example, when it is determined that the controls may not be safe, or may result in a collision, the controls may be aborted or discarded, and the autonomous vehicle 1302 may implement a safety procedure to get the autonomous vehicle 1302 to a safe operating condition. The safety procedure may include coming to a complete stop, pulling to the side of the road, slowing down until a collision is no longer likely or imminent, and/or another safety procedure. In examples, when controls from the remote control system 1306 are determined to be unsafe, control by the remote control system 1306 may be transferred, at least temporarily, back to the autonomous vehicle 1302.

In some examples, such as the example in FIG. 14, the obstacle avoidance component(s) 1418 may be located after the control component(s) 1416 in the drive stack 1308 (e.g., in order to receive desired controls from the control component(s) 1416, and test the controls for obstacle avoidance). However, even though the obstacle avoidance component(s) 1418 are shown stacked on top of (e.g., with respect to an autonomous driving software stack) the planning component(s) 1414 and the control component(s) 1416, this is not intended to be limiting. For example, the obstacle avoidance component(s) 1418 may be additionally or alternatively implemented prior to either of the planning component(s) 1414 or the control component(s) 1416, prior to the control component(s) 1416 but after the planning component(s) 1414, as part of or integral to the planning component(s) 1414 and/or the control component(s) 1416, as part of one or more of the perception component(s) 1410, and/or at a different part of the drive stack 1308 depending on the embodiment. As such, the obstacle avoidance component(s) 1418 may be implemented in one or more locations within an autonomous vehicle driving stack or architecture without departing from the scope of the present disclosure.

In some examples, as described herein, the obstacle avoidance component(s) 1418 may be implemented as a separate, discrete feature of the autonomous vehicle 1302. For example, the obstacle avoidance component(s) 1418 may operate separately (e.g., in parallel with, prior to, and/or after) the planning layer, the control layer, the actuation layer, and/or other layers of the drive stack 1308.

The encoder 1428 may encode the sensor data from the sensor manager 1408 and/or the sensor(s) 1310 of the autonomous vehicle 1302. For example, the encoder 1428 may be used to convert the sensor data from a first format to a second format, such as a compressed, down sampled, and/or lower data size format that the first format. In such an example, the first format may be a raw format, a lossless format, and/or another format that includes more data (e.g., for image data, the first format may include a raw image format, that may include enough data to fully represent each frame of video). The second format may be in a format that includes less data, such as a lossy format and/or a compressed format (e.g., for image data, the second format may be H264, H265, MPEG-4, MP4, Advanced Video Coding High Definition (AVCHD), Audio Video Interleave (AVI), Windows Media Video (WMV), etc.). The sensor data may be compressed to a smaller data size in order to ensure efficient and effective transmission of the sensor data over the network(s) 1304 (e.g., cellular networks, such as 5G).

Once the sensor data is encoded by the encoder 1428, a communication component 1426 of the autonomous vehicle 1302 may transmit or send the encoded sensor data to the remote control system 1306. Although the sensor data is described as being transmitted as encoded sensor data, this is not intended to be limiting. In some examples, there may not be an encoder 1428, and/or at least some of the sensor data may be transmitted in an uncompressed or non-encoded format.

The remote control system 1306 may receive the sensor data at communication component 1422 of the remote control system 1306. Where a communication is received and/or transmitted as a network communication, the communication component 1426 and/or communication component 1422 may comprise a network interface which may use one or more wireless antenna(s) and/or modem(s) to communicate over one or more networks. By including one or more modems and/or one or more wireless antennas, the autonomous vehicle 1302 may be capable of communication across different network types (e.g., Wi-Fi, cellular 4G, LTE, 5G, etc.), and may also have redundancy for when one or more networks may not be available, when one or more networks may not have a strong enough connection to transmit the sensor data, and/or for when one or more of the modems goes offline or stops working. For example, the network interface may be capable of communication over Long-Term Evolution (LTE), Wideband Code-Division Multiple Access (WCDMA), Universal Mobile Telecommunications Service (UMTS), Global System for Mobile communications (GSM), CDMA2000, etc. The network interface may also enable communication between objects in the environment (e.g., vehicles, mobile devices, etc.), using local area network(s), such as Bluetooth, Bluetooth Low Energy (LE), Z-Wave, ZigBee, etc., and/or Low Power Wide-Area Network(s) (LPWANs), such as Long Range Wide-Area Network (LoRaWAN), SigFox, etc.

In some examples, such as where the network strength is below a threshold, or a certain network type is not available for connection (e.g., only a 4G cellular connection is available, and 5G is preferable), only required or necessary sensor data may be transmitted to the remote control system 1306 (or required or necessary sensor data may be prioritized in fitting the sensor data into network constraints). For example, during standard or normal operation, all of the sensor data may be transmitted to the remote control system 1306 (e.g., sensor data from each of the sensor(s) 1310 that generate sensor data for use by the remote control system 1306). However, once the network signal drops below a threshold signal strength, or once a certain network type becomes unavailable, less sensor data, such as sensor data from a subset of the sensors 110, may be transmitted.

In such examples, orientation data representative of an orientation of the VR headset 1316 of the remote control system 1306 may be used. For example, if the remote operator is looking toward the left-front of the virtual vehicle within the virtual environment, the sensor data from the sensor(s) 1310 that have a field(s) of view of the left-front of the autonomous vehicle 1302 may be determined. These sensor(s) 1310 may be a left-facing camera(s), a forward-facing camera(s), a LIDAR sensor and/or RADAR sensor(s) with a field(s) of view to the left and/or front of the autonomous vehicle 1302 and/or other sensor types. The orientation data may be used to inform the autonomous vehicle 1302 (e.g., via one or more signals) of a subset of the sensor data that should be transmitted to the remote control system 1306. As a result (e.g., based on the signal(s)), the subset of the sensor data may be encoded and transmitted across the network(s) 1304 to the remote control system 1306. As the remote operator continues to look around the virtual environment, updated orientation data may be generated and transmitted over the network(s) 1304 to the autonomous vehicle 1302, and updated subsets of the sensor data may be received by the remote control system 1306. As a result, the remote operator may be presented with a field of view that includes information relevant to where the remote operator is looking, and the other portions of the virtual environment may not be streamed or rendered.

In some examples, a subset of the sensor data may be transmitted to the remote control system 1306 that enables the virtual environment 1330 to be rendered without providing any image data (e.g., images or video of the real-world or physical environment). For example, locations of objects, surfaces, and/or structures, as well as types of objects, surfaces, and/or structures may be determined from the sensor data, and this information may be transmitted to the remote control system 1306 for generating a completely synthetic virtual environment (e.g., no images or video of the real or physical world, just a virtual world). In such an example, if it is determined a vehicle is to the left of the autonomous vehicle 1302, and a person is to the right, the virtual environment may be rendered to include a vehicle and a person (e.g., generic representations) at locations that correspond to the real-world. In a more detailed example, the vehicle type of the vehicle may be determined, and the virtual environment may include a virtual representation of the vehicle type (e.g., as determined from a data store).

In other examples, a combination of a fully rendered virtual environment and image data (e.g., images or video) may be used within the virtual environment. For example, images or video may be included within the virtual environment in a field of view of the remote operator, but other portions of the virtual environment may include only virtual representations. As a result, if a remote operator changes orientation, and image data has not yet been received for the updated field of view of the remote operator, there may still be enough information within the environment (e.g., the virtual representations of the objects, surfaces, and/or structures) based on the rendering to allow the remote operator to control the autonomous vehicle 1302 safely.

Although the signal strength or connection type is described as a reason for transmitting only a subset of the sensor data, this is not intended to be limiting. For example, the subset of the sensor data may be transmitted at all times, regardless of network connection strength and/or type, in order to reduce bandwidth or preserve network resources.

In some examples, once received by the remote control system 1306, the sensor data (e.g., encoded sensor data) may be decoded by decoder 1420 of the remote control system 1306. In other examples, the encoded sensor data may be used by the virtual environment generator 1314 and/or the remote control(s) 1318 (e.g., for calibration) without decoding. The virtual environment generator 1314 may use the sensor data to generate the virtual environment. The sensor data may include image data from camera(s), LIDAR data from LIDAR sensor(s), RADAR data from RADAR sensor(s), and/or other data types from other sensor(s) 1310, such as vehicle state data and/or configuration data, as described herein. The virtual environment generator 1314 may use the sensor data to generate or render the virtual environment and at least a portion of the virtual environment may be displayed on a display of the VR headset 1316. Examples of the virtual environment are described in more detail herein, such as with reference to FIG. 15 and FIG. 16.

In some examples, the virtual environment may be generated using the vehicle state data and/or the calibration data, in addition to image data, LIDAR data, SONAR data, etc. In such examples, the vehicle state data may be used to update a location and/or orientation of the virtual vehicle in the virtual environment and/or to update visual indicators of the vehicle state in the virtual environment (e.g., to update a speedometer, a revolutions per minute (RPM) display, a fuel level display, a current time where the autonomous vehicle 1302 is located, an odometer, a tachometer, a coolant temperature gauge, a battery charge indicator, a gearshift indicator, a turn signal indicator, a headlight/high beam indicator, a malfunction/maintenance indicator, etc.). As a further example, the vehicle state data may be used to apply one or more rendering effects to the virtual environment, such as motion blur that is based at least in part on the velocity and/or acceleration of the autonomous vehicle 1302.

In some examples, state data may be determined by the autonomous vehicle 1302 for the objects and surface in the environment, and this state information may be used to generate the virtual environment (e.g., to provide visual indicators of types of objects, such as persons, vehicles, animals, inanimate objects, etc., or surfaces, such as a paved road, a gravel road, an uneven road, an even road, a driveway, a one-way street, a two-way street, etc., to provide visual indicators about objects, such as speeds of objects, directions of objects, etc., and/or other information pertaining to the environment).

The calibration data may be used to update the virtual controls (e.g., the representation of the remote control(s) 1318 in the virtual environment). For some non-limiting examples, if the steering wheel is turned to the left, the virtual steering wheel may be rendered as turned to the left, if the wheels are turned to the right, the virtual wheels may be rendered to be turned to the right, if the windows are down, the virtual windows may be rendered to be down, if the seats are in a certain position, the virtual seats may be rendered to be in the certain positions, if the instrument panel and/or HMI display is on, at a certain light level, and/or showing certain data, the virtual instrument panel and/or HMI display may be on, at the certain light level, and/or showing the certain data in the virtual environment.

Any other examples for updating the virtual environment to reflect the autonomous vehicle 1302 and/or other aspects of the real-world environment are contemplated within the scope of the present disclosure. By updating at least a portion of the virtual vehicle and/or other features of the virtual environment using the calibration data, the remote operator may have a more immersive, true-to-life, and realistic virtual environment to control the virtual vehicle within, thereby contributing to the ability of the remote operator to control the autonomous vehicle 1302 in the real-world environment more safely and effectively.

At least some of the sensor data may be used by the remote control(s) 1318, such as the calibration data for calibrating the remote control(s) 1318. For example, similar to described herein with respect to updating the virtual environment using the calibration data, the remote control(s) 1318 may be calibrated using the calibration data. In some examples, a steering component (e.g., a steering wheel, a joystick, etc.) of the remote control(s) 1318 may be calibrated to an initial position that corresponds to the position of steering component(s) 1402 of the autonomous vehicle 1302 at the time of transfer of the control to the remote control system 1306. In another example, the steering component sensitivity may be calibrated using the calibration data, such that inputs to the steering component of the remote control(s) 1318 (e.g., turning the steering wheel x number of degrees to the left) substantially correspond to the inputs to the steering component(s) 1402 of the autonomous vehicle 1302 (e.g., the resulting actuation of the autonomous vehicle 1302 may correspond to turning the steering wheel of the autonomous vehicle 1302 x number of degrees to the left). Similar examples may be implemented for the acceleration component and/or the braking component of the remote control(s) to correspond to the sensitivity, degree of movement, pedal stiffness, and/or other characteristics of acceleration component(s) 1406 and braking component(s) 1404, respectively, of the autonomous vehicle 1302. In some examples, any of these various calibrations may be based at least in part on the year, make, model, type, and/or other information of the autonomous vehicle 1302 (e.g., if the autonomous vehicle 1302 is a Year N, Make X, Model Y, the virtual vehicle may retrieve associated calibration settings from a data store).

In some examples, the calibration data may be used calibrate the remote control(s) 1318 such that the remote control(s) are scaled to the autonomous vehicle 1302 (or object, such as a robot), such as where the vehicle is larger, smaller, or of a different type than the virtual vehicle. For example, the autonomous vehicle 1302 or object may be a small vehicle or object (e.g., that cannot fit passengers), such as a model car or an exploratory vehicle (e.g., for navigating into tight or constrained environments, such as tunnels, beneath structures, etc.), etc., or may be a larger object, such as a bus, a truck, etc. In such examples, calibration data may be used to scale the remote control(s) 1318 to that of the smaller, larger, or different type of object or vehicle. For example, providing an input to the steering component of the remote control(s) 1318, such as by turning a steering wheel 10 degrees, may be scaled for a smaller vehicle to 2 degrees, or for a larger vehicle, to 20 degrees. As another example, the braking component of the remote control(s) 1318 may correspond to anti-skid braking control inputs, but the autonomous vehicle 1302 or object, especially when small, may use skid braking. In such examples, the remote control (s) may be calibrated such that inputs to the braking component of the remote control(s) is adjusted for skid braking.

The scaling may additionally, or alternatively, be performed on the outputs of the remote control(s) (e.g., the control data). For example, after the control inputs to the remote control(s) 1318, the control inputs may be scaled to correspond to the control(s) of the smaller, larger, or different type of autonomous vehicle 1302 or object. This may allow the remote operator to control the virtual vehicle or object using the remote control(s) 1318 in a way that feels more natural to the remote operator, but while calibrating or scaling the control data representative of the control inputs for the autonomous vehicle 1302 or other object to correspond to the vehicle control data that is useable for the autonomous vehicle 1302 or other object. In some examples, this may be performed by the encoder 1432 of the remote control system 1306, and/or by another component.

In any example, prior to transmission of the control data to the autonomous vehicle 1302, the control data may be encoded by the encoder 1432. The encoded control data may be in a format that is useable to the vehicle (e.g., the control data from the remote control(s) 1318 may be encoded to generate vehicle control data that is useable by the autonomous vehicle 1302). In other examples, the control data may be transmitted to the autonomous vehicle 1302 over the network(s) 1304 using the communication communication component 1422 and communication component 1426, and the autonomous vehicle 1302 may encode the control data to generate the vehicle control data. As such, the control data from the remote control(s) 1318 may be converted to the vehicle control data prior to transmission by the remote control system 1306, after receipt by the autonomous vehicle 1302, or a combination thereof.

The control data, in some examples, may be received by the communication component 1426 of the autonomous vehicle 1302 and decoded by the decoder 1424. The vehicle control data may then be used by at least one of the layers of the drive stack 1308 or may bypass the drive stack 1308 (e.g., where full control is transferred to the remote control system 1306 and the autonomous vehicle 1302 exits self-driving or autonomous mode completely) and be passed directly to the control components of the autonomous vehicle 1302, such as the steering component(s) 1402, the braking component(s) 1404, the acceleration component(s) 1406, and/or other components (e.g., a blinker, light switches, seat actuators, etc.). As such, the amount of control given to the remote control system 1306 may include from no control, full control, or partial control. The amount of control of the autonomous vehicle 1302 may inversely correspond to the amount of control given to the remote control system 1306. Thus, when the remote control system 1306 has full control, the autonomous vehicle 1302 may not execute any on-board control, and when the remote control system 1306 has no control, the autonomous vehicle 1302 may execute all on-board control.

In examples where the vehicle control data (e.g., corresponding to the control data generated based on control inputs to the remote control(s) 1318) is used by the drive stack 1308, there may be different levels of use. In some examples, only the obstacle avoidance component(s) 1418 may be employed. In such examples, the vehicle control data may be analyzed by the obstacle avoidance component(s) 1418 to determine whether implementing the controls corresponding to the vehicle control data would result in a collision or an otherwise unsafe or undesirable outcome. When a collision or unsafe outcome is determined, the autonomous vehicle 1302 may implement other controls (e.g., controls that may be similar to the controls corresponding to the vehicle control data but that decrease, reduce, or remove altogether the risk of collision or other unsafe outcome). In the alternative, the autonomous vehicle 1302 may implement a safety procedure when a collision or other unsafe outcome is determined, such as by coming to a complete stop. In these examples, the control inputs from the remote control(s) 1318 may be associated (e.g., one-to-one) with the controls of the autonomous vehicle 1302 (e.g., the control inputs to the remote control(s) 1318 may not be suggestions for control of the vehicle, such as waypoints, but rather may correspond to controls that should be executed by the autonomous vehicle 1302).

As described herein, the control inputs from the remote control(s) 1318 may not be direct or one-to-one controls for the autonomous vehicle 1302, in some examples. For example, the control inputs to the remote control(s) 1318 may be suggestions. One form of suggestion may be an actual input to a steering component, an acceleration component, a braking component, or another component of the remote control(s) 1318. In such an example, the vehicle control data corresponding to these control inputs to the remote control(s) 1318 may be used by the drive stack 1308 to determine how much, or to what degree, to implement the controls. For example, if the remote operator provides an input to a steering component of the remote control(s) 1318 (e.g., to turn a steering wheel 10 degrees), the planning component(s) 1414 and/or the control component(s) 1416 of the drive stack 1308 may receive the vehicle control data representative of the input to the steering component, and determine to what degree to turn to the left (or to not turn left at all). The drive stack 1308 may make a determination to turn left, for example, but may determine that a more gradual turn is safer, follows the road shape or lane markings more accurately, and/or otherwise is preferable over the rate of the turn provided by the remote operator (e.g., the 10 degree turn of the steering wheel). As such, the vehicle control data may be updated and/or new vehicle control data may be generated by the drive stack 1308, and executed by the steering component(s) 1402 of the autonomous vehicle 1302 (e.g., based at least in part on a command or signal from the actuation component(s) 1430).

Similar use of the vehicle control data may be performed based at least in part on inputs to the acceleration component, braking component, and/or other components of the remote control(s) 1318. For example, an input to an acceleration component of the remote control(s) 1318 may cause an acceleration by the acceleration component(s) 1406 of the autonomous vehicle 1302, but the acceleration rate may be less, more, or zero, depending on the determination(s) by the drive stack 1308. As another example, an input to a braking component of the remote control(s) 1318 may cause a braking by the braking component(s) 1404 of the autonomous vehicle 1302, but the deceleration rate may be less, more, or zero, depending on the determination(s) by the drive stack 1308.

Another form of suggestions from the remote control(s) 1318 may be waypoint suggestions. For example, the remote operator may use a remote control(s) 1318 that is a pointer (e.g., a virtual laser pointer), and may point to virtual locations in the virtual environment that the virtual vehicle is to navigate to (e.g., a virtual waypoint). The real-world locations in the real-world environment that correspond to the virtual locations in the virtual environment may be determined, and the vehicle control data may represent the real-world locations (e.g., the real-world waypoints). As such, the drive stack 1308, such as the planning component(s) 1414 and/or the control component(s) 1416, may use the real-world waypoint to determine a path and/or control(s) for following the path to reach the real-world waypoint. The actuation component(s) 1430 may then cause the steering component(s) 1402, the braking component(s) 1404, the acceleration component(s) 1406, and/or other components of the autonomous vehicle 1302 to control the autonomous vehicle 1302 to travel to the real-world location corresponding to the real-world waypoint. The remote operator may continue to provide these control inputs to navigate the autonomous vehicle 1302 through the situation, scenario, and/or environment that necessitated the transfer of at least partial control to the remote control system 1306.

Now referring to FIG. 15 and FIG. 16, FIG. 15 and FIG. 16 illustrate non-limiting examples of a virtual environment 1500 that may be generated by the virtual environment generator 1314. In one or more embodiments, the virtual environments may be displayed on a display of the VR headset 1316. Alternatively, the virtual environments may be displayed on a display corresponding to a physical representation of a vehicle. The physical representation may include any configuration of control (e.g., a steering wheel, one or more accelerators or brakes, one or more transmission controls), seating, or visibility (e.g., one or more displays positioned as mirrors) features corresponding to physical, real-world counterparts in an ego-vehicle. Virtual environment 1500 of FIG. 15 may include a virtual environment where an exterior of a vehicle 1502 is rendered, such that a field of view of the remote operator includes the exterior of the vehicle 1502. In one or more embodiments, the vehicle 1502 may be presented as a virtually simulated vehicle. Alternatively, the virtual environment 1500 may be rendered in one or more displays positioned around a partially or completely physical vehicle 1502 calibrated to correspond to the ego-vehicle. In the cases where the vehicle 1502 comprises a virtual vehicle, the virtual vehicle 1502 may be rendered on a surface 1504 of the virtual environment 1500. In this case, the surface 1504 may be one of any number of suitable surfaces, such as a representation of a garage floor, a laboratory floor, etc. However, this is not intended to be limiting, and in some examples, the surface 1504 may be rendered to represent the surface the autonomous vehicle 1302 is on in the real-world environment (e.g., using sensor data generated from cameras with a field(s) of view of the surface around the autonomous vehicle 1302, such as a parking camera(s)).

The sensor data, such as image data, representative of a field(s) of view of the sensor(s) 1310 may be displayed within the virtual environment 1500 on one or more virtual displays 1506, and/or additional or alternative virtual displays 1506. In some examples, the virtual displays 1506 may be rendered to represent up to a 360 degree field of view of the sensor(s) 1310 of the autonomous vehicle 1302. As described herein, the surface 1504 and/or an upper portion 1508 of the virtual environment 1500 may also be rendered to represent the real-world environment of the autonomous vehicle 1302. The upper portion 1508 may include buildings, trees, the sky, and/or other features of the real-world environment, such that the virtual environment 1500 may represent a fully immersive environment. The surface 1504 and/or the upper portion 1508, similar to the virtual displays 1506, may include images or video from image data generated by the autonomous vehicle 1302, may include rendered representations of the environment as gleaned from the sensor data (e.g., image data, LIDAR data, RADAR data, etc.), or a combination thereof.

The instance of the virtual environment 1500 illustrated in FIG. 15 may represent the scenario represented in the image 1320. For example, the virtual display 206B may include the virtual representations of the van 1326, the unloaded boxes 1328, the divided street 1322, and/or other features of the image 1320. The virtual representations of the image data may include the images or video from the image data, rendered within the virtual environment 1500. As such, the images or video displayed on the virtual displays 1506 may be the actual images or video (e.g., not a virtual representation thereof). In other examples, the images or video displayed on the virtual displays 1506 may be a rendered representation of the environment, which may be generated from the sensor data (e.g., the image data, the LIDAR data, the SONAR data, etc.).

As described herein, the vehicle state data and/or the calibration data may be used to generate the virtual environment. In such examples, wheels 1510 of the virtual vehicle 1502 may be rendered at approximately the wheel angle of the wheels of the autonomous vehicle 1302 in the real-world environment. In this illustration, the wheels may be straight. Similarly, lights may be turned on or off, including brake lights when braking, emergency lights when turned on, etc. When the vehicle 1502 includes a physical, tangible representation, the vehicle state data and/or the calibration data of the ego-vehicle may be used to calibrate and orient the physical representation vehicle 1502.

When controlling a virtual vehicle 1502 implemented as a virtual vehicle in the virtual environment 1500, or other virtual environments where the vantage point of the remote operator is outside of the virtual vehicle 1502, the remote operator may be able to move around the virtual environment 1500 freely to control the virtual vehicle 1502 from different vantage points (or may be able to change the vantage point to inside the virtual vehicle, as illustrated in FIG. 16). For example, the remote operator may be able to sit on top of or above the virtual vehicle 1502, to the side of the virtual vehicle 1502, in front of the virtual vehicle 1502, behind the virtual vehicle 1502, etc.

In examples where the remote operator provides virtual waypoints rather than actual controls, a vantage point outside of the virtual vehicle 1502 may be more useful. For example, the remote operator may have a vantage point from on top of the virtual vehicle 1502, such as at location 1512 within the virtual environment 1500, and may use device 1514 (e.g., a virtual pointer, a virtual laser, etc.) to identify a location within the virtual environment 1500 and/or a location within the image data represented within the virtual environment 1500, such as location 1516. When the location 1516 corresponds to the image data, such as a point(s) or pixel(s) within the image data, the real-world coordinates corresponding to the point(s) or the pixel(s) may be determined (e.g., by the autonomous vehicle 1302 and/or the remote control system 1306). For example, the camera(s)

that captured the image data may be calibrated such that transformations from two-dimensional locations of the point(s) or the pixel(s) within the image data to three-dimensional points in the real-world environment may be computed or known. As a result, the virtual way-points (e.g., the location 1516) identified within the virtual environment 1500 by the remote operator may be used to determine real-world locations (e.g., corresponding to the location 1516) for the autonomous vehicle 1302 to navigate to. As described herein, the autonomous vehicle 1302 may use this information to determine the path, controls, and/or actuations that will control the autonomous vehicle 1302 to the real-world location.

As the autonomous vehicle 1302 is controlled through the real-world environment, the virtual displays 1506 may be updated to reflect the updated sensor data over time (e.g., at the frame rate that the sensor data is captured, such as 30 frames per second ("fps"), 60 fps, etc.). As the (virtual) vehicle 1502 is being controlled, the wheels, lights, windows, blinkers, etc., may be updated according to the corresponding features on the autonomous vehicle 1302 in the real-world environment.

Now referring to FIG. 16, the virtual environment 1330 may be the same virtual environment 1330 of FIG. 13 described herein. Although the vantage point illustrated in FIG. 16 is from a left-side driver's seat within the virtual vehicle, this is not intended to be limiting. For example, and without departing from the scope of the present disclosure, the remote operator may have a vantage point from the position a right-side driver's seat (e.g., for jurisdictions where driving is on the left side of the road), a passenger's seat, a back seat, an imaginary seat (e.g., a middle-driver's seat), or from a vantage point within the virtual vehicle not corresponding to a seat, such as from anywhere within the virtual vehicle.

As described herein, one or more of the features of the virtual vehicle may be made at least partially transparent and/or may be removed from the rendering of the virtual vehicle. For example, certain portions of a real-world vehicle (alternatively referred to herein as "ego-vehicle" or "physical vehicle") may be used for structural support, but may cause occlusions for a driver (e.g., "blind spots). In a virtual vehicle, this need for structural support is non-existent, so portions of the virtual vehicle that may be visually occluding may be removed and/or made at least partially transparent in the virtual environment 1330. For example, the support column 1340, and/or other support columns of the virtual vehicle, may be made transparent (as illustrated in FIG. 16) or may be removed completely from the rendering. In other examples, doors 1522 may be made transparent (e.g. but for an outline) or entirely removed. As a result, the remote operator may be presented with a field(s) of view that is more immersive, with less occlusions, thereby facilitating more informed, safer control.

In addition, a portion(s) of the virtual vehicle may be made at least partially transparent or be removed even where the portion(s) of the virtual vehicle does not cause occlusions, in order to allow the remote operator to visualize information about the virtual vehicle (and thus the autonomous vehicle 1302) that would not be possible in a real-world environment. For example, a portion of the virtual vehicle between a vantage point of the remote operator and one or more of the wheels and/or tires of the vehicle may be made at least partially transparent or may be removed from the rendering, such that the remote operator is able to visualize an angle of the wheel(s) and/or the tire(s) (e.g., where the wheels and/or tires are at the angle based on the calibration data).

The virtual environment 1330 may include, in addition to or alternatively from the features described herein with respect to FIG. 13, a virtual instrument panel 1518, virtual side-view or wing-mirrors 1520, and/or other features. The virtual instrument panel 1518 may display any number of different information, such as, without limitation, a speedometer, a fuel level indicator, an oil pressure indicator, a tachometer, an odometer, turn indicators, gearshift position indicators, seat belt warning light(s), parking-brake warning light(s), engine-malfunction light(s), airbag (SRS) system information, lighting controls, safety system controls, navigation information, etc. The virtual side-view or wing-mirrors 1520 may display sensor data captured by one or more sensor(s) 1310 (e.g., camera(s)) of the autonomous vehicle 1302 with a field(s) of view to the rear and/or to the side of the autonomous vehicle 1302 (e.g., to represent a side-view or wing-mirror of the autonomous vehicle 1302).

Figure 17:
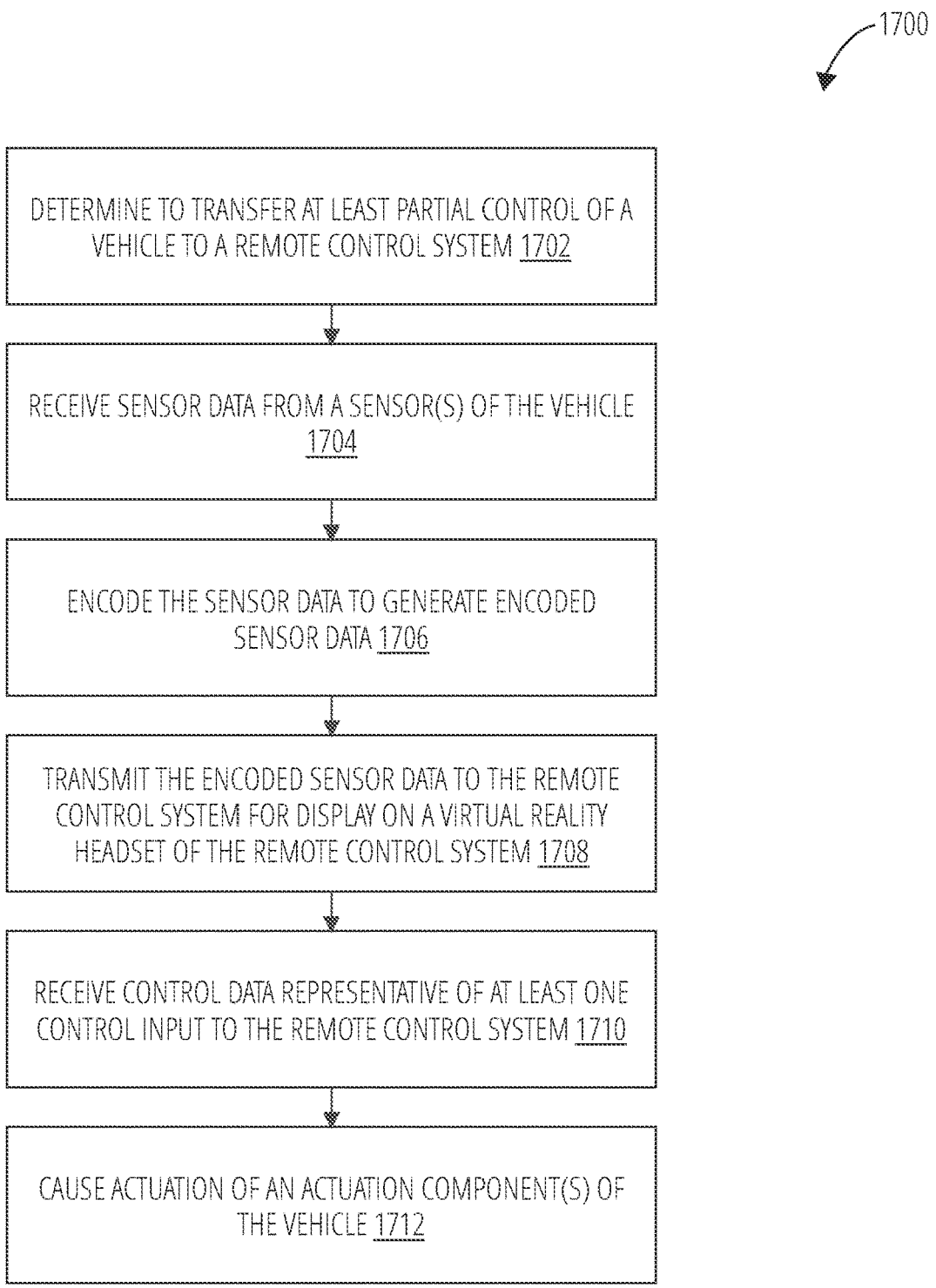
FIG. 17 illustrates a method 1700 in accordance with one embodiment.
Figure 18:
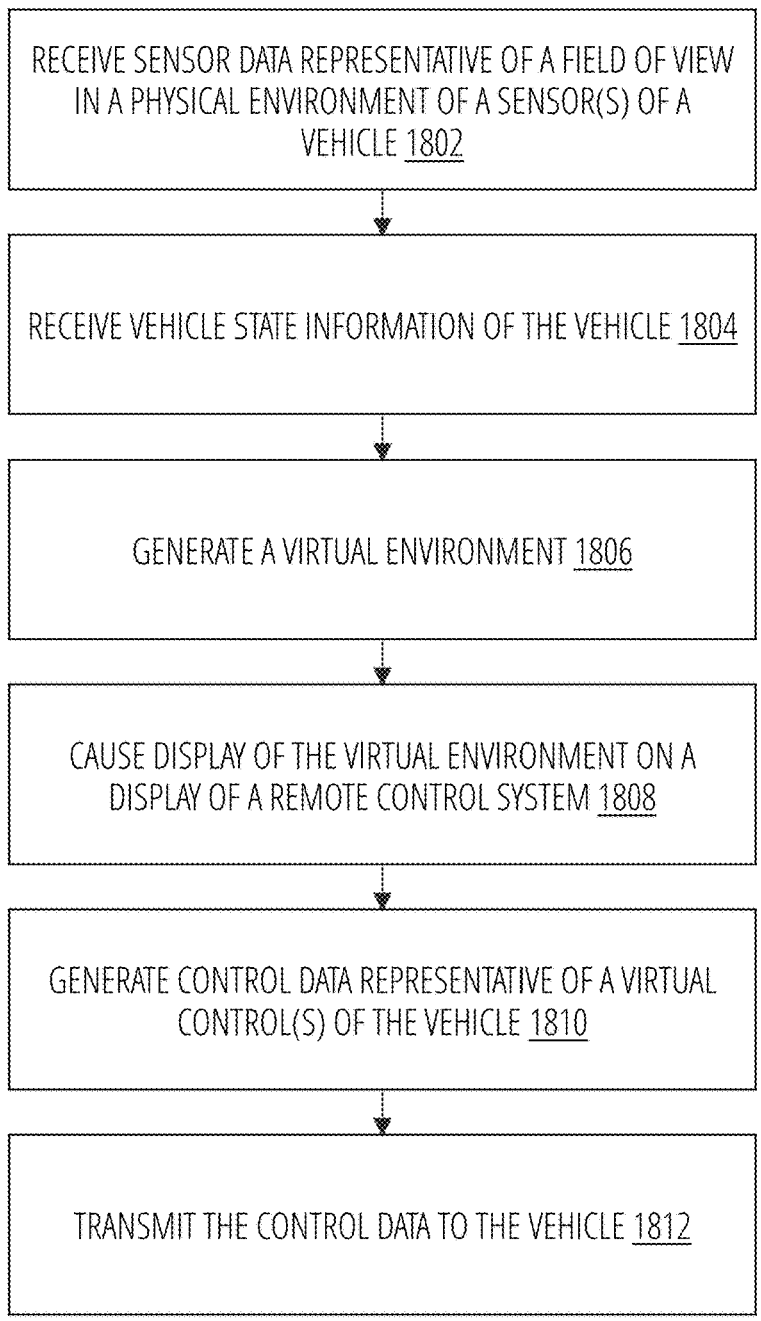
FIG. 18 illustrates a method 1800 in accordance with one embodiment.

Now referring to FIG. 17 and FIG. 18, each block of method 1700 and method 1800, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 1700 and method 1800 are described, by way of example, with respect to the autonomous vehicle control system 1300 of FIG. 13 and FIG. 14. However, these methods may additionally or alternatively be executed by any one system, or any combination of systems, including, but not limited to, those described herein.

FIG. 17 is a flow diagram showing a method 1700 of remote control of an autonomous vehicle, in accordance with some embodiments of the present disclosure. The method 1700, at block 1702, includes determining to transfer at least partial control of a vehicle to a remote control system. For example, the autonomous vehicle 1302 (e.g., one or more components of the drive stack 1308), the remote operator, a passenger, and/or another actor may determine to transfer at least partial control to the remote control system 1306. In such examples, the determination may be to activate, initiate, or otherwise begin a remote control session. In examples where the autonomous vehicle 1302 determines to transfer control, the determination, as described herein, may be based on a constraint on the autonomous vehicle 1302 such as rules of the road, an obstacle in a path of the autonomous vehicle 1302, etc., that may not allow the autonomous vehicle 1302 to navigate a situation, scenario, and/or environment. The determination may be made based on an analysis of sensor data of the autonomous vehicle 1302, and may be made by one or more layers of the drive stack 1308 in some examples.

The method 1700, at block 1704, includes receiving sensor data from a sensor(s) of the vehicle. For example, sensor data from the sensor(s) 1310 may be received.

The method 1700, at block 1706, includes encoding the sensor data to generate encoded sensor data. For example, the sensor data may be encoded into a different format, such as a less data intense format. If the sensor data includes image data, for example, the image data may be converted from a first format (e.g., a raw image format) to a second format (e.g., an encoded video format, such as H.264, H.265, AV1, VP9, or another image format, including but not limited to those described herein).

The method 1700, at block 1708, includes transmitting the encoded sensor data to the remote control system for display by a virtual reality headset of the remote control system. For example, the encoded sensor data may be transmitted to the remote control system 1306 for display on a display of the VR headset 1316.

The method 1700, at block 1710, includes receiving control data representative of at least one control input to the remote control system. For example, control data representative of at least one input to the remote control(s) 1318 may be received from the remote control system 1306. In some examples, the control data may not be in a format useable by the autonomous vehicle 1302, and thus may be converted or encoded to vehicle control data useable by the autonomous vehicle 1302. In other examples, the control data may be useable by the autonomous vehicle 1302, or may have already been encoded by the remote control system 1306 and thus the control data received may include the vehicle control data.

The method 1700, at block 1712, includes causing actuation of an actuation component(s) of the vehicle. For example, the control data (and/or the vehicle control data) may be used by the autonomous vehicle 1302 to cause actuation of at least one actuation component of the autonomous vehicle 1302, such as the steering component(s) 1402, the braking component(s) 1404, and/or the acceleration component(s) 1406.

FIG. 18 is an example flow diagram for a method 1800 of remote control of an autonomous vehicle, in accordance with some embodiments of the present disclosure. The method 1800, at block 1802, includes receiving sensor data representative of a field of a view in a physical environment of a sensor(s) of a vehicle. For example, sensor data representative of a field(s) of view of the sensor(s) 1310 of the autonomous vehicle 1302 in the real-world environment may be received.

The method 1800, at block 1804, includes receiving vehicle state information of the vehicle. For example, the vehicle state information may be received from the autonomous vehicle 1302.

The method 1800, at block 1806, includes generating a virtual environment. For example, the virtual environment generator 1314 may generate a virtual environment based on the sensor data, the vehicle state data, and/or calibration data.

The method 1800, at block 1808, includes causing display of the virtual environment on a display of a remote control system. For example, the virtual environment may be displayed on a display of the VR headset 1316 of the remote control system 1306.

The method 1800, at block 1810, includes generating control data representative of a virtual control(s) of the vehicle. For example, control data representative of control input(s) to the remote control(s) 1318 for controlling a virtual vehicle may be generated.

The method 1800, at block 1812, includes transmitting the control data to the vehicle. For example, the control data may be transmitted to the autonomous vehicle 1302. In some examples, prior to transmission, the control data may be encoded to create vehicle control data useable by the autonomous vehicle 1302.

Figure 19:
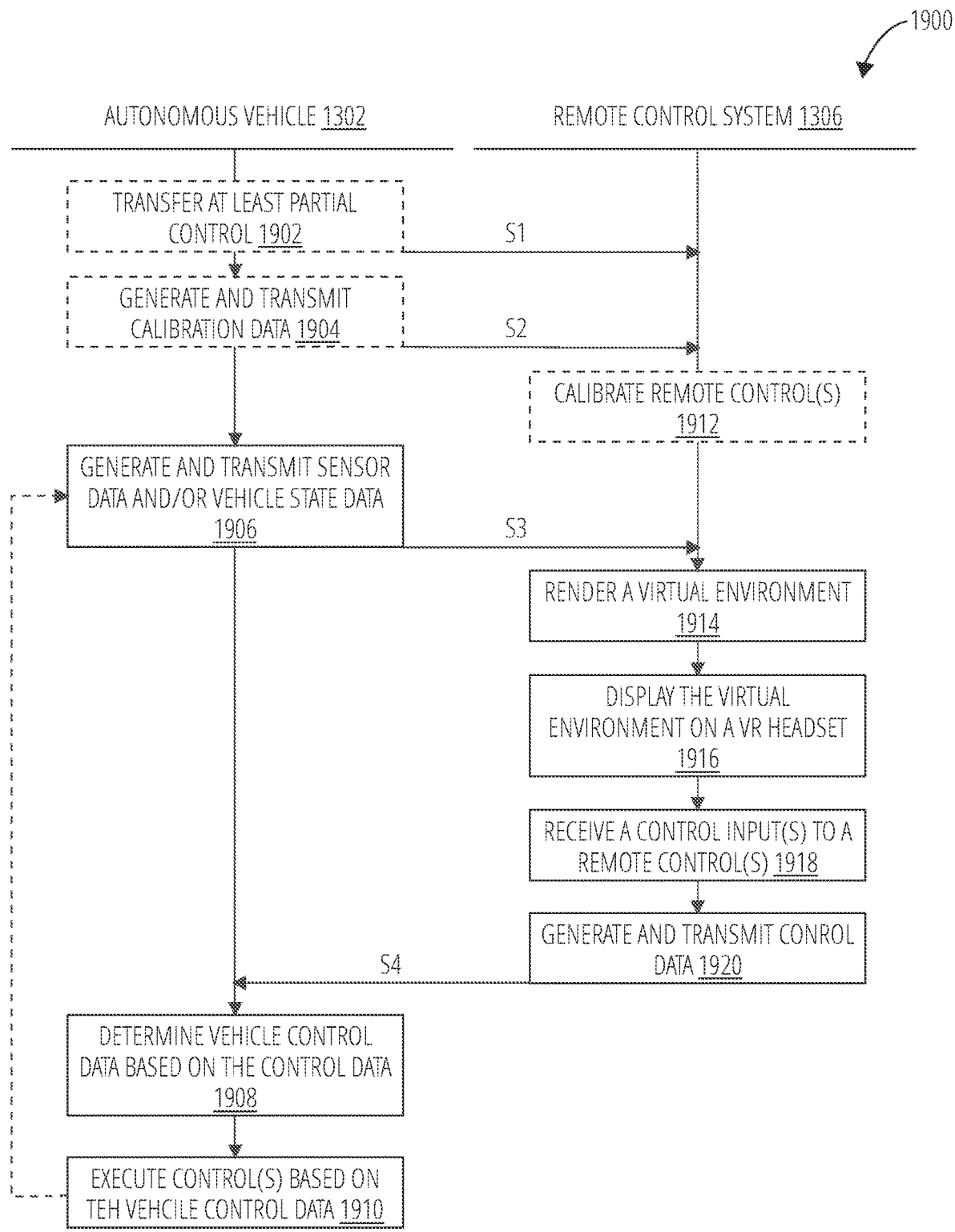
FIG. 19 illustrates a method 1900 in accordance with one embodiment.

Now referring to FIG. 19, each block of method 1900, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 1900 is described, by way of example, with respect to the autonomous vehicle control system 1300 of FIG. 13 and FIG. 14. However, these methods may additionally or alternatively be executed by any one system, or any combination of systems, including, but not limited to, those described herein.

FIG. 19 is an example signal flow diagram for a method 1900 of remote control of an autonomous vehicle, in accordance with some embodiments of the present disclosure. The method 1900, as illustrated in FIG. 19, may begin at the top of the page and end at the bottom. However, this is not intended to be limiting, and one or more of the blocks may be in alternative order and/or may be removed, or one or more additional or alternative blocks may be used in the method 1900 without departing from the scope of the present disclosure.

The method 1900, at block 1902, includes transferring at least partial control. For example, at least partial control may be transferred by the autonomous vehicle 1302 to the remote control system 1306. In such examples, a signal(s), S1, may be generated and transmitted from the autonomous vehicle 1302 (e.g., via the communication component 1422) to the remote control system 1306 (e.g., via the communication component 1426) to inform the remote control system 1306 that at least partial control is being transferred. The signal(s), S1, may be representative of data indicating that control is being transferred. The transfer of control may not be executed, in some examples, as illustrated by the dashed lines. For example, where control of the vehicle 102 or object is always performed by the remote control system 1306, there may not be a need to transfer control.

The method 1900, at block 1904, includes generating and transmitting calibration data. For example, the sensor(s) 1310 of the autonomous vehicle 1302 may generate calibration data, and the autonomous vehicle 1302 may transmit the calibration data to the remote control system 1306 (e.g., via the communication component 1422 or communication component 1426). In such examples, a signal(s), S2, may be generated and transmitted from the autonomous vehicle 1302 to the remote control system 1306 that represents the calibration data. The generating and transmitting of the calibration data may not be executed, in some examples, as illustrated by the dashed lines.

The method 1900, at block 1912, includes calibrating remote control(s). For example, the calibration data received via the signal(s), S2, may be used by the remote control system 1306 to calibrate the remote control(s) 1318. The calibrating of the remote control(s) 1318 may not be executed, in some examples, as illustrated by the dashed lines.

The method 1900, at block 1906, includes generating and transmitting sensor data and/or vehicle state data. For example, the sensor(s) 1310 of the autonomous vehicle 1302 may generate sensor data and/or vehicle state data and the autonomous vehicle 1302 may transmit the sensor data and/or the vehicle state data to the remote control system 1306 (e.g., via the communication component 1422 and/or communication component 1426). In such examples, a signal(s), S3, may be generated and transmitted from the autonomous vehicle 1302 to the remote control system 1306 that represents the sensor data and/or the vehicle state data.

The method 1900, at block 1914, includes rendering a virtual environment. For example, the virtual environment generator 1314 may generate and/or render the virtual environment based on the sensor data, the vehicle state data, and/or the calibration data.

The method 1900, at block 1916, includes displaying the virtual environment on a VR headset. For example, the virtual environment, or at least a portion thereof, may be displayed on the VR headset 1316 of the remote control system 1306.

The method 1900, at block 1918, includes receiving control input(s) to remote control(s). For example, the remote operator may provide one or more control inputs to the remote control(s) 1318.

The method 1900, at block 1920, includes generating and transmitting control data. For example, the remote control(s) 1318 of the remote control system 1306 may generate control data based on the control input(s) and the remote control system 1306 may transmit the control data to the autonomous vehicle 1302 (e.g., via the communication component 1422 and/or communication component 1426). In such examples, a signal(s), S4, may be generated and transmitted from the remote control system 1306 to the autonomous vehicle 1302 that represents the control data.

The method 1900, at block 1908, includes determining vehicle control data based on the control data. For example, the autonomous vehicle 1302 may determine whether the control data is useable by the autonomous vehicle 1302 and, if not, may generate vehicle control data that corresponds to the control data but that is useable by the autonomous vehicle 1302.

The method 1900, at block 1910, includes executing control(s) based on the vehicle control data. For example, one or more controls may be executed by the autonomous vehicle 1302 that may correspond to the control input(s) to the remote control system 1306.

Figure 20:
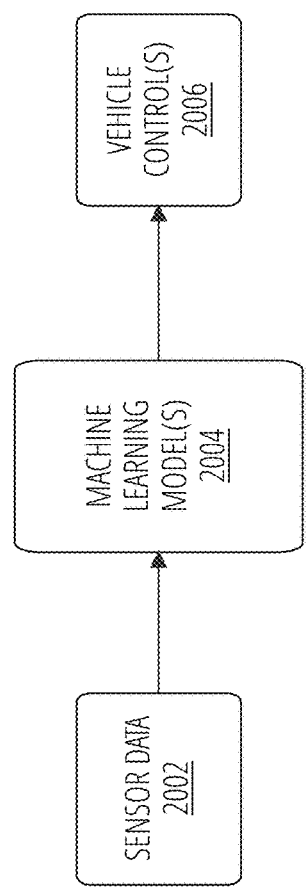
FIG. 20 illustrates a process 2000 in accordance with one embodiment.

Now referring to FIG. 20, FIG. 20 is an example data flow diagram illustrating a process 2000 for training an autonomous vehicle using a machine learning model(s), in accordance with some embodiments of the present disclosure. Any number of inputs, including but not limited to sensor data 2002 and/or control data representative of control input(s) to remote control(s) 1318 of the remote control system 1306, may be input into a machine learning model(s) 2004.

The machine learning model(s) 2004 may generate or compute any number of outputs, including but not limited to vehicle control data representative of vehicle control(s) 2006 for controlling the autonomous vehicle 1302. In some examples, the output may be control data, such as the control data generated by the remote control(s) 1318 of the remote control system 1306, and the control data may be, where necessary, encoded or otherwise converted to vehicle control data representative of the vehicle control(s) 2006 useable by the autonomous vehicle 1302. In some examples, the vehicle control(s) 2006 may include vehicle trajectory information, such as a path, or points along a path, that the autonomous vehicle 1302 should navigate along within the environment. The vehicle control(s) 2006 may be transmitted or sent to a control component(s) 1416, planning component(s) 1414, and/or other layers of the drive stack 1308, and the control component(s) 1416, the planning component(s) 1414, and/or other layers of the drive stack 1308 may use the vehicle control(s) 1312 to control the autonomous vehicle 1302 according to the vehicle control(s) 2006.

The sensor data 2002 may be image data, LIDAR data, SONAR data, and/or data from one or more other sensor(s) 1310 of the autonomous vehicle 1302 that may be representative of the real-world environment of the autonomous vehicle 1302. In some examples, the sensor data may further include vehicle state data representative of the state of the vehicle 102, such as speed, velocity, acceleration, deceleration, orientation or pose, location or position in the environment and/or other status information. This data may be captured by and/or received from one or more of the sensors 110 of the autonomous vehicle 1302, such as one or more of the IMU sensor(s) 2336, speed sensor(s) 2314, steering sensor(s) 2310, vibration sensor(s) 2312, and/or one or more sensors of the brake sensor system 2316, propulsion system 2320, and/or steering system 2324. The vehicle state data (e.g., speed, orientation, etc.) may be valuable to the machine learning model(s) 2004 in computing the vehicle control(s) 2006 as the vehicle state data may inform the machine learning model(s) 2004 as to what vehicle control(s) 2006 are most useful given the current vehicle state.

For example, the autonomous vehicle 1302 may transfer at least partial control to the remote control system 1306 as a result of encountering a situation, scenario, and/or environment that the autonomous vehicle 1302 is not permitted to handle autonomously (e.g., due to one or more constraints). A remote operator may control the virtual vehicle through the virtual environment, and the control inputs by the remote operator may be represented by control data. The control data may then be encoded or converted to vehicle control data useable by the autonomous vehicle 1302, and the autonomous vehicle 1302 may be controlled through the situation, scenario, and/or environment based on the vehicle control data. Throughout the remote control session, the sensor(s) 1310 of the autonomous vehicle 1302 may generate sensor data 2002. The sensor data 2002 (e.g., image data and/or vehicle state data) may be input into the machine learning model(s) 2004, and the machine learning model(s) 2004 may learn (e.g. using ground truth control data) the vehicle control(s) 2006 for navigating the situation, scenario, and/or environment, and/or similar situations, scenarios, and/or environments, such that during a next occurrence, the autonomous vehicle 1302 may be able to navigate itself through the situation, scenario, and/or environment without the need for the remote control system 1306.

The machine learning model(s) 2004 may include any type of machine learning model(s), such as machine learning models using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short terms memory, Hopfield, Boltzmann, deep belief, deconvolutional, generative adversarial, liquid state machine, etc.), and/or other types of machine learning models.

Figure 21:
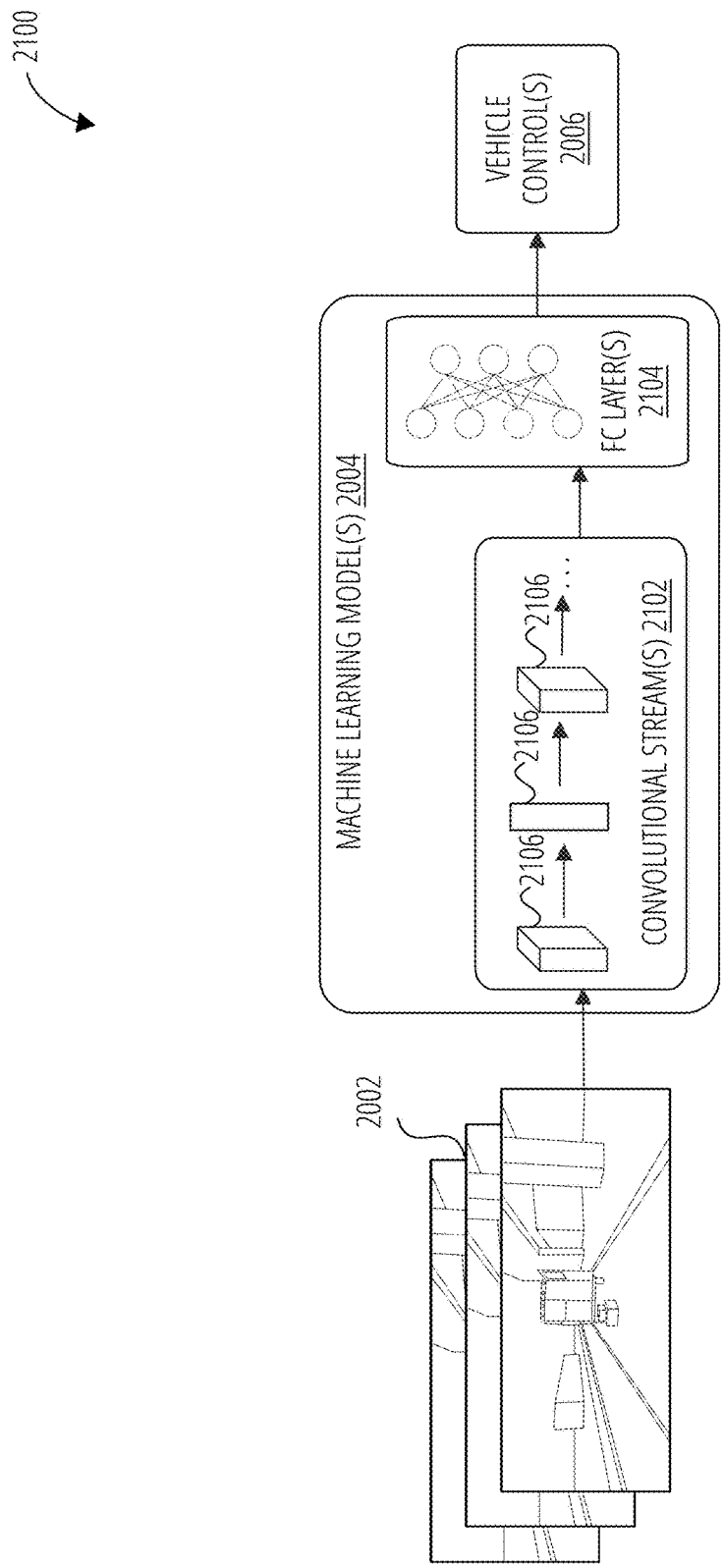
FIG. 21 illustrates a process 2100 in accordance with one embodiment.

Now referring to FIG. 21, FIG. 21 is an example illustration of a machine learning model(s) for training an autonomous vehicle according to the process of FIG. 20, in accordance with some embodiments of the present disclosure. The machine learning model(s) 2004 of FIG. 21 may be one example of a machine learning model(s) that may be used in the process 2000. However, the machine learning model(s) 2004 of FIG. 21 is not intended to be limiting, and the machine learning model(s) 2004 may include additional and/or different machine learning models than the machine learning model(s) 2004 of FIG. 21. The machine learning model(s) 2004 of FIG. 21 may include a convolutional neural network and thus may alternatively be referred to herein as convolutional neural network or convolutional network.

The convolutional network includes the sensor data 2002 representative of one or more images generated based on image data from one or more camera(s) of the autonomous vehicle 1302. In some examples, the convolutional network may also include other inputs as sensor data, such as LIDAR data, RADAR data, vehicle state data, etc. The sensor data 2002 may be input into convolutional stream(s) 2102 of the convolutional network. For example, sensor data from each sensor (e.g., where two or more sensors are used) may be input its own convolutional stream(s) 2102.

A convolutional stream(s) 2102 may include any number of layers, such as the layers 2106. One or more of the layers may include an input layer. The input layer may hold values associated with the sensor data. For example, the input layer may hold values representative of the raw pixel values of the image(s) input to the convolutional network as a volume (e.g., a width, a height, and color channels (e.g., RGB), such as 32×32×3).

One or more layers may include convolutional layers. The convolutional layers may compute the output of neurons that are connected to local regions in an input layer (e.g., the input layer), each computing a dot product between their weights and a small region they are connected to in the input volume. A result of the convolutional layers may be another volume, with one of the dimensions based at least in part on the number of filters applied (e.g., the width, the height, and the number of filters, such as 32×32×12, if 12 were the number of filters).

One or more of the layers may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers may include a pooling layer. The pooling layer may perform a down sampling operation along the spatial dimensions (e.g., the height and the width), which may result in a smaller volume than the input of the pooling layer (e.g., 16×16×12 from the 32×32×12 input volume).

One or more of the layers may include a fully connected layer. Each neuron in the fully connected layer(s) may be connected to each of the neurons in the previous volume. The fully connected layer may compute class scores, and the resulting volume may be 1×1×number of classes. In some examples, the convolutional stream(s) 2102 may include a fully connected layer, while in other examples, a fully connected fully connected layer(s) 2104 of the convolutional network 504 may be the fully connected layer for the convolutional stream(s) 2102.

Although input layers, convolutional layers, pooling layers, ReLU layers, and fully connected layers are discussed herein with respect to the convolutional stream(s) 2102, this is not intended to be limiting. For example, additional or alternative layers may be used in the convolutional stream(s) 2102, such as normalization layers, SoftMax layers, and/or other layer types. Further, the order and number of layers of the convolutional network and/or the convolutional stream(s) 2102 is not limited to any one architecture.

In addition, some of the layers may include parameters (e.g., weights), such as the convolutional layers and the fully connected layers, while others may not, such as the ReLU layers and pooling layers. In some examples, the parameters may be learned by the convolutional stream(s) 2102 and/or the fully connected layer(s) 2104 during training. Further, some of the layers may include additional hyper-parameters (e.g., learning rate, stride, epochs, etc.), such as the convolutional layers, the fully connected layers, and the pooling layers, while other layers may not, such as the ReLU layers. The parameters and hyper-parameters are not to be limited, and may differ depending on the embodiment.

The output of the convolutional stream(s) 2102 may be input to the fully connected layer(s) 2104 of the convolutional network. In addition to the output of the convolutional stream(s) 2102, variable(s), at least some of which may be representative of the vehicle state, may be input to the fully connected layer(s) 2104.

The machine learning model(s) 2004 may be trained using example control data (e.g., vehicle control data, trajectories, etc.) as ground truth data and/or sensor data 2002 for given inputs to the machine learning model(s) 2004. In some examples, the control data may be based on the control inputs to the remote control(s) 1318 of the remote control system 1306, and/or based on the vehicle control data generated as a result of the control inputs. In some examples, the training data may correspond to a virtual vehicle, such as a vehicle driven in a virtual simulation comprising a virtual environment.

Figure 22:
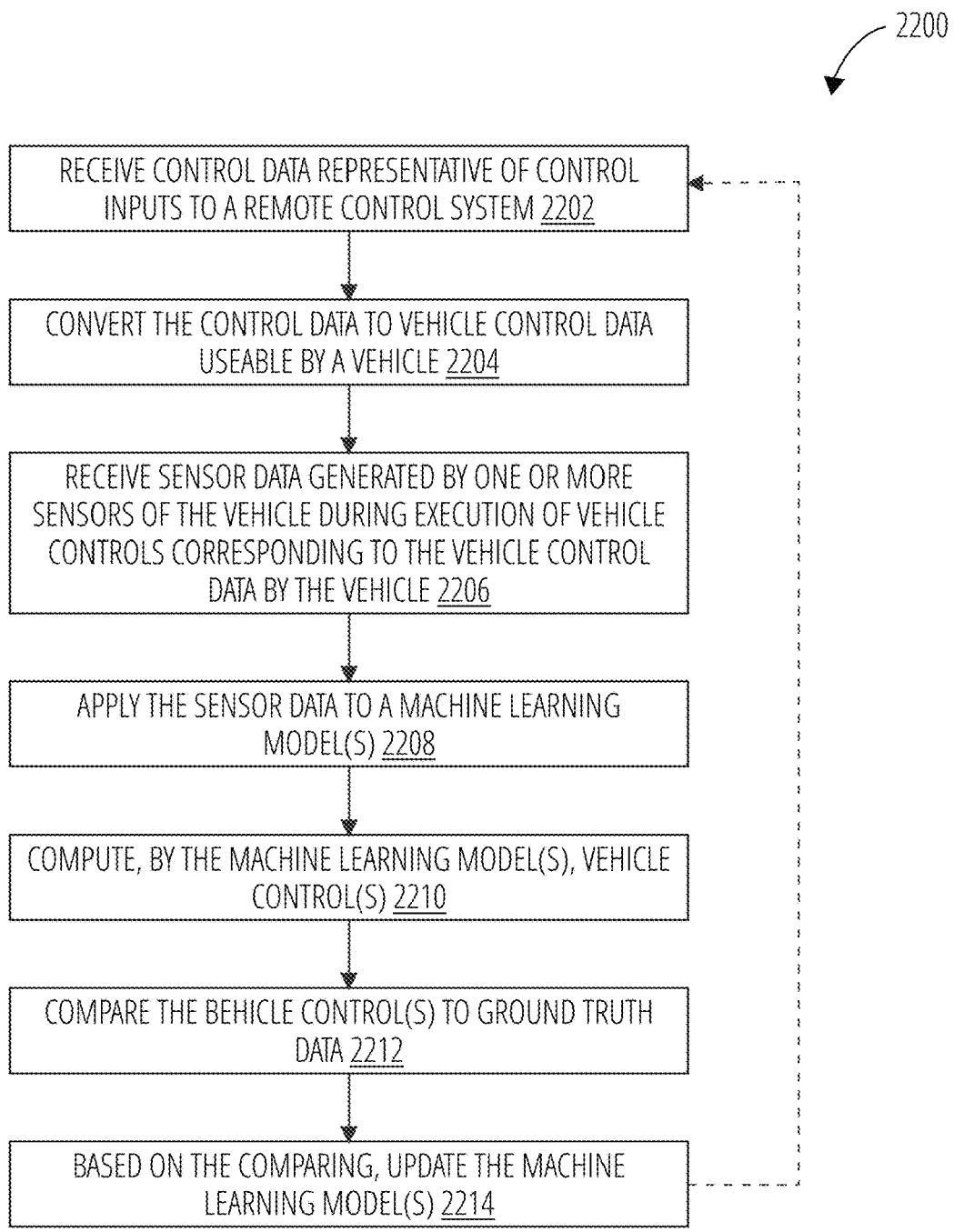
FIG. 22 illustrates a method 2200 in accordance with one embodiment.

Now referring to FIG. 22, each block of method 2200, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 2200 may be executed by any one system, or any combination of systems, including but not limited to those described herein.

FIG. 22 is an example flow diagram for a method 2200 of training an autonomous vehicle using a machine learning model(s), in accordance with some embodiments of the present disclosure. The method 2200, at block 2202, includes receiving control data supplied from a remote control system representative of control inputs. For example, control data representative of control inputs supplied by a remote control system 1306 may be received (e.g., by the remote control system 1306, by a model training server(s), by the autonomous vehicle 1302, etc.).

The method 2200, at block 2204, includes converting the control data to vehicle control data usable by a vehicle. For example, the control data may be converted to vehicle control data that is useable by a vehicle (e.g., by the autonomous vehicle 1302).

The method 2200, at block 2206 includes receiving sensor data generated by one or more sensors of the vehicle during executing of vehicle controls corresponding to the vehicle control data by the vehicle. For example, sensor data may be received (e.g., by the remote control system 1306, the model training server(s), the autonomous vehicle 1302, etc.), where the sensor data is or was generated during execution of vehicle controls corresponding to the vehicle control data. The vehicle controls may be the controls from the control component(s) 1416, the planning component(s) 1414, the actuation component(s) 1430, the steering component(s) 1402, the braking component(s) 1404, the acceleration component(s) 1406, and/or other components of the autonomous vehicle 1302 (and/or another vehicle or object).

The method 2200, at block 2208, includes applying the vehicle control data and/or the sensor data to a machine learning model(s). For example, the sensor data (e.g., image data, LIDAR data, SONAR data, vehicle state data, etc.) may be applied to the machine learning model(s) (e.g., the machine learning model(s) 2004 of FIG. 20 and FIG. 21). In some examples, the sensor data may be applied to the machine learning model(s) and the vehicle control data may be used as ground truth data to train the machine learning model(s).

The method 2200, at block 2210, includes computing, by the machine learning model(s), vehicle control(s). For example, the machine learning model(s) may compute vehicle control(s) (e.g., represented as vehicle control data) that correspond to the sensor data.

The method 2200, at block 2212, includes comparing the vehicle control(s) to ground truth data. For example, the ground truth data may include the vehicle control data and/or paths or trajectories through the environment as labeled or annotated within the representations of the sensor data (e.g., the images).

The method 2200, at block 2214, includes, based on the comparing at block 2212, updating the machine learning model(s). For example, the parameters (e.g., weights, biases, etc.) of the machine learning model(s) may be updated (e.g., using backpropagation, parameter updates, etc.). This process may repeat until the machine learning model(s) has acceptable or desirable accuracy.

As a result of the method 2200, the machine learning model(s) may be trained such that the machine learning model(s), once deployed, may take sensor data as an input and generate vehicle control(s) for navigating through environments, situations, and/or scenarios without the need for remote control. As such, over time, the remote control system 1306 may be used to train the autonomous vehicle 1302 (and/or other vehicles or objects) how to navigate different types of scenarios, situations, and/or environments until the need for remote control, or a remote control system 1306, may become unnecessary.

Figure 23:
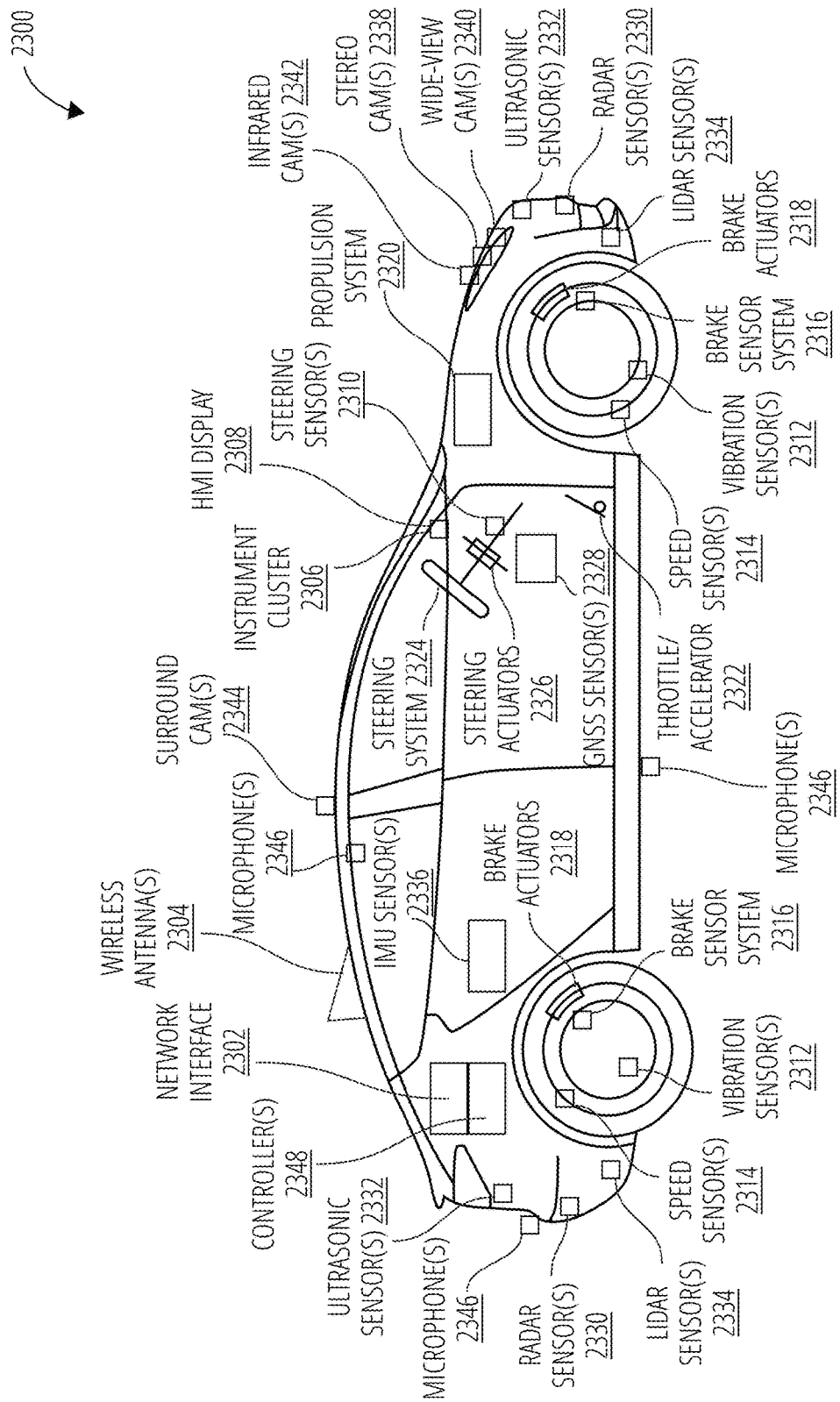
FIG. 23 illustrates an example autonomous vehicle 2300 in accordance with one embodiment.

FIG. 23 is an illustration of an example autonomous vehicle 2300, in accordance with some embodiments of the present disclosure. The autonomous vehicle 1302 may include a passenger vehicle, such as a car, a truck, a bus, and/or another type of vehicle that accommodates one or more passengers. Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The autonomous vehicle 1302 may be capable of functionality in accordance with one or more of Level 3-Level 5 of the autonomous driving levels. For example, the autonomous vehicle 1302 may be capable of conditional automation (Level 3), high automation (Level 4), and/or full automation (Level 5), depending on the embodiment.

The autonomous vehicle 1302 may include components such as a chassis, a vehicle body, wheels (e.g., 2, 4, 6, 8, 18, etc.), tires, axles, and other components of a vehicle. The autonomous vehicle 1302 may include a propulsion system 2320, such as an internal combustion engine, hybrid electric power plant, an all-electric engine, and/or another propulsion system type. The propulsion system 2320 may be connected to a drive train of the autonomous vehicle 1302, which may include a transmission, to enable the propulsion of the autonomous vehicle 1302. The propulsion system 2320 may be controlled in response to receiving signals from the throttle/accelerator(s) 2322.

A steering system 2324, which may include a steering wheel, may be used to steer the autonomous vehicle 1302 (e.g., along a desired path or route) when the propulsion system 2320 is operating (e.g., when the vehicle is in motion). The steering system 2324 may receive signals from steering actuators 2326. The steering wheel may be optional for full automation (Level 5) functionality.

The brake sensor system 2316 may be used to operate the vehicle brakes in response to receiving signals from the brake actuators 2318 and/or brake sensors.

Controller(s) 2522, which may include one or more systems on chips (SoC(s) 2514) (FIG. 25) and/or GPU(s), may provide signals (e.g., representative of commands) to one or more components and/or systems of the autonomous vehicle 1302. For example, the controller(s) may send signals to operate the vehicle brakes via one or more brake actuators 2318, to operate the steering system 2324 via one or more steering actuators 2326, to operate the propulsion system 2320 via one or more throttle/accelerator(s) 2322. The controller(s) 2522 may include one or more onboard (e.g., integrated) computing devices (e.g., supercomputers) that process sensor signals, and output operation commands (e.g., signals representing commands) to enable autonomous driving and/or to assist a human driver in driving the autonomous vehicle 1302. The controller(s) 2522 may include a first controller for autonomous driving functions, a second controller for functional safety functions, a third controller for artificial intelligence functionality (e.g., computer vision), a fourth controller for infotainment functionality, a fifth controller for redundancy in emergency conditions, and/or other controllers. In some examples, a single controller may handle two or more of the above functionalities, two or more controller(s) 2522 may handle a single functionality, and/or any combination thereof.

The controller(s) 2522 may provide the signals for controlling one or more components and/or systems of the autonomous vehicle 1302 in response to sensor data received from one or more sensors (e.g., sensor inputs). The sensor data may be received from, for example and without limitation, global navigation satellite systems sensors (GNSS sensor(s) 2328) (e.g., Global Positioning System sensor(s)), RADAR sensor(s) 2330, ultrasonic sensor(s) 2332, LIDAR sensor(s) 2334, inertial measurement unit sensor(s) (IMU sensor(s) 2336) (e.g., accelerometer(s), gyroscope(s), magnetic compass(es), magnetometer(s), etc.), microphone(s) 2346, stereo camera(s) 2338, wide-view camera(s) 2340 (e.g., fisheye cameras), infrared infrared camera(s) 2342, surround camera(s) 2344 (e.g., 360 degree cameras), long-range and/or mid-range camera(s) 2402, speed speed sensor(s) 2314 (e.g., for measuring the speed of the autonomous vehicle 1302), vibration sensor(s) 2312, steering sensor(s) 2310, brake sensor(s) (e.g., as part of the brake sensor system 2316), and/or other sensor types.

One or more of the controller(s) 2522 may receive inputs (e.g., represented by input data) from an instrument cluster 2306 of the autonomous vehicle 1302 and provide outputs (e.g., represented by output data, display data, etc.) via a human-machine interface display (HMI display 2308), an audible annunciator, a loudspeaker, and/or via other components of the autonomous vehicle 1302. The outputs may include information such as vehicle velocity, speed, time, map data (e.g., the HD map 2512 of FIG. 25), location data (e.g., the autonomous vehicle 1302 location, such as on a map), direction, location of other vehicles (e.g., an occupancy grid), information about objects and status of objects as perceived by the controller(s) 2522, etc. For example, the HMI display 2308 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The autonomous vehicle 1302 further includes a network interface 2302 which may use one or more wireless antenna(s) 2304 and/or modem(s) to communicate over one or more networks. For example, the network interface 2302 may be capable of communication over LTE, WCDMA, UMTS, GSM, CDMA2000, etc. The wireless antenna(s) 2304 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 24:
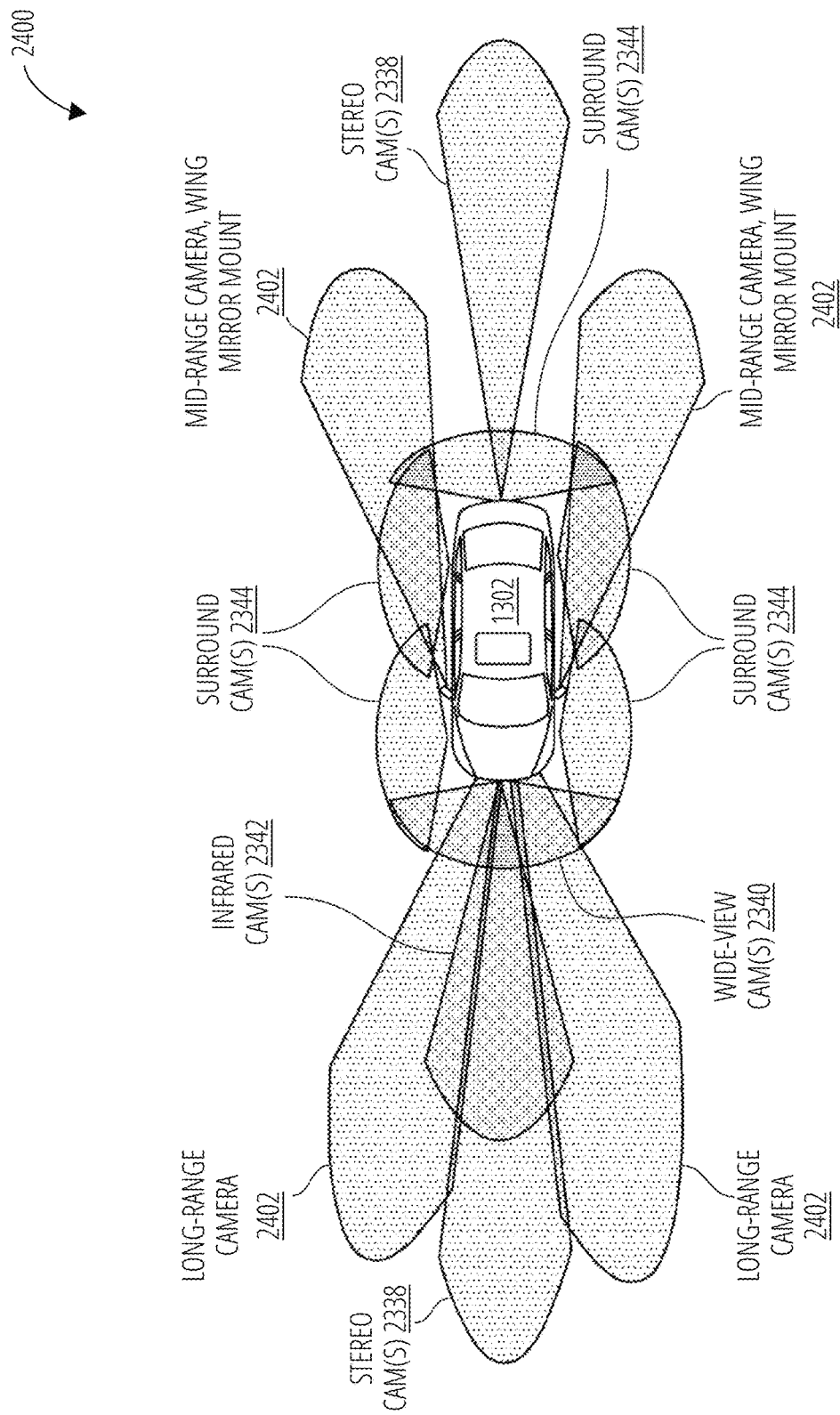
FIG. 24 illustrates a camera locations 2400 in accordance with one embodiment.

FIG. 24 is an example of camera locations and fields of view for the example autonomous vehicle 1302 of FIG. 23, in accordance with some embodiments of the present disclosure. The cameras and respective fields of view are one example embodiment and are not intended to be limiting. For example, additional and/or alternative cameras may be included and/or the cameras may be located at different locations on the autonomous vehicle 1302.

The camera types for the cameras may include, but are not limited to, digital cameras that may be adapted for use with the components and/or systems of the autonomous vehicle 1302. The camera(s) may operate at automotive safety integrity level (ASIL) B and/or at another ASIL. The camera types may be capable of any image capture rate, such as 60 frames per second (fps), 720 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the autonomous vehicle 1302 (e.g., front-facing cameras) may be used for surround view, to help identify forward facing paths and obstacles, as well aid in, with the help of one or more controller(s) 2522 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 2340 that may be used to perceive objects coming into view from the periphery (e.g., pedestrians, crossing traffic or bicycles). Although only one wide-view camera is illustrated in FIG. 24, there may any number of wide-view camera(s) 2340 on the autonomous vehicle 1302. In addition, long-range camera(s) (long-range and/or mid-range camera(s) 2402) (e.g., a long-view stereo camera pair) may be used for depth-based object detection, especially for objects for which a neural network has not yet been trained. The long-range camera(s) may also be used for object detection and classification, as well as basic object tracking.

One or more stereo camera(s) 2338 may also be included in a front-facing configuration. The stereo camera(s) 2338 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. Alternative stereo camera(s) 2338 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 2338 may be used in addition to, or alternatively from, those described herein.

Cameras with a field of view that include portions of the environment to the side of the vehicle 102 (e.g., side-view cameras) may be used for surround view, providing information used to create and update the occupancy grid, as well as to generate side impact collision warnings. For example, surround camera(s) 2344 (e.g., four surround camera(s) 2344 as illustrated in FIG. 24) may be positioned to on the vehicle 102. The surround camera(s) 2344 may include wide-view camera(s) 2340, fisheye camera(s), 360 degree camera(s), and/or the like. Four example, four fisheye cameras may be positioned on the vehicle's front, rear, and sides. In an alternative arrangement, the vehicle may use three surround camera(s) 2344 (e.g., left, right, and rear), and may leverage one or more other camera(s) (e.g., a forward-facing camera) as a fourth surround view camera.

Cameras with a field of view that include portions of the environment to the rear of the autonomous vehicle 1302 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 2402, stereo camera(s) 2338, infrared camera(s) 2342, etc.), as described herein.

Figure 25:
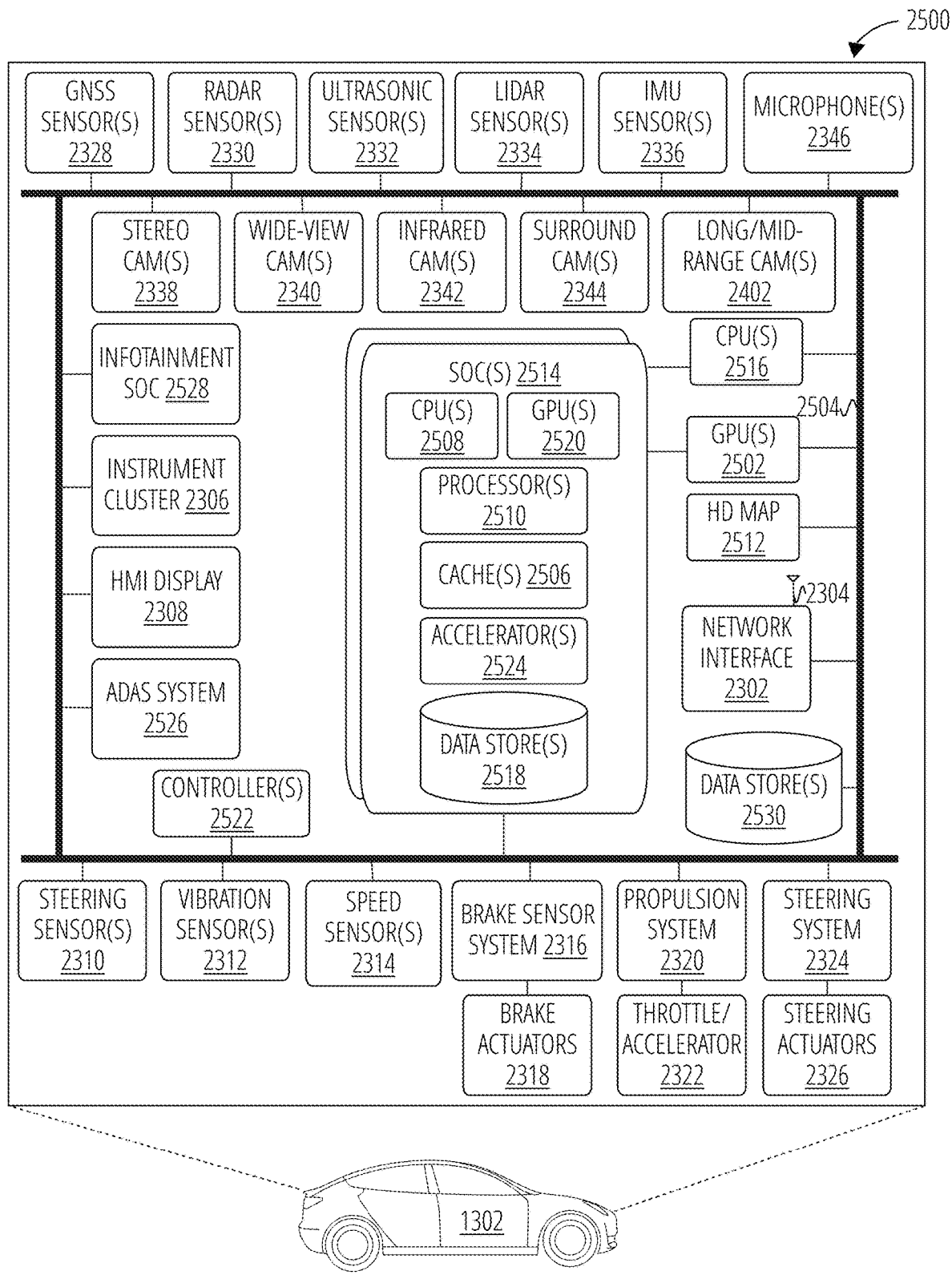
FIG. 25 illustrates a system architecture 2500 in accordance with one embodiment.

FIG. 25 is a block diagram of an example system architecture for the example autonomous vehicle 1302 of FIG. 23, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the autonomous vehicle 1302 in FIG. 25 are illustrated as being connected via bus 2504. The bus 2504 may include a Controller Area Network (CAN) data interface (alternatively referred to herein as a "CAN bus"). A CAN may be a network inside the autonomous vehicle 1302 used to aid in control of various features and functionality of the autonomous vehicle 1302, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 2504 is described herein as being a CAN bus, this is not intended to be limiting. For example, in addition to, or alternatively from, the CAN bus, FlexRay and/or Ethernet may be used. Additionally, although a single line is used to represent the bus 2504, this is not intended to be limiting. For example, there may be any number of busses, which may include one or more CAN busses, one or more FlexRay busses, one or more Ethernet busses, and/or one or more other types of busses using a different protocol. In some examples, two or more busses may be used to perform different functions, and/or may be used for redundancy. For example, a first bus 2504 may be used for collision avoidance functionality and a second bus 2504 may be used for actuation control. In any example, each bus 2504 may communicate with any of the components of the autonomous vehicle 1302, and two or more busses may communicate with the same components. In some examples, each SoC(s) 2514, each of the controller(s) 2522, and/or each computer within the vehicle may have access to the same input data (e.g., inputs from sensors of the autonomous vehicle 1302), and may be connected to a common bus, such the CAN bus.

The autonomous vehicle 1302 may include one or more controller(s) 2522, such as those described herein with respect to FIG. 23. The controller(s) 2522 may be used for a variety of functions. The controller(s) 2522 may be coupled to any of the various other components and systems of the autonomous vehicle 1302, and may be used for control of the autonomous vehicle 1302, artificial intelligence of the autonomous vehicle 1302, infotainment for the autonomous vehicle 1302, and/or the like.

The autonomous vehicle 1302 may include SoC(s) 2514. The SoC(s) 2514 may include CPU(s) 2508, GPU(s) 2520, processor(s) 2510, cache(s) 2506, accelerator(s) 2524, data store(s) 2518, and/or other components and features not illustrated. The SoC(s) 2514 may be used to control the autonomous vehicle 1302 in a variety of platforms and systems. For example, the SoC(s) 2514 may be combined in a system (e.g., the system of the vehicle 102) with an HD map 2512 which may obtain map refreshes and/or updates via a network interface 2302 from one or more servers (e.g., server(s) 2610 of FIG. 26).

The CPU(s) 2508 may include a CPU cluster or CPU complex (alternatively referred to herein as a "CCPLEX"). The CPU(s) 2508 may include multiple cores and/or L2 caches. For example, in some embodiments, the CPU(s) 2508 may include eight cores in a coherent multi-processor configuration. In some embodiments, the CPU(s) 2508 may include four dual-core clusters where each cluster has a dedicated L2 cache (e.g., a 2 MB L2 cache). The CPU(s) 2508 (e.g., the CCPLEX) may be configured to support simultaneous cluster operation enabling any combination of the clusters of the CPU(s) 2508 to be active at any given time.

The CPU(s) 2508 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 2508 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 2520 may include an integrated GPU (alternatively referred to herein as an "iGPU"). The GPU(s) 2520 may be programmable and may be efficient for parallel workloads. The GPU(s) 2520, in some examples, may use an enhanced tensor instruction set. The GPU(s) 2520 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 2520 may include at least eight streaming microprocessors. The GPU(s) 2520 may use compute application programming interface(s) (API(s)). In addition, the GPU(s) 2520 may use one or more parallel computing platforms and/or programming models (e.g., NVIDIA's CUDA).

The GPU(s) 2520 may be power-optimized for best performance in automotive and embedded use cases. For example, the GPU(s) 2520 may be fabricated on a Fin field-effect transistor (FinFET). However, this is not intended to be limiting and the GPU(s) 2520 may be fabricated using other semiconductor manufacturing processes. Each streaming microprocessor may incorporate a number of mixed-precision processing cores partitioned into multiple blocks. For example, and without limitation, 64

PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 2520 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 2520 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 2520 to access the CPU(s) 2508 page tables directly. In such examples, when the GPU(s) 2520 memory management unit (MMU) experiences a miss, an address translation request may be transmitted to the CPU(s) 2508. In response, the CPU(s) 2508 may look in its page tables for the virtual-to-physical mapping for the address and transmits the translation back to the GPU(s) 2520. As such, unified memory technology may allow a single unified virtual address space for memory of both the CPU(s) 2508 and the GPU(s) 2520, thereby simplifying the GPU(s) 2520 programming and porting of applications to the GPU(s) 2520.

In addition, the GPU(s) 2520 may include an access counter that may keep track of the frequency of access of the GPU(s) 2520 to memory of other processors. The access counter may help ensure that memory pages are moved to the physical memory of the processor that is accessing the pages most frequently.

The SoC(s) 2514 may include any number of cache(s) 2506, including those described herein. For example, the cache(s) 2506 may include an L3 cache that is available to both the CPU(s) 2508 and the GPU(s) 2520 (e.g., that is connected both the CPU(s) 2508 and the GPU(s) 2520). The cache(s) 2506 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 2514 may include one or more accelerator(s) 2524 (e.g., hardware accelerators, software accelerators, or a combination thereof). For example, the SoC(s) 2514 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 2520 and to off-load some of the tasks of the GPU(s) 2520 (e.g., to free up more cycles of the GPU(s) 2520 for performing other tasks). As an example, the accelerator(s) 2524 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 2524 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 2520, and by using an inference accelerator, for example, a designer may target either the DLA(s) or the GPU(s) 2520 for any function. For example, the designer may focus processing of CNNs and floating point operations on the DLA(s) and leave other functions to the GPU(s) 2520 and/or other accelerator(s) 2524.

The accelerator(s) 2524 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 2508. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 2524 (e.g., the hardware acceleration cluster) may include a computer vision network on-chip and SRAM, for providing a high-bandwidth, low latency SRAM for the accelerator(s) 2524. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61506 standards, although other standards and protocols may be used.

In some examples, the SoC(s) 2514 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real0time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

The accelerator(s) 2524 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit sensor(s) (IMU sensor(s) 2336) output that correlates with the autonomous vehicle 1302 orientation, distance, 3D location estimates of the object obtained from the neural network and/or other sensors (e.g., LIDAR sensor(s) 2334 or RADAR sensor(s) 2330), among others.

The SoC(s) 2514 may include data store(s) 2518 (e.g., memory). The data store(s) 2518 may be on-chip memory of the SoC(s) 2514, which may store neural networks to be executed on the GPU and/or the DLA. In some examples, the data store(s) 2518 may be large enough in capacity to store multiple instances of neural networks for redundancy and safety. The data store(s) 2518 may comprise L2 or L3 cache(s) 2506. Reference to the data store(s) 2518 may include reference to the memory associated with the PVA, DLA, and/or other accelerator(s) 2524, as described herein.

The SoC(s) 2514 may include one or more processor(s) 2510 (e.g., embedded processors). The processor(s) 2510 may include a boot and power management processor that may be a dedicated processor and subsystem to handle boot power and management functions and related security enforcement. The boot and power management processor may be a part of the SoC(s) 2514 boot sequence and may provide runtime power management services. The boot power and management processor may provide clock and voltage programming, assistance in system low power state transitions, management of SoC(s) 2514 thermals and temperature sensors, and/or management of the SoC(s) 2514 power states. Each temperature sensor may be implemented as a ring-oscillator whose output frequency is proportional to temperature, and the SoC(s) 2514 may use the ring-oscillators to detect temperatures of the CPU(s) 2508, GPU(s) 2520, and/or accelerator(s) 2524. If temperatures are determined to exceed a threshold, the boot and power management processor may enter a temperature fault routine and put the SoC(s) 2514 into a lower power state and/or put the autonomous vehicle 1302 into a chauffeur to safe stop mode (e.g., bring the autonomous vehicle 1302 to a safe stop).

The processor(s) 2510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 2510 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 2510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 2510 may further include a real-time camera engine that may include a dedicated processor subsystem for handling real-time camera management.

The processor(s) 2510 may further include a high-dynamic range signal processor that may include an image signal processor that is a hardware engine that is part of the camera processing pipeline.

The processor(s) 2510 may include a video image compositor that may be a processing block (e.g., implemented on a microprocessor) that implements video post-processing functions needed by a video playback application to produce the final image for the player window. The video image compositor may perform lens distortion correction on wide-view camera(s) 2340, surround camera(s) 2344, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 2520 is not required to continuously render new surfaces. Even when the GPU(s) 2520 is powered on and active doing 3D rendering, the video image compositor may be used to offload the GPU(s) 2520 to improve performance and responsiveness.

The SoC(s) 2514 may further include a mobile industry processor interface (MIPI) camera serial interface for receiving video and input from cameras, a high-speed interface, and/or a video input block that may be used for camera and related pixel input functions. The SoC(s) 2514 may further include an input/output controller(s) that may be controlled by software and may be used for receiving I/O signals that are uncommitted to a specific role.

The SoC(s) 2514 may further include a broad range of peripheral interfaces to enable communication with peripherals, audio codecs, power management, and/or other devices. The SoC(s) 2514 may be used to process data from cameras (e.g., connected over Gigabit Multimedia Serial Link and Ethernet), sensors (e.g., LIDAR sensor(s) 2334, RADAR sensor(s) 2330, etc. that may be connected over Ethernet), data from bus 2504 (e.g., speed of autonomous vehicle 1302, steering wheel position, etc.), data from GNSS sensor(s) 2328 (e.g., connected over Ethernet or CAN bus). The SoC(s) 2514 may further include dedicated high-performance mass storage controllers that may include their own DMA engines, and that may be used to free the CPU(s) 2508 from routine data management tasks.

The SoC(s) 2514 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 2514 may be faster, more reliable, and even more energy-efficient and space-efficient than conventional systems. For example, the accelerator(s) 2524, when combined with the CPU(s) 2508, the GPU(s) 2520, and the data store(s) 2518, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 2502) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 2520.

In some examples, a CNN for facial recognition and vehicle owner identification may use data from camera sensors to identify the presence of an authorized driver and/or owner of the autonomous vehicle 1302. The always on sensor processing engine may be used to unlock the vehicle when the owner approaches the driver door and turn on the lights, and, in security mode, to disable the vehicle when the owner leaves the vehicle. In this way, the SoC(s) 2514 provide for security against theft and/or carjacking.

In another example, a CNN for emergency vehicle detection and identification may use data from microphone(s) 2346 to detect and identify emergency vehicle sirens. In contrast to conventional systems, that use general classifiers to detect sirens and manually extract features, the SoC(s) 2514 use the CNN for classifying environmental and urban sounds, as well as classifying visual data. In a preferred embodiment, the CNN running on the DLA is trained to identify the relative closing speed of the emergency vehicle (e.g., by using the Doppler effect). The CNN may also be trained to identify emergency vehicles specific to the local area in which the vehicle is operating, as identified by GNSS sensor(s) 2328. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensor(s) 2332, until the emergency vehicle(s) passes.

The vehicle may include a CPU(s) 2516 (e.g., discrete CPU(s), or dCPU(s)), that may be coupled to the SoC(s) 2514 via a high-speed interconnect (e.g., PCIe). The CPU(s) 2516 may include an X86 processor, for example. The CPU(s) 2516 may be used to perform any of a variety of functions, including arbitrating potentially inconsistent results between ADAS sensors and the SoC(s) 2514, and/or monitoring the status and health of the controller(s) 2522 and/or infotainment SoC 2528, for example.

The autonomous vehicle 1302 may include a GPU(s) 2502 (e.g., discrete GPU(s), or dGPU(s)), that may be coupled to the SoC(s) 2514 via a high-speed interconnect (e.g., NVIDIA's NVLINK). The GPU(s) 2502 may provide additional artificial intelligence functionality, such as by executing redundant and/or different neural networks, and may be used to train and/or update neural networks based on input (e.g., sensor data) from sensors of the autonomous vehicle 1302.

The autonomous vehicle 1302 may further include the network interface 2302 which may include one or more wireless antenna(s) 2304 (e.g., one or more wireless antennas for different communication protocols, such as a cellular antenna, a Bluetooth antenna, etc.). The network interface 2302 may be used to enable wireless connectivity over the Internet with the cloud (e.g., with the server(s) 2610 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the autonomous vehicle 1302 information about vehicles in proximity to the autonomous vehicle 1302 (e.g., vehicles in front of, on the side of, and/or behind the autonomous vehicle 1302). This functionality may be part of a cooperative adaptive cruise control functionality of the autonomous vehicle 1302.

The network interface 2302 may include a SoC that provides modulation and demodulation functionality and enables the controller(s) 2522 to communicate over wireless networks. The network interface 2302 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The autonomous vehicle 1302 may further include data store(s) 2530 which may include off-chip (e.g., off the SoC(s) 2514) storage. The data store(s) 2530 may include one or more storage elements including RAM, SRAM, DRAM, VRAM, Flash, hard disks, and/or other components and/or devices that may store at least one bit of data.

The autonomous vehicle 1302 may further include GNSS sensor(s) 2328. The GNSS sensor(s) 2328 (e.g., GPS and/or assisted GPS sensors), to assist in mapping, perception, occupancy grid generation, and/or path planning functions. Any number of GNSS sensor(s) 2328 may be used, including, for example and without limitation, a GPS using a USB connector with an Ethernet to Serial (RS-232) bridge.

The vehicle 102 may further include RADAR sensor(s) 2330. The RADAR sensor(s) 2330 may be used by the vehicle 102 for long-range vehicle detection, even in darkness and/or severe weather conditions. RADAR functional safety levels may be ASIL B. The RADAR sensor(s) 2330 may use the CAN and/or the bus 2504 (e.g., to transmit data generated by the RADAR sensor(s) 2330) for control and to access object tracking data, with access to Ethernet to access raw data in some examples. A wide variety of RADAR sensor types may be used. For example, and without limitation, the RADAR sensor(s) 2330 may be suitable for front, rear, and side RADAR use. In some example, Pulse Doppler RADAR sensor(s) are used.

The RADAR sensor(s) 2330 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 2330 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's surroundings at higher speeds with minimal interference from traffic in adjacent lanes. The other two antennae may expand the field of view, making it possible to quickly detect vehicles entering or leaving the vehicle's lane.

Mid-range RADAR systems may include, as an example, a range of up to 760 m (front) or 80 m (rear), and a field of view of up to 42 degrees (front) or 750 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The autonomous vehicle 1302 may further include ultrasonic sensor(s) 2332. The ultrasonic sensor(s) 2332, which may be positioned at the front, back, and/or the sides of the autonomous vehicle 1302, may be used for park assist and/or to create and update an occupancy grid. A wide variety of ultrasonic sensor(s) 2332 may be used, and different ultrasonic sensor(s) 2332 may be used for different ranges of detection (e.g., 2.5 m, 4 m). The ultrasonic sensor(s) 2332 may operate at functional safety levels of ASIL B.

The autonomous vehicle 1302 may include LIDAR sensor(s) 2334. The LIDAR sensor(s) 2334 may be used for object and pedestrian detection, emergency braking, collision avoidance, and/or other functions. The LIDAR sensor(s) 2334 may be functional safety level ASIL B. In some examples, the autonomous vehicle 1302 may include multiple LIDAR sensor(s) 2334 (e.g., two, four, six, etc.) that may use Ethernet (e.g., to provide data to a Gigabit Ethernet switch).

In some examples, the LIDAR sensor(s) 2334 may be capable of providing a list of objects and their distances for a 360-degree field of view. Commercially available LIDAR sensor(s) 2334 may have an advertised range of approximately 102 m, with an accuracy of 2 cm-3 cm, and with support for a 102 Mbps Ethernet connection, for example. In some examples, one or more non-protruding LIDAR sensor(s) 2334 may be used. In such examples, the LIDAR sensor(s) 2334 may be implemented as a small device that may be embedded into the front, rear, sides, and/or corners of the autonomous vehicle 1302. The LIDAR sensor(s) 2334, in such examples, may provide up to a 720-degree horizontal and 35-degree vertical field-of-view, with a 200 m range even for low-reflectivity objects. Front-mounted LIDAR sensor(s) 2334 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the autonomous vehicle 1302. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 2334 may be less susceptible to motion blur, vibration, and/or shock.

The vehicle may further include IMU sensor(s) 2336. The IMU sensor(s) 2336 may be located at a center of the rear axle of the autonomous vehicle 1302, in some examples. The IMU sensor(s) 2336 may include, for example and without limitation, an accelerometer(s), a magnetometer(s), a gyroscope(s), a magnetic compass(es), and/or other sensor types. In some examples, such as in six-axis applications, the IMU sensor(s) 2336 may include accelerometers and gyroscopes, while in nine-axis applications, the IMU sensor(s) 2336 may include accelerometers, gyroscopes, and magnetometers.

In some embodiments, the IMU sensor(s) 2336 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 2336 may enable the autonomous vehicle 1302 to estimate heading without requiring input from a magnetic sensor by directly observing and correlating the changes in velocity from GPS to the IMU sensor(s) 2336. In some examples, the IMU sensor(s) 2336 and the GNSS sensor(s) 2328 may be combined in a single integrated unit.

The vehicle may include microphone(s) 2346 placed in and/or around the autonomous vehicle 1302. The microphone(s) 2346 may be used for emergency vehicle detection and identification, among other things.

The vehicle may further include any number of camera types, including stereo camera(s) 2338, wide-view camera(s) 2340, infrared camera(s) 2342, surround camera(s) 2344, long-range and/or mid-range camera(s) 2402, and/or other camera types. The cameras may be used to capture image data around an entire periphery of the autonomous vehicle 1302. The types of cameras used depends on the embodiments and requirements for the autonomous vehicle 1302, and any combination of camera types may be used to provide the necessary coverage around the autonomous vehicle 1302. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 23 and FIG. 24.

The autonomous vehicle 1302 may further include vibration sensor(s) 2312. The vibration sensor(s) 2312 may measure vibrations of components of the vehicle, such as the axle(s). For example, changes in vibrations may indicate a change in road surfaces. In another example, when two or more vibration sensor(s) 2312 are used, the differences between the vibrations may be used to determine friction or slippage of the road surface (e.g., when the difference in vibration is between a power-driven axle and a freely rotating axle).

The autonomous vehicle 1302 may include an ADAS system 2526. The ADAS system 2526 may include a SoC, in some examples. The ADAS system 2526 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 2330, LIDAR sensor(s) 2334, and/or a camera(s). The ACC systems may include longitudinal ACC and/or lateral ACC. Longitudinal ACC monitors and controls the distance to the vehicle immediately ahead of the vehicle 102 and automatically adjust the vehicle speed to maintain a safe distance from vehicles ahead. Lateral ACC performs distance keeping, and advises the vehicle 102 to change lanes when necessary. Lateral ACC is related to other ADAS applications such as LCA and CWS.

CACC uses information from other vehicles that may be received via the network interface 2302 and/or the wireless antenna(s) 2304 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the autonomous vehicle 1302), while the I2V communication concept provides information about traffic further ahead. CACC systems may include either or both I2V and V2V information sources. Given the information of the vehicles ahead of the autonomous vehicle 1302, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 2330, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 2330, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the autonomous vehicle 1302 crosses lane markings. An LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the autonomous vehicle 1302 if the autonomous vehicle 1302 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 2330, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the autonomous vehicle 1302 is backing up. Some RCTW systems include AEB to ensure that the vehicle brakes are applied to avoid a crash. RCTW systems may use one or more rear-facing RADAR sensor(s) 2330, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1302, the autonomous vehicle 1302 itself must, in the case of conflicting results, decide whether to heed the result from a primary computer or a secondary computer (e.g., a first controller or a second controller). For example, in some embodiments, the ADAS system 2526 may be a backup and/or secondary computer for providing perception information to a backup computer rationality module. The backup computer rationality monitor may run a redundant diverse software on hardware components to detect faults in perception and dynamic driving tasks. Outputs from the ADAS system 2526 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 2514.

In other examples, ADAS system 2526 may include an secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 2526 may be fed into the primary computer's perception block and/or the primary computer's dynamic driving task block. For example, if the ADAS system 2526 indicates a forward crash warning due to an object immediately ahead, the perception block may use this information when identifying objects. In other examples, the secondary computer may have its own neural network which is trained and thus reduces the risk of false positives, as described herein.

The autonomous vehicle 1302 may further include the infotainment SoC 2528 (e.g., an in-vehicle infotainment system (IVI)). Although illustrated and described as a SoC, the infotainment system may not be a SoC, and may include two or more discrete components. The infotainment SoC 2528 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the autonomous vehicle 1302. For example, the infotainment SoC 2528 may radios, disk players, navigation systems, video players, USB and Bluetooth connectivity, carputers, in-car entertainment, Wi-Fi, steering wheel audio controls, hands free voice control, a heads-up display (HUD), an HMI display 2308, a telematics device, a control panel (e.g., for controlling and/or interacting with various components, features, and/or systems), and/or other components. The infotainment SoC 2528 may further be used to provide information (e.g., visual and/or audible) to a user(s) of the vehicle, such as information from the ADAS system 2526, autonomous driving information such as planned vehicle maneuvers, trajectories, surrounding environment information (e.g., intersection information, vehicle information, road information, etc.), and/or other information.

The infotainment SoC 2528 may include GPU functionality. The infotainment SoC 2528 may communicate over the bus 2504 (e.g., CAN bus, Ethernet, etc.) with other devices, systems, and/or components of the autonomous vehicle 1302. In some examples, the infotainment SoC 2528 may be coupled to a supervisory MCU such that the GPU of the infotainment system may perform some self-driving functions in the event that the primary controller(s) 2522 (e.g., the primary and/or backup computers of the autonomous vehicle 1302) fail. In such an example, the infotainment SoC 2528 may put the autonomous vehicle 1302 into a chauffeur to safe stop mode, as described herein.

The autonomous vehicle 1302 may further include an instrument cluster 2306 (e.g., a digital dash, an electronic instrument cluster, a digital instrument panel, etc.). The instrument cluster 2306 may include a controller and/or supercomputer (e.g., a discrete controller or supercomputer). The instrument cluster 2306 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 2528 and the instrument cluster 2306. In other words, the instrument cluster 2306 may be included as part of the infotainment SoC 2528, or vice versa.

FIG. 26 is a system 2600 diagram for communication between cloud-based server(s) and the example autonomous vehicle 1302 of FIG. 23, in accordance with some embodiments of the present disclosure. The system 2600 may include server(s) 2610, network(s) 1304, and vehicles, including the autonomous vehicle 1302. The server(s) 2610 may include a plurality of GPUs 2602, PCIe switches 2614, and/or CPUs 2608. The GPUs 2602, the CPUs 2608, and the PCIe switches 2614 may be interconnected with high-speed interconnects such as, for example and without limitation, NVLink interfaces 2612 developed by NVIDIA and/or PCIe connections 2606. In some examples, the GPUs 2602 are connected via NVLink and/or NVSwitch SoC and the GPUs 2602 and the PCIe switches 2614 are connected via PCIe interconnects. Although eight GPUs 2602, two CPUs 2608, and two PCIe switches 2614 are illustrated, this is not intended to be limiting. Depending on the embodiment, each of the server(s) 2610 may include any number of GPUs 2602, CPUs 2608, and/or PCIe switches 2614. For example, the server(s) 2610 may each include eight, sixteen, thirty-two, and/or more GPUs 2602.

The server(s) 2610 may receive, over the network(s) 1304 and from the vehicles, image data representative of images showing unexpected or changed road conditions, such as recently commenced road-work. The server(s) 2610 may transmit, over the network(s) 1304 and to the vehicles, neural networks 2616, updated neural networks 2616, and/or 2604, including information regarding traffic and road conditions. The updates to the 2604 may include updates for the HD map 2512, such as information regarding construction sites, potholes, detours, flooding, and/or other obstructions. In some examples, the neural networks 2616, the updated neural networks 2616, and/or the 2604 may have resulted from new training and/or experiences represented in data received from any number of vehicles in the environment, and/or based on training performed at a datacenter (e.g., using the server(s) 2610 and/or other servers).

The server(s) 2610 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Once the machine learning models are trained, the machine learning models may be used by the vehicles (e.g., transmitted to the vehicles over the network(s) 1304, and/or the machine learning models may be used by the server(s) 2610 to remotely monitor the vehicles.

In some examples, the server(s) 2610 may receive data from the vehicles and apply the data to up-to-date real-time neural networks for real-time intelligent inferencing. The server(s) 2610 may include deep-learning supercomputers and/or dedicated AI computers powered by GPUs 2602, such as a DGX and DGX Station machines developed by NVIDIA. However, in some examples, the server(s) 2610 may include deep learning infrastructure that use only CPU-powered datacenters.

The deep-learning infrastructure of the server(s) 2610 may be capable of fast, real-time inferencing, and may use that capability to evaluate and verify the health of the processors, software, and/or associated hardware in the autonomous vehicle 1302. For example, the deep-learning infrastructure may receive periodic updates from the autonomous vehicle 1302, such as a sequence of images and/or objects that the autonomous vehicle 1302 has located in that sequence of images (e.g., via computer vision and/or other machine learning object classification techniques). The deep-learning infrastructure may run its own neural network to identify the objects and compare them with the objects identified by the autonomous vehicle 1302 and, if the results do not match and the infrastructure concludes that the AI in the autonomous vehicle 1302 is malfunctioning, the server(s) 2610 may transmit a signal to the autonomous vehicle 1302 instructing a fail-safe computer of the autonomous vehicle 1302 to assume control, notify the passengers, and complete a safe parking maneuver.

For inferencing, the server(s) 2610 may include the GPUs 2602 and one or more programmable inference accelerators (e.g., NVIDIA's TensorRT 3). The combination of GPU-powered servers and inference acceleration may make real-time responsiveness possible. In other examples, such as where performance is less critical, servers powered by CPUs, FPGAs, and other processors may be used for inferencing.

Machine Embodiments

Figure 27:
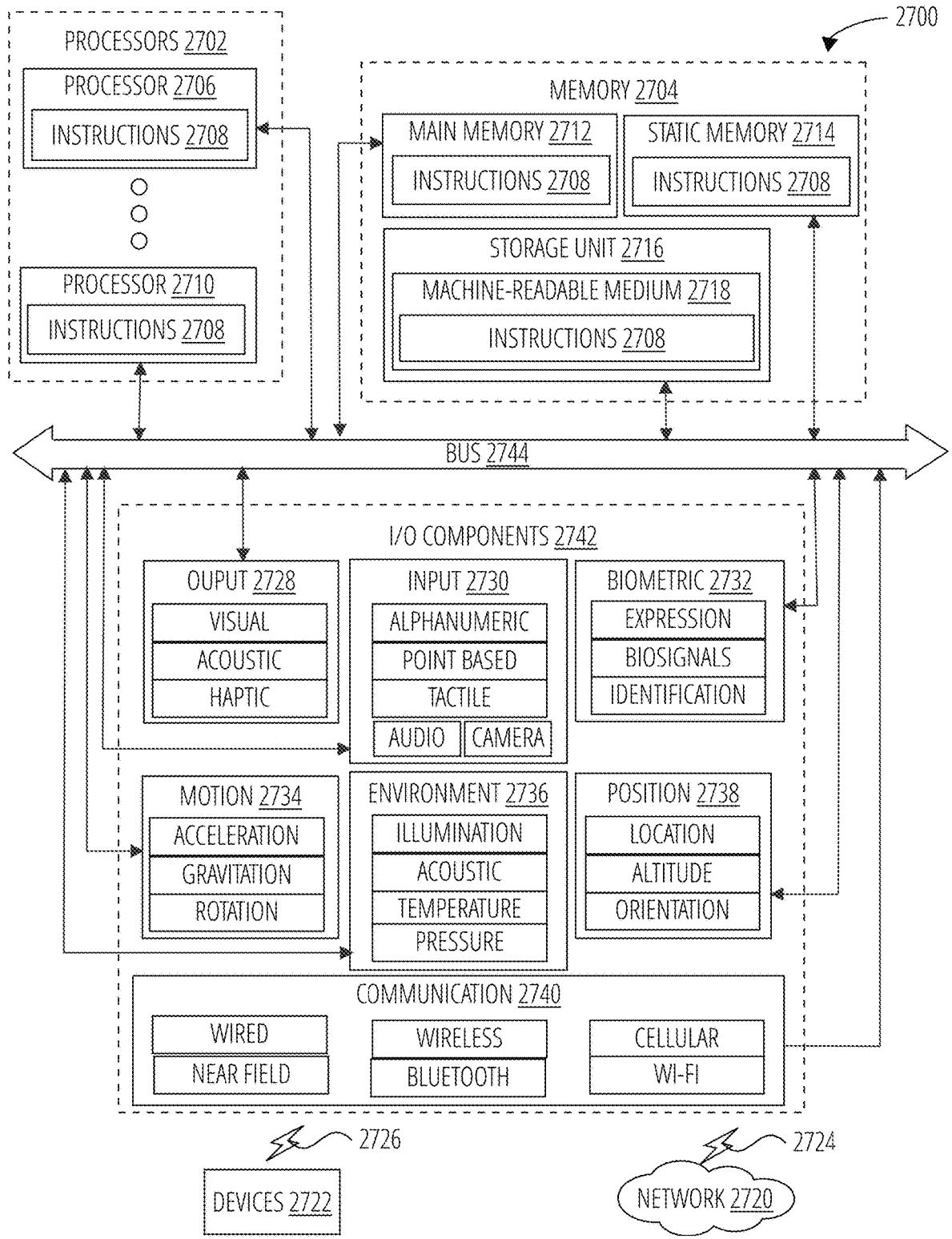
FIG. 27 illustrates a diagrammatic representation of a machine 2700 in the form of a computer system within which a set of instructions may be executed for causing the machine to perform any one or more of the methodologies discussed herein, according to an example embodiment.

FIG. 27 depicts a diagrammatic representation of a machine 2700 in the form of a computer system within which logic may be implemented to cause the machine to perform any one or more of the functions or methods disclosed herein, according to an example embodiment.

Specifically, FIG. 27 depicts a machine 2700 comprising instructions 2708 (e.g., a program, an application, an applet, an app, or other executable code) for causing the machine 2700 to perform any one or more of the functions or methods discussed herein. For example the instructions 2708 may cause the machine 2700 to implement the gaze tracker, gaze estimation, and other functionality discussed herein in conjunction with a head mounted display device. The machine 2700 may be implemented within the head mounted display device, or in a separate machine that communicates with the head mounted display. The instructions 2708 configure a general, non-programmed machine into a particular machine 2700 programmed to carry out said functions and/or methods.

In alternative embodiments, the machine 2700 operates as a standalone device or may be coupled (e.g., networked) to other machines. In a networked deployment, the machine 2700 may operate in the capacity of a server machine or a client machine in a server-client network environment, or as a peer machine in a peer-to-peer (or distributed) network environment. The machine 2700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2708, sequentially or otherwise, that specify actions to be taken by the machine 2700. Further, while only a single machine 2700 is depicted, the term "machine" shall also be taken to include a collection of machines 200 that individually or jointly execute the instructions 2708 to perform any one or more of the methodologies or subsets thereof discussed herein.

The machine 2700 may include processors 2702, memory 2704, and I/O components 2742, which may be configured to communicate with each other such as via one or more bus 2744. In an example embodiment, the processors 2702 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, one or more processor (e.g., processor 2706 and processor 2710) to execute the instructions 2708. The term "processor" is intended to include multi-core processors that may comprise two or more independent processors (sometimes referred to as "cores") that may execute instructions contemporaneously. Although FIG. 27 depicts multiple processors 2702, the machine 2700 may include a single processor with a single core, a single processor with multiple cores (e.g., a multi-core processor), multiple processors with a single core, multiple processors with multiples cores, or any combination thereof.

The memory 2704 may include one or more of a main memory 2712, a static memory 2714, and a storage unit 2716, each accessible to the processors 2702 such as via the bus 2744. The main memory 2712, the static memory 2714, and storage unit 2716 may be utilized, individually or in combination, to store the instructions 2708 embodying any one or more of the functionality described herein. The instructions 2708 may reside, completely or partially, within the main memory 2712, within the static memory 2714, within a machine-readable medium 2718 within the storage unit 2716, within at least one of the processors 2702 (e.g., within the processor's cache memory), or any suitable combination thereof, during execution thereof by the machine 2700.

The I/O components 2742 may include a wide variety of components to receive input, provide output, produce output, transmit information, exchange information, capture measurements, and so on. The specific I/O components 2742 that are included in a particular machine will depend on the type of machine. For example, portable machines such as mobile phones will likely include a touch input device or other such input mechanisms, while a headless server machine will likely not include such a touch input device. It will be appreciated that the I/O components 2742 may include many other components that are not shown in FIG. 27. The I/O components 2742 are grouped according to functionality merely for simplifying the following discussion and the grouping is in no way limiting. In various example embodiments, the I/O components 2742 may include output components 2728 and input components 2730. The output components 2728 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2730 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), one or more cameras for capturing still images and video, and the like.

In further example embodiments, the I/O components 2742 may include biometric components 2732, motion components 2734, environmental components 2736, or position components 2738, among a wide array of possibilities. For example, the biometric components 2732 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 2734 may include acceleration sensor components (e.g., accelerometer), gravitation sensor components, rotation sensor components (e.g., gyroscope), and so forth. The environmental components 2736 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2742 may include communication components 2740 operable to couple the machine 2700 to a network 2720 or devices 2722 via a coupling 2724 and a coupling 2726, respectively. For example, the communication components 2740 may include a network interface component or another suitable device to interface with the network 2720. In further examples, the communication components 2740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2722 may be another machine or any of a wide variety of peripheral devices (e.g., a peripheral device coupled via a USB).

Moreover, the communication components 2740 may detect identifiers or include components operable to detect identifiers. For example, the communication components 2740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2740, such as location via Internet Protocol (IP) geolocation, location via Wi-Fi® signal triangulation, location via detecting an NFC beacon signal that may indicate a particular location, and so forth.

Instruction and Data Storage Medium Embodiments

The various memories (i.e., memory 2704, main memory 2712, static memory 2714, and/or memory of the processors 2702) and/or storage unit 2716 may store one or more sets of instructions and data structures (e.g., software) embodying or utilized by any one or more of the methodologies or functions described herein. These instructions (e.g., the instructions 2708), when executed by processors 2702, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors and internal or external to computer systems. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such intangible media, at least some of which are covered under the term "signal medium" discussed below.

Communication Network Embodiments

In various example embodiments, one or more portions of the network 2720 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 2720 or a portion of the network 2720 may include a wireless or cellular network, and the coupling 2724 may be a Code Division Multiple Access (CDMA) connection, a Global System for Mobile communications (GSM) connection, or another type of cellular or wireless coupling. In this example, the coupling 2724 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 2708 and/or data generated by or received and processed by the instructions 2708 may be transmitted or received over the network 2720 using a transmission medium via a network interface device (e.g., a network interface component included in the communication components 2740) and utilizing any one of a number of well-known transfer protocols (e.g., hypertext transfer protocol (HTTP)). Similarly, the instructions 2708 may be transmitted or received using a transmission medium via the coupling 2726 (e.g., a peer-to-peer coupling) to the devices 2722. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 2708 for execution by the machine 2700, and/or data generated by execution of the instructions 2708, and/or data to be operated on during execution of the instructions 2708, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A system for use in a vehicle, the system comprising:
   an optical path comprising a lens and a vehicle driver display;
   a plurality of light emitting diodes disposed adjacent to the optical path;
   a first number of the light emitting diodes configured into an illumination mode toward a gaze location of the vehicle driver and a second number of the light emitting diodes configured in a light sensing mode toward the gaze location; and
   wherein one or more of the light emitting diodes emits light having a wavelength between 920 nm and 960 nm.

2. The system of claim 1, further comprising at least one central light emitting diode configured non-adaptively in the illumination mode and a plurality of light emitting diodes configured adaptively into the sensing mode and positioned adjacent to the at least one central light emitting diode.

3. The system of claim 1, further comprising logic to, for one of more of the light emitting diodes:
   apply a forward voltage to the light emitting diode for a first duration;
   apply a reverse voltage pulse to the light emitting diode for a second duration; and
   measure a voltage between a cathode and an anode of the light emitting diode for a third duration.

4. The system of claim 3, wherein one or more of the light emitting diodes emits modulated light.

5. The system of claim 1, wherein one or more light emitting diode emits light directed to a conic target region different from at least one other conic target region of one or more other light emitting diode.

6. A system for driver gaze tracking in a vehicle, the system comprising:
   an opaque frame circumferentially enclosing a transparent field of view of the driver;
   a plurality of light emitting diodes coupled to the opaque frame for emitting infrared light onto a gaze position of the driver through the transparent field of view;
   a plurality of photodiodes coupled to the opaque frame, each photodiode from among the plurality of photodiodes operationally coupled to a single light emitting diode from among the plurality of light emitting diodes for sensing intensity of infrared light reflected from the gaze position of the driver; and
   wherein one or more of the plurality of light emitting diodes emits light having a wavelength between 920 nm and 960 nm.

7. The system of claim 6, further comprising logic configured to cause the plurality of light emitting diodes to periodically emit infrared light and the plurality of photodiodes to periodically sense infrared light.

8. The system of claim 7, further comprising:
   a camera for periodically sensing infrared light reflected from the gaze position of the driver; and
   logic capable of evaluating the sensing by the plurality of light emitting diodes compared to the sensing by the camera.

9. The system of claim 6, further comprising logic for determining a gaze direction of the driver based on the sensed intensity of infrared light reflected from the gaze position of the driver.

10. The system of claim 6, further comprising logic configured to:
    calibrate the system by determining the gaze direction of the driver to a successive plurality of known points in the field of view of the driver based on the sensed intensity of infrared light reflected from the gaze position of the driver; and
    based on the calibration, subsequently determining the gaze direction of the driver from the sensed intensity of reflected infrared light originating from the plurality of light emitting diodes.

11. The system of claim 10, further comprising logic configured to:
    determine that the calibration has become invalid; and
    recalibrate the system by determining the gaze direction of the driver to the successive plurality of known points in the field of view based on the sensed intensity of reflected infrared light from the plurality of light emitting diodes.

12. A method for gaze tracking by a gaze tracking device utilized in a vehicle, the method comprising:
    determining, using calibration logic, a set of calibration data corresponding to a first measure of intensities of infrared light reflected from an eye of a driver of the vehicle while the eye is gazing at a plurality of calibration points during a first time period, the calibration points corresponding to a plurality of known gaze directions; and
    comparing to the calibration data, using gaze tracking logic, an instant gaze direction for the eye during a second time period based on a second measure of intensities of infrared light reflected by the eye.

13. The method of claim 12, wherein the first measure of intensities of infrared light further comprises, for each calibration point from among the plurality of calibration points:
    emitting, by a plurality of light emitting diodes, a plurality of infrared light cones directed to a plurality of regions of the eye; and sensing, by the plurality of light emitting diodes, a plurality of reflected light for each region from among the plurality of regions of the eye.

14. The method of claim 12, wherein the first measure of intensities of infrared light further comprises, for each calibration point from among the plurality of calibration points:
   emitting, by a plurality of light emitting diodes, a plurality of infrared light cones directed to a plurality of regions of the eye; and
   sensing, by a plurality of photodiodes, a plurality of reflected light for each region from among the plurality of regions of the eye.

15. The method of claim 12, wherein the second measure of intensities of infrared light further comprises:
   emitting, by a plurality of light emitting diodes, a plurality of infrared light cones directed to a plurality of regions of the eye; and
   sensing, by the plurality of light emitting diodes, a plurality of reflected light for each region from among the plurality of regions of the eye.

16. The method of claim 12, wherein the second measure of intensities of infrared light further comprises:
   emitting, by a plurality of light emitting diodes, a plurality of infrared light cones directed to a plurality of regions of the eye; and
   sensing, by the plurality of light emitting diodes, a plurality of reflected light for each region from among the plurality of regions of the eye.

17. The method of claim 12, wherein the calibration points correspond to a row-and-column arrangement over a field of view, and wherein the calibration data is arranged as a matrix corresponding to the row-and-column arrangement.

18. The method of claim 12, wherein regression analysis is performed on the calibration data for comparing the instant gaze direction for the eye during a second time period to the set of calibration data.

19. The method of claim 18, wherein the regression analysis comprises a Gaussian Process regression.

20. A system for use in a vehicle, the system comprising:
   an optical path comprising a lens and a vehicle driver display;
   a plurality of light emitting diodes disposed adjacent to the optical path;
   a first number of the light emitting diodes configured into an illumination mode toward a gaze location of the vehicle driver and a second number of the light emitting diodes configured in a light sensing mode toward the gaze location;
   logic to, for one of more of the light emitting diodes:
      apply a forward voltage to the light emitting diode for a first duration;
      apply a reverse voltage pulse to the light emitting diode for a second duration; and
      measure a voltage between a cathode and an anode of the light emitting diode for a third duration.

21. A system for use in a vehicle, the system comprising:
   an optical path comprising a lens and a vehicle driver display;
   a plurality of light emitting diodes disposed adjacent to the optical path;
   a first number of the light emitting diodes configured into an illumination mode toward a gaze location of the vehicle driver and a second number of the light emitting diodes configured in a light sensing mode toward the gaze location; and
   at least one central light emitting diode configured non-adaptively in the illumination mode and a plurality of light emitting diodes configured adaptively into the sensing mode and positioned adjacent to the at least one central light emitting diode.

22. A system for use in a vehicle, the system comprising:
   an optical path comprising a lens and a vehicle driver display;
   a plurality of light emitting diodes disposed adjacent to the optical path;
   a first number of the light emitting diodes configured into an illumination mode toward a gaze location of the vehicle driver and a second number of the light emitting diodes configured in a light sensing mode toward the gaze location; and
   wherein one or more of the light emitting diodes emits modulated light.

23. A system for use in a vehicle, the system comprising:
   an optical path comprising a lens and a vehicle driver display;
   a plurality of light emitting diodes disposed adjacent to the optical path;
   a first number of the light emitting diodes configured into an illumination mode toward a gaze location of the vehicle driver and a second number of the light emitting diodes configured in a light sensing mode toward the gaze location; and
   wherein one or more light emitting diode emits light directed to a conic target region different from at least one other conic target region of one or more other light emitting diode.

* * * * *